US011248288B2

(12) United States Patent
Yonekura et al.

(10) Patent No.: US 11,248,288 B2
(45) Date of Patent: Feb. 15, 2022

(54) PLATING ADHESION AMOUNT CONTROL MECHANISM AND METHOD FOR CONTROLLING AN ADHESION AMOUNT BY COMPARING A PLATING ADHESION AMOUNT ESTIMATION VALUE AT AN UPSTREAM POSITION AND A PLATING ADHESION ACTUAL AMOUNT AT A DOWNSTREAM POSITION

(71) Applicant: PRIMETALS TECHNOLOGIES JAPAN, LTD., Hiroshima (JP)

(72) Inventors: Takashi Yonekura, Hiroshima (JP); Masao Tambara, Hiroshima (JP); Masashi Yoshikawa, Hiroshima (JP); Shinya Kanemori, Hiroshima (JP); Kazuki Yoshida, Hiroshima (JP)

(73) Assignee: PRIMETALS TECHNOLOGIES JAPAN, LTD., Tokyo (JP)

( * ) Notice: Subject to any disclaimer, the term of this patent is extended or adjusted under 35 U.S.C. 154(b) by 127 days.

(21) Appl. No.: 16/479,457

(22) PCT Filed: Apr. 14, 2017

(86) PCT No.: PCT/JP2017/015220
§ 371 (c)(1),
(2) Date: Jul. 19, 2019

(87) PCT Pub. No.: WO2018/189874
PCT Pub. Date: Oct. 18, 2018

(65) Prior Publication Data
US 2019/0390315 A1  Dec. 26, 2019

(51) Int. Cl.
*C23C 2/20* (2006.01)
*C23C 2/00* (2006.01)
(Continued)

(52) U.S. Cl.
CPC .............. *C23C 2/20* (2013.01); *B05B 12/084* (2013.01); *B05C 3/125* (2013.01); *B05C 11/06* (2013.01);
(Continued)

(58) Field of Classification Search
CPC .................................. C23C 2/20; C23C 2/003
See application file for complete search history.

(56) References Cited

U.S. PATENT DOCUMENTS 4,135,006 A * 1/1979 Readal ..................... G05D 5/03
427/10
5,518,772 A * 5/1996 Andachi ................ B05D 3/042
427/349
(Continued)

FOREIGN PATENT DOCUMENTS

JP   H06-33448 B2    5/1994
JP   H06-322504 A   11/1994
(Continued)

*Primary Examiner* — Karl Kurple
(74) *Attorney, Agent, or Firm* — Birch, Stewart, Kolasch & Birch, LLP

(57) ABSTRACT

When a portion for measuring the plating adhesion amount reaches an upstream side position, plating adhesion amount estimation values are calculated by using a plating adhesion amount estimation expression at positions away from a position that faces the distance sensors, that is, the upstream side position, by strip-width direction distances, of the surfaces of the steel strip. When the portion for measuring the plating adhesion amount reaches a downstream side position, the strip-width direction distances of the plating adhesion amount meters are matched to the strip-width direction distances, and the plating adhesion amount actual measurement values are obtained. The plating adhesion amount estimation expression is corrected on the basis of the differences between the plating adhesion amount estimation values and the plating adhesion amount actual measurement (Continued)

values. Accordingly, the control accuracy of the plating adhesion amount is improved.

7 Claims, 19 Drawing Sheets

(51) Int. Cl.
C23C 2/06 (2006.01)
B05C 11/10 (2006.01)
B05C 11/06 (2006.01)
B05D 1/18 (2006.01)
B05D 3/00 (2006.01)
G05D 5/03 (2006.01)
B05B 12/08 (2006.01)
B05C 3/12 (2006.01)
B05D 3/04 (2006.01)

(52) U.S. Cl.
CPC ...... B05C 11/1005 (2013.01); B05C 11/1021 (2013.01); B05D 1/18 (2013.01); B05D 3/007 (2013.01); C23C 2/003 (2013.01); C23C 2/006 (2013.01); G05D 5/03 (2013.01); B05C 11/1018 (2013.01); B05C 11/1023 (2013.01); B05D 3/042 (2013.01); C23C 2/06 (2013.01); Y10S 118/19 (2013.01)

(56) References Cited

U.S. PATENT DOCUMENTS

| | | | |
|---|---|---|---|
| 2004/0050323 A1* | 3/2004 | Chae | C23C 2/20 118/400 |
| 2004/0241336 A1* | 12/2004 | Brisberger | C23C 2/14 427/431 |
| 2014/0211361 A1* | 7/2014 | Kurisu | C23C 2/24 361/157 |
| 2017/0283929 A1* | 10/2017 | Fontaine | C23C 2/24 |
| 2017/0327936 A1* | 11/2017 | Ishigaki | B65H 23/188 |
| 2019/0194791 A1* | 6/2019 | Behrens | C23C 2/20 |
| 2020/0208247 A1* | 7/2020 | Kayama | C23C 2/40 |

FOREIGN PATENT DOCUMENTS

| | | | |
|---|---|---|---|
| JP | 2010-132953 A | 6/2010 |
| JP | 5131010 B2 | 1/2013 |
| JP | 5491843 B2 | 5/2014 |

* cited by examiner

FIG. 10

| DISTANCE SENSOR 74a | | PLATING ADHESION AMOUNT METER 53a | | DIFFERENCE Δ | DISTANCE SENSOR 74b | | PLATING ADHESION AMOUNT METER 53b | | DIFFERENCE Δ |
|---|---|---|---|---|---|---|---|---|---|
| TIME | PLATING ADHESION AMOUNT ESTIMATION VALUE | TIME | PLATING ADHESION AMOUNT ACTUAL MEASUREMENT VALUE | | TIME | PLATING ADHESION AMOUNT ESTIMATION VALUE | TIME | PLATING ADHESION AMOUNT ACTUAL MEASUREMENT VALUE | |
| t1 | We(74a,t1) | t1+T1 | W11(t1+T1) | Δ(74a,t1) | t1 | We(74b,t1) | t1+T1 | W12(t1+T1) | Δ(74b,t1) |
| t2 | We(74a,t2) | t2+T2 | W11(t2+T2) | Δ(74a,t2) | t2 | We(74b,t2) | t2+T2 | W12(t2+T2) | Δ(74b,t2) |
| t3 | We(74a,t3) | t3+T3 | W11(t3+T3) | Δ(74a,t3) | t3 | We(74b,t3) | t3+T3 | W12(t3+T3) | Δ(74b,t3) |
| t4 | We(74a,t4) | t4+T4 | W11(t4+T4) | Δ(74a,t4) | t4 | We(74b,t4) | t4+T4 | W12(t4+T4) | Δ(74b,t4) |
| .... | .... | .... | .... | .... | .... | .... | .... | .... | .... |

| DISTANCE SENSOR 74c | | PLATING ADHESION AMOUNT METER 53c | | DIFFERENCE Δ | DISTANCE SENSOR 74d | | PLATING ADHESION AMOUNT METER 53d | | DIFFERENCE Δ |
|---|---|---|---|---|---|---|---|---|---|
| TIME | PLATING ADHESION AMOUNT ESTIMATION VALUE | TIME | PLATING ADHESION AMOUNT ACTUAL MEASUREMENT VALUE | | TIME | PLATING ADHESION AMOUNT ESTIMATION VALUE | TIME | PLATING ADHESION AMOUNT ACTUAL MEASUREMENT VALUE | |
| t1 | We(74c,t1) | t1+T1 | W13(t1+T1) | Δ(74c,t1) | t1 | We(74d,t1) | t1+T1 | W14(t1+T1) | Δ(74d,t1) |
| t2 | We(74c,t2) | t2+T2 | W13(t2+T2) | Δ(74c,t2) | t2 | We(74d,t2) | t2+T2 | W14(t2+T2) | Δ(74d,t2) |
| t3 | We(74c,t3) | t3+T3 | W13(t3+T3) | Δ(74c,t3) | t3 | We(74d,t3) | t3+T3 | W14(t3+T3) | Δ(74d,t3) |
| t4 | We(74c,t4) | t4+T4 | W13(t4+T4) | Δ(74c,t4) | t4 | We(74d,t4) | t4+T4 | W14(t4+T4) | Δ(74d,t4) |
| .... | .... | .... | .... | .... | .... | .... | .... | .... | .... |

FIG. 11

| DISTANCE SENSOR 84a | | PLATING ADHESION AMOUNT METER 63a | | DIFFERENCE Δ | DISTANCE SENSOR 84b | | PLATING ADHESION AMOUNT METER 63b | | DIFFERENCE Δ |
|---|---|---|---|---|---|---|---|---|---|
| TIME | PLATING ADHESION AMOUNT ESTIMATION VALUE | TIME | PLATING ADHESION AMOUNT ACTUAL MEASUREMENT VALUE | | TIME | PLATING ADHESION AMOUNT ESTIMATION VALUE | TIME | PLATING ADHESION AMOUNT ACTUAL MEASUREMENT VALUE | |
| t1 | We(84a,t1) | t1+T1 | W21(t1+T1) | Δ(84a,t1) | t1 | We(84b,t1) | t1+T1 | W22(t1+T1) | Δ(84b,t1) |
| t2 | We(84a,t2) | t2+T2 | W21(t2+T2) | Δ(84a,t2) | t2 | We(84b,t2) | t2+T2 | W22(t2+T2) | Δ(84b,t2) |
| t3 | We(84a,t3) | t3+T3 | W21(t3+T3) | Δ(84a,t3) | t3 | We(84b,t3) | t3+T3 | W22(t3+T3) | Δ(84b,t3) |
| t4 | We(84a,t4) | t4+T4 | W21(t4+T4) | Δ(84a,t4) | t4 | We(84b,t4) | t4+T4 | W22(t4+T4) | Δ(84b,t4) |
| .... | .... | .... | .... | .... | .... | .... | .... | .... | .... |

| DISTANCE SENSOR 84c | | PLATING ADHESION AMOUNT METER 63c | | DIFFERENCE Δ | DISTANCE SENSOR 84d | | PLATING ADHESION AMOUNT METER 63d | | DIFFERENCE Δ |
|---|---|---|---|---|---|---|---|---|---|
| TIME | PLATING ADHESION AMOUNT ESTIMATION VALUE | TIME | PLATING ADHESION AMOUNT ACTUAL MEASUREMENT VALUE | | TIME | PLATING ADHESION AMOUNT ESTIMATION VALUE | TIME | PLATING ADHESION AMOUNT ACTUAL MEASUREMENT VALUE | |
| t1 | We(84c,t1) | t1+T1 | W23(t1+T1) | Δ(84c,t1) | t1 | We(84d,t1) | t1+T1 | W24(t1+T1) | Δ(84d,t1) |
| t2 | We(84c,t2) | t2+T2 | W23(t2+T2) | Δ(84c,t2) | t2 | We(84d,t2) | t2+T2 | W24(t2+T2) | Δ(84d,t2) |
| t3 | We(84c,t3) | t3+T3 | W23(t3+T3) | Δ(84c,t3) | t3 | We(84d,t3) | t3+T3 | W24(t3+T3) | Δ(84d,t3) |
| t4 | We(84c,t4) | t4+T4 | W23(t4+T4) | Δ(84c,t4) | t4 | We(84d,t4) | t4+T4 | W24(t4+T4) | Δ(84d,t4) |
| .... | .... | .... | .... | .... | .... | .... | .... | .... | .... |

FIG. 13

| STRIP WIDTH DIRECTION DIST. X31 FROM UPSTREAM SIDE EDGE POSITION Ed11 | | PLATING ADHESION AMOUNT METER 53a | | DIFFERENCE Δ | STRIP WIDTH DIRECTION DIST. X32 FROM UPSTREAM SIDE EDGE POSITION Ed11 | | PLATING ADHESION AMOUNT METER 53b | | DIFFERENCE Δ |
|---|---|---|---|---|---|---|---|---|---|
| TIME | PLATING ADHESION AMOUNT ESTIMATION VALUE | TIME | PLATING ADHESION AMOUNT ACTUAL MEASUREMENT VALUE | | TIME | PLATING ADHESION AMOUNT ESTIMATION VALUE | TIME | PLATING ADHESION AMOUNT ACTUAL MEASUREMENT VALUE | |
| t1 | We(X31F,t1) | t1+T1 | W11(t1+T1) | Δ(X31F,t1) | t1 | We(X32F,t1) | t1+T1 | W12(t1+T1) | Δ(X32F,t1) |
| t2 | We(X31F,t2) | t2+T2 | W11(t2+T2) | Δ(X31F,t2) | t2 | We(X32F,t2) | t2+T2 | W12(t2+T2) | Δ(X32F,t2) |
| t3 | We(X31F,t3) | t3+T3 | W11(t3+T3) | Δ(X31F,t3) | t3 | We(X32F,t3) | t3+T3 | W12(t3+T3) | Δ(X32F,t3) |
| t4 | We(X31F,t4) | t4+T4 | W11(t4+T4) | Δ(X31F,t4) | t4 | We(X32F,t4) | t4+T4 | W12(t4+T4) | Δ(X32F,t4) |
| .... | .... | .... | .... | .... | .... | .... | .... | .... | .... |

| STRIP WIDTH DIRECTION DIST. X33 FROM UPSTREAM SIDE EDGE POSITION Ed11 | | PLATING ADHESION AMOUNT METER 53c | | DIFFERENCE Δ | STRIP WIDTH DIRECTION DIST. X34 FROM UPSTREAM SIDE EDGE POSITION Ed11 | | PLATING ADHESION AMOUNT METER 53d | | DIFFERENCE Δ |
|---|---|---|---|---|---|---|---|---|---|
| TIME | PLATING ADHESION AMOUNT ESTIMATION VALUE | TIME | PLATING ADHESION AMOUNT ACTUAL MEASUREMENT VALUE | | TIME | PLATING ADHESION AMOUNT ESTIMATION VALUE | TIME | PLATING ADHESION AMOUNT ACTUAL MEASUREMENT VALUE | |
| t1 | We(X33F,t1) | t1+T1 | W13(t1+T1) | Δ(X33F,t1) | t1 | We(X34F,t1) | t1+T1 | W14(t1+T1) | Δ(X34F,t1) |
| t2 | We(X33F,t2) | t2+T2 | W13(t2+T2) | Δ(X33F,t2) | t2 | We(X34F,t2) | t2+T2 | W14(t2+T2) | Δ(X34F,t2) |
| t3 | We(X33F,t3) | t3+T3 | W13(t3+T3) | Δ(X33F,t3) | t3 | We(X34F,t3) | t3+T3 | W14(t3+T3) | Δ(X34F,t3) |
| t4 | We(X33F,t4) | t4+T4 | W13(t4+T4) | Δ(X33F,t4) | t4 | We(X34F,t4) | t4+T4 | W14(t4+T4) | Δ(X34F,t4) |
| .... | .... | .... | .... | .... | .... | .... | .... | .... | .... |

FIG. 14

| STRIP WIDTH DIRECTION DIST. X31 FROM UPSTREAM SIDE EDGE POSITION Ed11 | | PLATING ADHESION AMOUNT METER 63a | | DIFFERENCE Δ | STRIP WIDTH DIRECTION DIST. X32 FROM UPSTREAM SIDE EDGE POSITION Ed11 | | PLATING ADHESION AMOUNT METER 63b | | DIFFERENCE Δ |
|---|---|---|---|---|---|---|---|---|---|
| TIME | PLATING ADHESION AMOUNT ESTIMATION VALUE | TIME | PLATING ADHESION AMOUNT ACTUAL MEASUREMENT VALUE | | TIME | PLATING ADHESION AMOUNT ESTIMATION VALUE | TIME | PLATING ADHESION AMOUNT ACTUAL MEASUREMENT VALUE | |
| t1 | We(X31B,t1) | t1+T1 | W21(t1+T1) | Δ(X31B,t1) | t1 | We(X32B,t1) | t1+T1 | W22(t1+T1) | Δ(X32B,t1) |
| t2 | We(X31B,t2) | t2+T2 | W21(t2+T2) | Δ(X31B,t2) | t2 | We(X32B,t2) | t2+T2 | W22(t2+T2) | Δ(X32B,t2) |
| t3 | We(X31B,t3) | t3+T3 | W21(t3+T3) | Δ(X31B,t3) | t3 | We(X32B,t3) | t3+T3 | W22(t3+T3) | Δ(X32B,t3) |
| t4 | We(X31B,t4) | t4+T4 | W21(t4+T4) | Δ(X31B,t4) | t4 | We(X32B,t4) | t4+T4 | W22(t4+T4) | Δ(X32B,t4) |
| ···· | ···· | ···· | ···· | ···· | ···· | ···· | ···· | ···· | ···· |
| STRIP WIDTH DIRECTION DIST. X33 FROM UPSTREAM SIDE EDGE POSITION Ed11 | | PLATING ADHESION AMOUNT METER 63c | | DIFFERENCE Δ | STRIP WIDTH DIRECTION DIST. X34 FROM UPSTREAM SIDE EDGE POSITION Ed11 | | PLATING ADHESION AMOUNT METER 63d | | DIFFERENCE Δ |
| TIME | PLATING ADHESION AMOUNT ESTIMATION VALUE | TIME | PLATING ADHESION AMOUNT ACTUAL MEASUREMENT VALUE | | TIME | PLATING ADHESION AMOUNT ESTIMATION VALUE | TIME | PLATING ADHESION AMOUNT ACTUAL MEASUREMENT VALUE | |
| t1 | We(X33B,t1) | t1+T1 | W23(t1+T1) | Δ(X33B,t1) | t1 | We(X34B,t1) | t1+T1 | W24(t1+T1) | Δ(X34B,t1) |
| t2 | We(X33B,t2) | t2+T2 | W23(t2+T2) | Δ(X33B,t2) | t2 | We(X34B,t2) | t2+T2 | W24(t2+T2) | Δ(X34B,t2) |
| t3 | We(X33B,t3) | t3+T3 | W23(t3+T3) | Δ(X33B,t3) | t3 | We(X34B,t3) | t3+T3 | W24(t3+T3) | Δ(X34B,t3) |
| t4 | We(X33B,t4) | t4+T4 | W23(t4+T4) | Δ(X33B,t4) | t4 | We(X34B,t4) | t4+T4 | W24(t4+T4) | Δ(X34B,t4) |
| ···· | ···· | ···· | ···· | ···· | ···· | ···· | ···· | ···· | ···· |

FIG. 19

| STRIP WIDTH DIRECTION DIST. X41 FROM UPSTREAM SIDE EDGE POSITION Ed11 | | PLATING ADHESION AMOUNT METER 253 | | DIFFERENCE Δ | STRIP WIDTH DIRECTION DIST. X41 FROM UPSTREAM SIDE EDGE POSITION Ed11 | | PLATING ADHESION AMOUNT METER 263 | | DIFFERENCE Δ |
|---|---|---|---|---|---|---|---|---|---|
| TIME | PLATING ADHESION AMOUNT ESTIMATION VALUE | TIME | PLATING ADHESION AMOUNT ACTUAL MEASUREMENT VALUE | | TIME | PLATING ADHESION AMOUNT ESTIMATION VALUE | TIME | PLATING ADHESION AMOUNT ACTUAL MEASUREMENT VALUE | |
| t1 | We(X41F,t1) | t1+T1 | W10(t1+T1) | Δ(X41F,t1) | t1 | We(X41B,t1) | t1+T1 | W20(t1+T1) | Δ(X41B,t1) |
| t2 | We(X41F,t2) | t2+T2 | W10(t2+T2) | Δ(X41F,t2) | t2 | We(X41B,t2) | t2+T2 | W20(t2+T2) | Δ(X41B,t2) |
| t3 | We(X41F,t3) | t3+T3 | W10(t3+T3) | Δ(X41F,t3) | t3 | We(X41B,t3) | t3+T3 | W20(t3+T3) | Δ(X41B,t3) |
| t4 | We(X41F,t4) | t4+T4 | W10(t4+T4) | Δ(X41F,t4) | t4 | We(X41B,t4) | t4+T4 | W20(t4+T4) | Δ(X41B,t4) |
| ... | ... | ... | ... | ... | ... | ... | ... | ... | ... | ian
PLATING ADHESION AMOUNT CONTROL MECHANISM AND METHOD FOR CONTROLLING AN ADHESION AMOUNT BY COMPARING A PLATING ADHESION AMOUNT ESTIMATION VALUE AT AN UPSTREAM POSITION AND A PLATING ADHESION ACTUAL AMOUNT AT A DOWNSTREAM POSITION

TECHNICAL FIELD

The present invention relates to a plating coating amount control mechanism and a plating coating amount control method.

BACKGROUND ART

At a molten metal plating facility, a steel strip is immersed continuously in molten metal (e.g. molten zinc) stored in a plating tank, and then the steel strip is pulled up from the molten metal and transferred upward. Gas wiping nozzles blow gas onto the strip surfaces (front surface and back surface) of the steel strip that is transferred upward, and remove molten motel adhering to the front surface and the back surface. At this time, the amount of molten metal adhering to the steel strip is adjusted by controlling the nozzle-strip distance between the gas wiping nozzles and the steel strip, the blowing pressure of the blown gas, and the strip passing speed of the steel strip. The nozzle-strip distance is detected by a distance sensor disposed near the gas wiping nozzles.

The steel strip is transferred further upward from the arrangement position of the gas wiping nozzles. When the steel strip reaches the upper setting position, the transferring direction of the steel strip is changed to the horizontal direction, and then to the downward direction. Then, when the steel strip reaches the lower setting position, the transferring direction of the steel strip is changed to the horizontal direction. As the steel strip is transferred as described above, the molten metal adhering to the steel strip hardens, and thereby metal plating layers are formed on the front surface and the back surface of the steel strip.

The adhesion amount (plating adhesion amount) of the metal plating layers formed on the front surface and the back surface of the steel strip is measured by a plating adhesion amount meter. The plating adhesion amount meter is positioned downstream of the arrangement position of the gas wiping nozzles with respect to the transferring direction of the steel strip (e.g. several tens to hundreds of meters downstream). For instance, the plating adhesion meter is positioned at a position where the steel strip is transferred in the horizontal direction after being transferred to the upper arrangement position to the lower arrangement position.

The plating adhesion amount meter is a fluorescence X-ray adhesion amount meter, for instance, and measures the plating adhesion amount of the front surface and the back surface of the steel strip. When measuring, for instance, the plating adhesion amount (plating adhesion amount actual measurement value) is obtained by positioning the plating adhesion amount meter at a single location in the strip with direction of the steel strip, or by calculating measurement values measured by plating adhesion amount meters positioned at three different locations in the strip with direction of the steel strip (e.g. average calculation).

The plating adhesion amount is controlled by controlling the nozzle-strip distance between the gas wiping nozzles and the steel strip, the blowing pressure of gas blown by the gas wiping nozzles, and the strip passing speed of the steel strip, so as to adjust the amount of molten metal that adheres to the steel strip.

Thus, typically, to match the plating adhesion amount actual measurement value to a pre-set plating adhesion amount target value, the following control operation is carried out.

(1) Generate an estimated model expression of the plating adhesion amount preliminarily on the basis of data obtained during many actual operations in the past. The estimated model expression of the plating adhesion amount is a function expression including the following arithmetic elements: the nozzle-strip distance H [mm] between the gas wiping nozzles and the steel strip; the blow pressure P [kPa] of gas blown from the gas wiping nozzles; and the strip passing speed V [m/min] of the steel strip. Further, the estimated model expression of the plating adhesion amount expresses the relationship between the plating adhesion amount estimation value We [g/m$^2$] and the arithmetic elements (H, P, V).

To control the plating adhesion amount, the nozzle-strip distance H, the gas blow pressure P, and the strip passing speed V of the steel strip are obtained on the basis of the estimation model expression of the plating adhesion amount, so as to match the plating adhesion amount estimation value to the plating adhesion amount target value (the adhesion amount of the plating that should adhere to the steel strip S). Further, in a state where the nozzle-strip distance H [mm], the gas blow pressure P [kPa], and the strip passing speed V [m/min] are set to the arithmetic values (H, P, V) obtained on the basis of the estimation model expression of plating adhesion amount, the control operation of the plating adhesion amount is started.

At the time of actual operation after starting the control operation of the plating adhesion amount, the difference between the plating adhesion amount actual measurement value and the plating adhesion amount target value is obtained, and coefficients of the estimation model expression of plating adhesion amount are adjusted to the optimum so as to change the difference to zero (learning control).

On the basis of the estimation model expression of the plating adhesion amount whose coefficients are adjusted to the optimum, the nozzle-plate distance, the gas blow pressure, and the strip passing speed are reconfigured, and then the control operation of the plating adhesion amount is carried out. Accordingly, the accuracy of the estimation model expression of the plating adhesion amount improves and the control of the plating adhesion amount improves further.

Furthermore, while the control operation of the plating adhesion amount is carried out, it is possible to calculate the plating adhesion amount estimation value We by detecting the values of the arithmetic elements (H, P, V) at the time of actual operation and substituting the detected values of the arithmetic elements (H, P, V) into the estimation model expression of the plating adhesion amount.

(2) Generate a plating adhesion amount database preliminarily, which contains a corresponding relationship between "the plating adhesion amount estimation value", and "the nozzle-strip distance between the gas wiping nozzle and the steel strip, the blow pressure of gas blown from the gas wiping nozzle, and the strip passing speed of the steel strip", on the basis of data obtained during many actual operations in the past.

To control the plating adhesion amount, the nozzle-strip distance H, the gas blow pressure P, and the strip passing speed V of the steel strip are obtained referring to the plating adhesion amount database, so as to match the plating adhesion amount estimation value to the plating adhesion amount target value. In a state where the arithmetic elements (H, P, V) are at values obtained as described above, the control operation of the plating adhesion amount is started. After starting the control operation of the plating adhesion amount, the difference between the plating adhesion amount actual measurement value and the plating adhesion amount target value is obtained, and the plating adhesion amount database is adjusted to the optimum so as to change the difference to zero (learning control).

On the basis of the plating adhesion amount database that is adjusted to the optimum as described above, the nozzle-plate distance, the gas blow pressure, and the strip passing speed are reconfigured, and then the control operation of the plating adhesion amount is carried out. Accordingly, the accuracy of the plating adhesion amount database improves and the control of the plating adhesion amount improves further.

(3) The control operation of the plating adhesion amount is started after initially setting the nozzle-strip distance between the gas wiping nozzles and the steel strip, the blowing pressure of gas blown by the gas wiping nozzles, and the strip passing speed of the steel strip so that the plating adhesion amount estimation value matches the plating adhesion amount target value. After starting the control operation of the plating adhesion amount, the difference between the plating adhesion amount actual measurement value and the plating adhesion amount target value is obtained, and the gas blow pressure, the nozzle-strip distance, and the strip passing speed are controlled by feedback so that the difference becomes zero.

CITATION LIST

Patent Literature

Patent Document 1: JP5491843B
Patent Document 2: JPH6-33448B
Patent Document 3: JP2010-132953A
Patent Document 4: JPH6-322504A
Patent Document 5: JP5131010B

SUMMARY

Problems to be Solved

Meanwhile, in the above typical technique, of the position with respect to the strip with direction of the steel strip, the position in the strip width direction at which the plating adhesion amount estimation amount is obtained (e.g. the arrangement position of the distance sensor for measuring the nozzle-strip distance in the strip width direction) and the position with respect to the strip width direction at which the plating adhesion amount actual measurement value is measured (e.g. the arrangement position of the plating adhesion amount meter in the strip width direction) are not necessarily the same. Thus, the plating adhesion amount cannot be controlled with high accuracy even with the control using the estimation model expression of the plating adhesion amount, the control using the plating adhesion amount database, or the feedback control. Furthermore, the accuracy is not high enough also in the learning control of the estimation model expression of the plating adhesion amount and the plating adhesion amount database.

Furthermore, in a molten metal plating facility, the steel strip may meander when being transferred. When such meandering occurs, the control accuracy of the plating adhesion amount deteriorates, also due to the unmatching positions in the strip width direction of the estimation position of the plating adhesion amount estimation value and the measurement position of the plating adhesion amount actual measurement value.

Furthermore, in some cases, a plurality of continuous steel strips may be put into the molten metal plating facility. Such a plurality of steel strips include a precedent steel strip and a subsequent steel strip that has a different strip thickness and mechanical characteristics than the precedent steel strip, and the front end of the subsequent steel strip is welded to the rear end of the precedent steel strip. Furthermore, in some cases, it is necessary to differentiate the plating adhesion amount of the precedent steel strip from the plating adhesion amount of the subsequent steel strip. In this case, it is necessary to change the gas blow pressure or the like quickly once the joint between the precedent steel strip and the subsequent steel strip passes the arrangement position of the gas wiping nozzles, to change the amount of molten metal that adheres to the subsequent steel strip.

However, typically, also due to the unmatching positions in the strip width direction of the estimation position of the plating adhesion amount estimation value and the measurement position of the plating adhesion amount actual measurement value, the response speed for changing the plating adhesion amount is slow during the control to change the gas blow pressure immediately after the joint passes the arrangement position of the gas wiping nozzles.

In view of the above prior art, an object of the present invention is to provide a plating adhesion amount control mechanism and a plating adhesion amount control method, whereby it is possible to match the estimation portion at which the plating adhesion amount estimation value is estimated and the measurement portion at which the plating adhesion amount actual measurement value is measured, of the surfaces of the steel strip, and thereby improve the control accuracy of the plating adhesion amount.

Solution to the Problems

A plating adhesion amount control mechanism according to the present invention that solves the above problem includes: a pair of gas wiping nozzles disposed such that a steel strip pulled up from a plating tank is transferred through therebetween, the gas wiping nozzles being configured to blow gas onto the steel strip; a distance sensor disposed at an upstream side position preliminarily determined with respect to a transferring direction of the steel strip, the distance sensor being configured to detect a nozzle-strip distance which is a distance between the gas wiping nozzles and a strip surface of the steel strip; an upstream-side edge sensor disposed at the upstream side position with respect to the transferring direction of the steel strip and configured to detect an upstream-side edge position which is an edge position of the steel strip; a downstream-side edge sensor disposed at a downstream side position which is a position downstream of the upstream side position with respect to the transferring direction of the steel strip and configured to detect a downstream-side edge position which is an edge position of the steel strip; a plating adhesion amount meter disposed at the downstream side position with respect to the transferring direction of the steel strip and configured to detect a plating adhesion amount of a metal plating layer formed on the steel strip and output a plating adhesion amount actual measurement value; and a plating adhesion amount control part having a plating adhesion amount estimation expression for calculating a plating adhesion amount estimation value of a measurement surface portion which is a position on a surface of the steel strip being transferred at which the plating adhesion amount is to be measured, using following arithmetic elements at the time when the measurement surface portion passes the upstream side position: the nozzle-strip distance; a blowing pressure of the gas; a strip passing speed of the steel strip; and a specific strip width direction distance between the upstream-side edge position and the measurement surface portion which has an equal relationship with a distance in a strip width direction between the downstream-side edge position and the measurement surface portion. The plating adhesion amount control part is configured to obtain a difference between the plating adhesion amount estimation value which is calculated when the measurement surface portion passes the upstream side position and the plating adhesion amount actual measurement value detected in a state where the plating adhesion amount meter faces the measurement surface portion when the measurement surface portion passes the downstream side position, and correct the plating adhesion amount estimation expression so as to reduce the difference to zero.

A plating adhesion amount control method includes: blowing gas onto the steel strip using a pair of gas wiping nozzles disposed such that a steel strip pulled up from a plating tank is transferred through therebetween; detecting a nozzle-strip distance which is a distance between the gas wiping nozzles and a strip surface of the steel strip at an upstream side position determined preliminarily with respect to a transferring direction of the steel strip; detecting an upstream-side edge position which is an edge position of the steel strip at the upstream side position with respect to the transferring direction of the steel strip; detecting a downstream-side edge position which is an edge position of the steel strip at a downstream side position which is a position downstream of the upstream side position with respect to the transferring direction of the steel strip; obtaining a plating adhesion amount actual measurement value by detecting a plating adhesion amount of a metal plating layer formed on the steel strip at the downstream side position with respect to the transferring direction of the steel strip by using a plating adhesion amount meter; calculating a plating adhesion amount estimation value of a measurement surface portion which is a position on a surface of the steel strip being transferred at which the plating adhesion amount is to be measured, using following arithmetic elements at the time when the measurement surface portion passes the upstream side position: the nozzle-strip distance; a blow pressure of the gas; a strip passing speed of the steel strip; and a specific strip width direction distance between the upstream-side edge position and the measurement surface portion which has an equal relationship with a distance in a strip width direction between the downstream-side edge position and the measurement surface portion; and obtaining a difference between the plating adhesion amount estimation value which is calculated when the measurement surface portion passes the upstream side position and the plating adhesion amount actual measurement value detected in a state where the plating adhesion amount meter faces the measurement surface portion when the measurement surface portion passes the downstream side position, and correcting the plating adhesion amount estimation expression so as to reduce the difference to zero.

Advantageous Effects

According to the present invention, it is possible match the estimation portion (measurement surface portion) at which the plating adhesion amount estimation value is estimated and the measurement portion (measurement surface portion) at which the plating adhesion amount actual measurement value is measured, and thereby it is possible to improve the control accuracy of the plating adhesion amount.

BRIEF DESCRIPTION OF DRAWINGS

FIG. 10 is a view showing, as a table, the difference between the plating adhesion amount estimation value and the plating adhesion amount actual measurement value on the front-surface side in the first working example.

FIG. 11 is a view showing, as a table, the difference between the plating adhesion amount estimation value and the plating adhesion amount actual measurement value on the back-surface side in the first working example.

FIG. 13 is a view showing, as a table, the difference between the plating adhesion amount estimation value and the plating adhesion amount actual measurement value on the front-surface side in the second working example.

FIG. 14 is a view showing, as a table, the difference between the plating adhesion amount estimation value and the plating adhesion amount actual measurement value on the back-surface side in the second working example.

FIG. 19 is a view showing, as a table, the difference between the plating adhesion amount estimation value and the plating adhesion amount actual measurement value in the third working example.

DETAILED DESCRIPTION

Working examples of the present invention will now be described in detail on the basis of the working examples.

Figure 9:
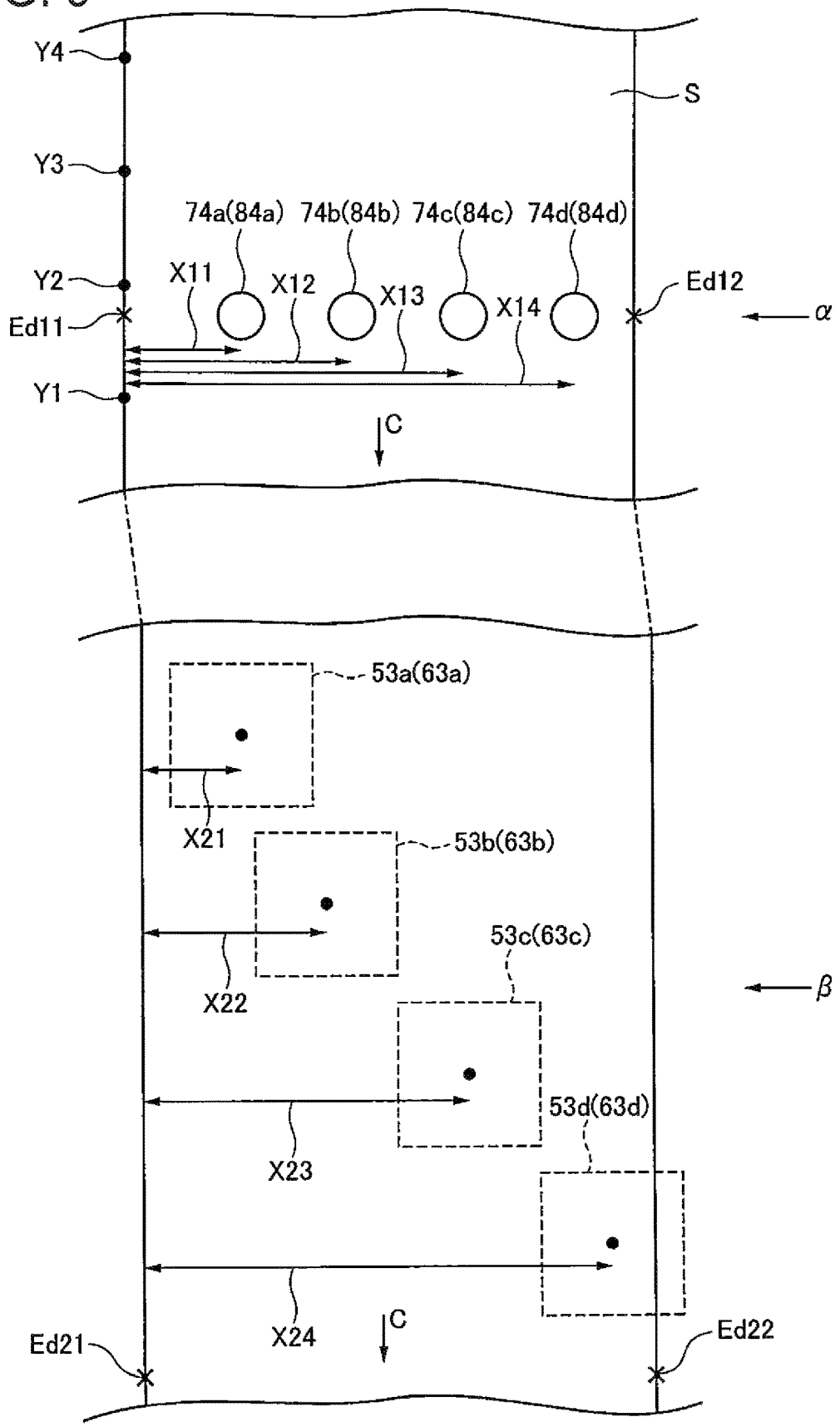
FIG. 9 is a development view showing the transferring state of the steel strip in the first working example.
Figure 12:
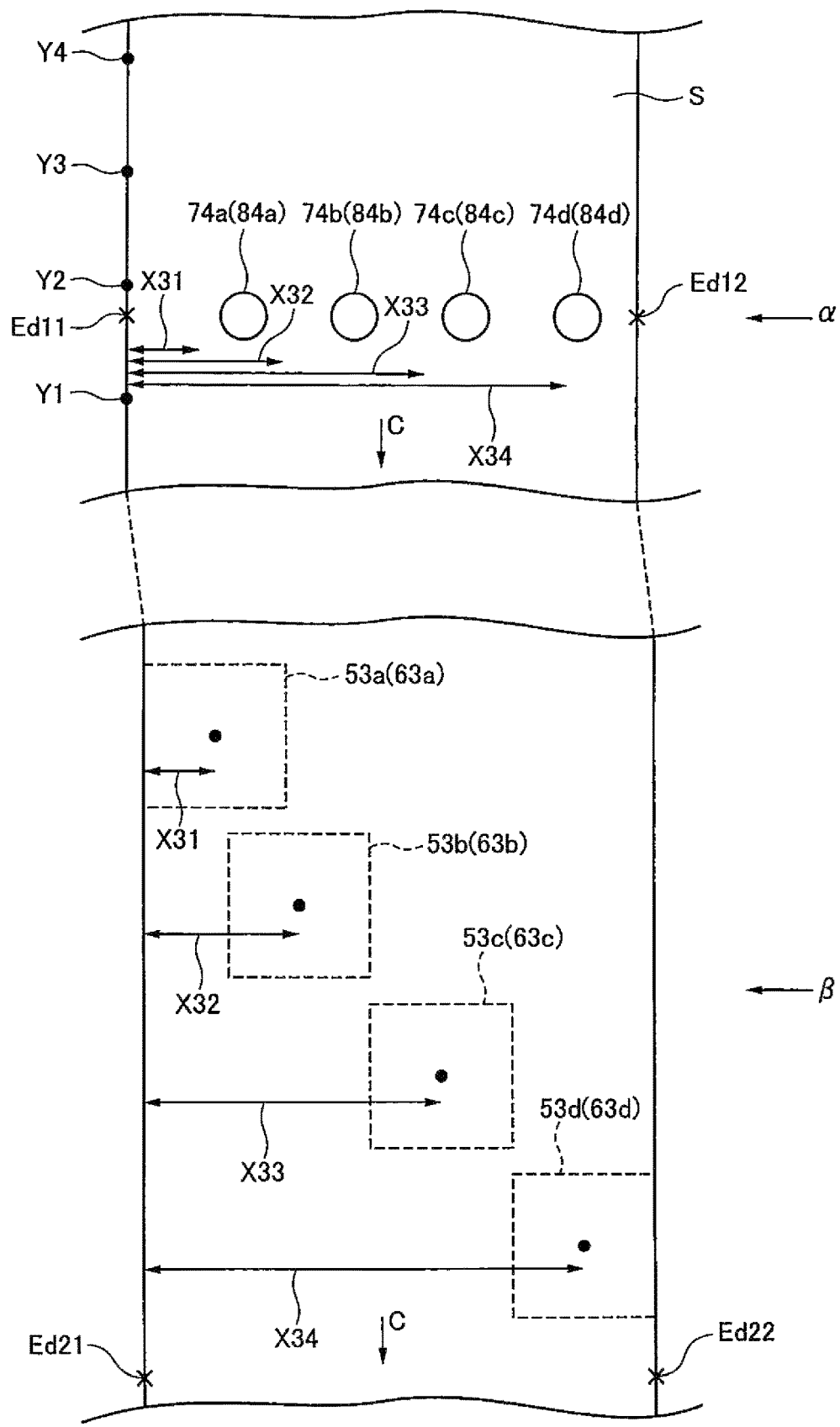
FIG. 12 is a development view showing the transferring state of the steel strip in the second working example.
Figure 18:
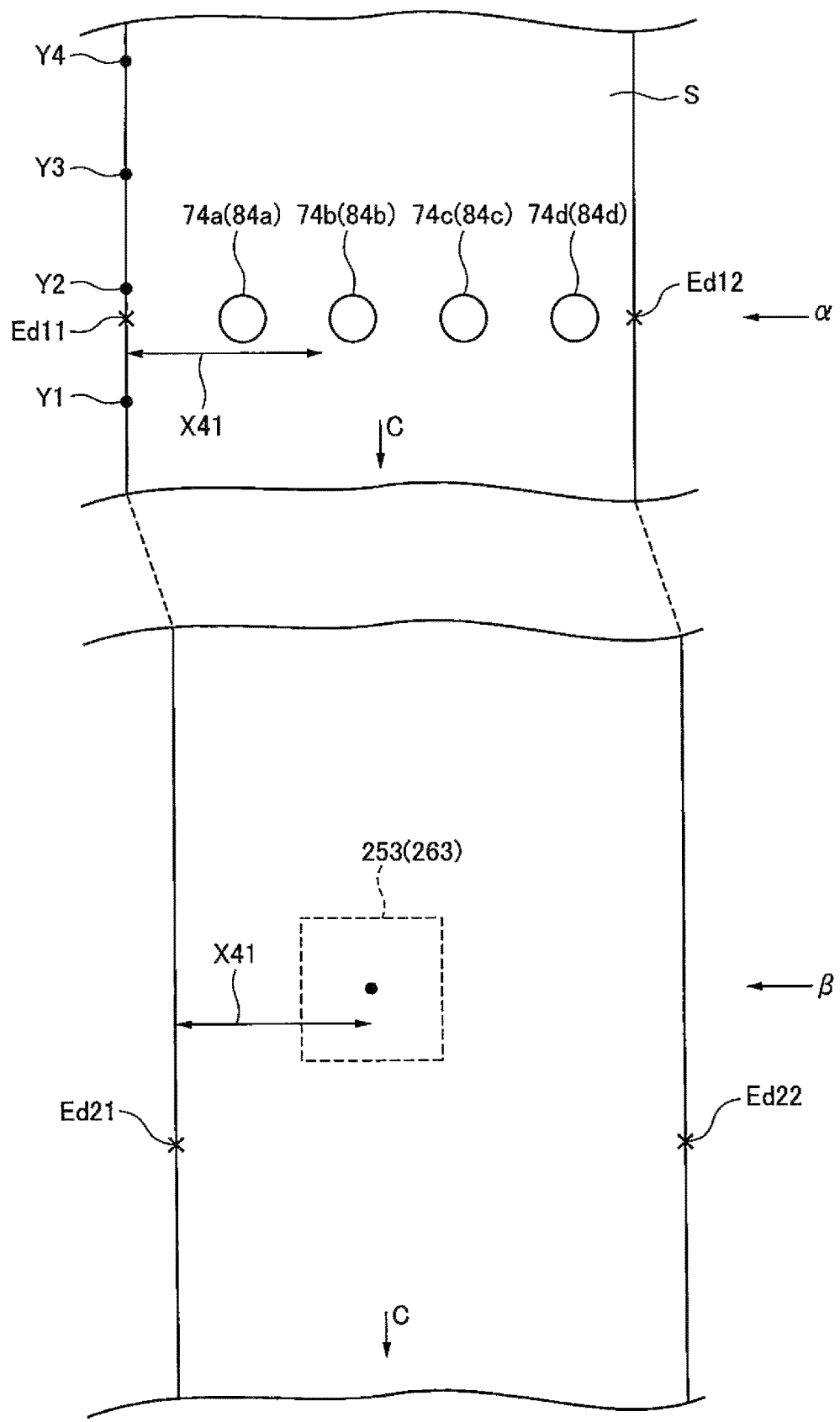
FIG. 18 is a development view showing the transferring state of the steel strip in the third working example.

In FIGS. 9, 12 and 18, plating adhesion amount meters 53a-53d, 63a-63d, 253 and 263 are represented by dashed squares, respectively, and a round point shown at the center of each square represents a measurement surface portion.

First Working Example

A plating adhesion amount control mechanism and a plating adhesion amount control method according to the first working example of the present invention to be applied to a molten metal plating facility will be described together with a molten metal plating facility.

(Overall Configuration of the Molten Metal Plating Facility)

First, the overall configuration of the molten metal plating facility will be described.

Figure 1:
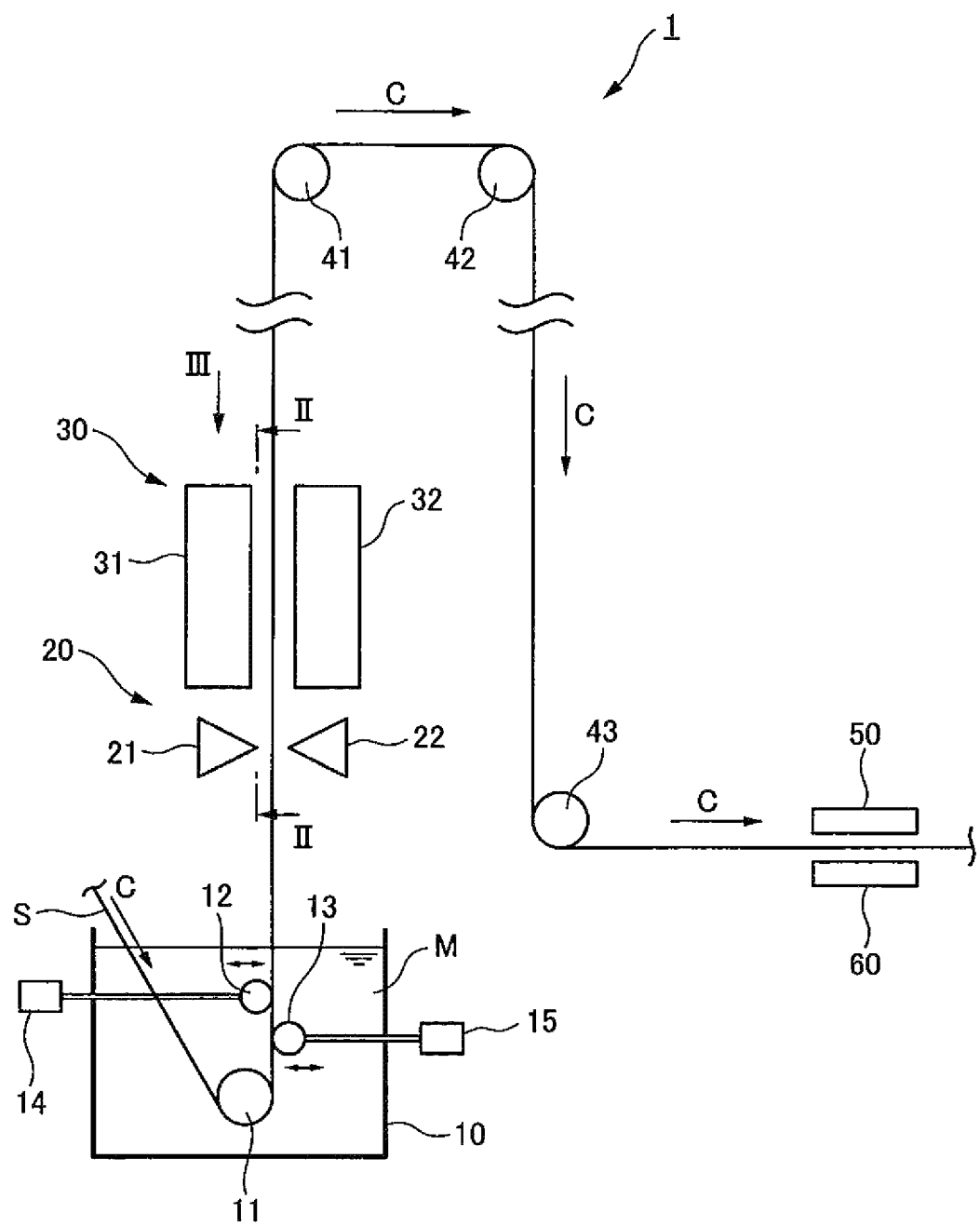
FIG. 1 is a configuration view showing a molten metal plating facility.

As shown in FIG. 1, the molten metal plating facility 1 includes a plating tank 10 storing molten metal M. As the steel strip S sent into the molten metal plating facility 1 is passes through the inside of the plating tank 10 (molten metal M) to be transferred, the molten metal M adheres to the steel strip S.

A sink roller 11 and in-tank rollers 12, 13 are disposed in the plating tank 10 and supported rotatably. The sink roller 11 changes the transferring direction C of the steel strip S being transferred through the plating tank 10 (molten metal M), and the steel strip S is transferred upward.

The in-tank rollers 12, 13 are disposed such that the steel strip S is therebetween, that is, so as to face the front surface and the back surface of the steel strip S, respectively. Roller moving motors 14, 15 are connected to the in-tank rollers 12, 13, respectively. By driving the roller moving motors 14, 15, it is possible to move the in-tank rollers 12, 13 in directions closer to and away from the steel strip S, with respect to the steel strip S. By moving the in-tank rollers 12, 13 while the roller moving motors 14, 15 are driven so that the in-tank rollers 12, 13 are in contact with the steel strip S, it is possible to adjust the shape of the steel strip S in the strip width direction and the pass line (strip passing position) of the steel strip S.

A gas wiping nozzle device 20 is disposed above the plating tank 10. The gas wiping nozzle device 20 includes a gas wiping nozzle 21 and a gas wiping nozzle 22 disposed such that the steel strip S being pulled up from the plating tank 10 and transferred between the gas wiping nozzle 21 and the gas wiping nozzle 22. The gas wiping nozzle 21 is disposed so as to face the front surface of the steel strip S, and the gas wiping nozzle 22 is disposed so as to face the back surface of the steel strip S.

The gas wiping nozzles 21, 22 blow gas onto the front surface and the back surface of the steel strip S and wipe off extra molten metal M adhering to the steel strip S. The adhesion amount of the metal plating layer to be formed on the steel strip S (plating adhesion amount) is adjusted by changing the distance between the gas wiping nozzles 21, 22 and the steel strip S (nozzle-strip distance) or the blowing pressure of gas blown by the gas wiping nozzles 21, 22, and changing the amount of molten metal that adheres to the steel strip S. Furthermore, the plating adhesion amount can be also adjusted by changing the strip passing speed of the steel strip S and changing the adhesion amount of the molten metal M.

A strip warp correction device 30 that corrects the strip shape of the steel strip is disposed above the gas wiping nozzle device 20. The strip warp correction device 30 includes a correction unit 31 and a correction unit 32 positioned on either side of the steel strip S. The correction unit 31 is disposed so as to face the front surface of the steel strip S, and the correction unit 32 is disposed so as to face the back surface of the steel strip S. The correction units 31, 32 correct the shape of the steel strip S in the strip width direction (warp correction) and reduce vibration of the steel strip S (vibration control) by applying a magnetic attractive force to the steel strip S. The structure of the strip warp correction device 30 will be described later in detail.

The steel strip S transferred further upward from the strip warp correction device 30 is wound around the first top roller 41 and has its transferring direction C changed to the horizontal direction, and then wound around the second top roller 42 and has its transferring direction C changed to the downward direction. The steel strip S that is transferred downward is wound around a roller 43 and has its transferring direction C changed into the horizontal direction.

At the downstream side of the roller 43, a plating adhesion amount measurement device 50 is disposed so as to face the front surface of the steel strip S that is transferred in the horizontal direction, and a plating adhesion amount measurement device 60 is disposed so as to face the back surface of the steel strip S that is transferred in the horizontal direction. The structures of the plating adhesion amount measurement devices 50, 60 will be described later in detail.

(Configuration of the Strip Warp Correction Device)

Herein, the configuration of the strip warp correction device 30 will be described with reference to FIG. 2, which is a II-II arrow view of FIG. 1, and to FIG. 3, which is a III arrow view of FIG. 1.

Figure 2:
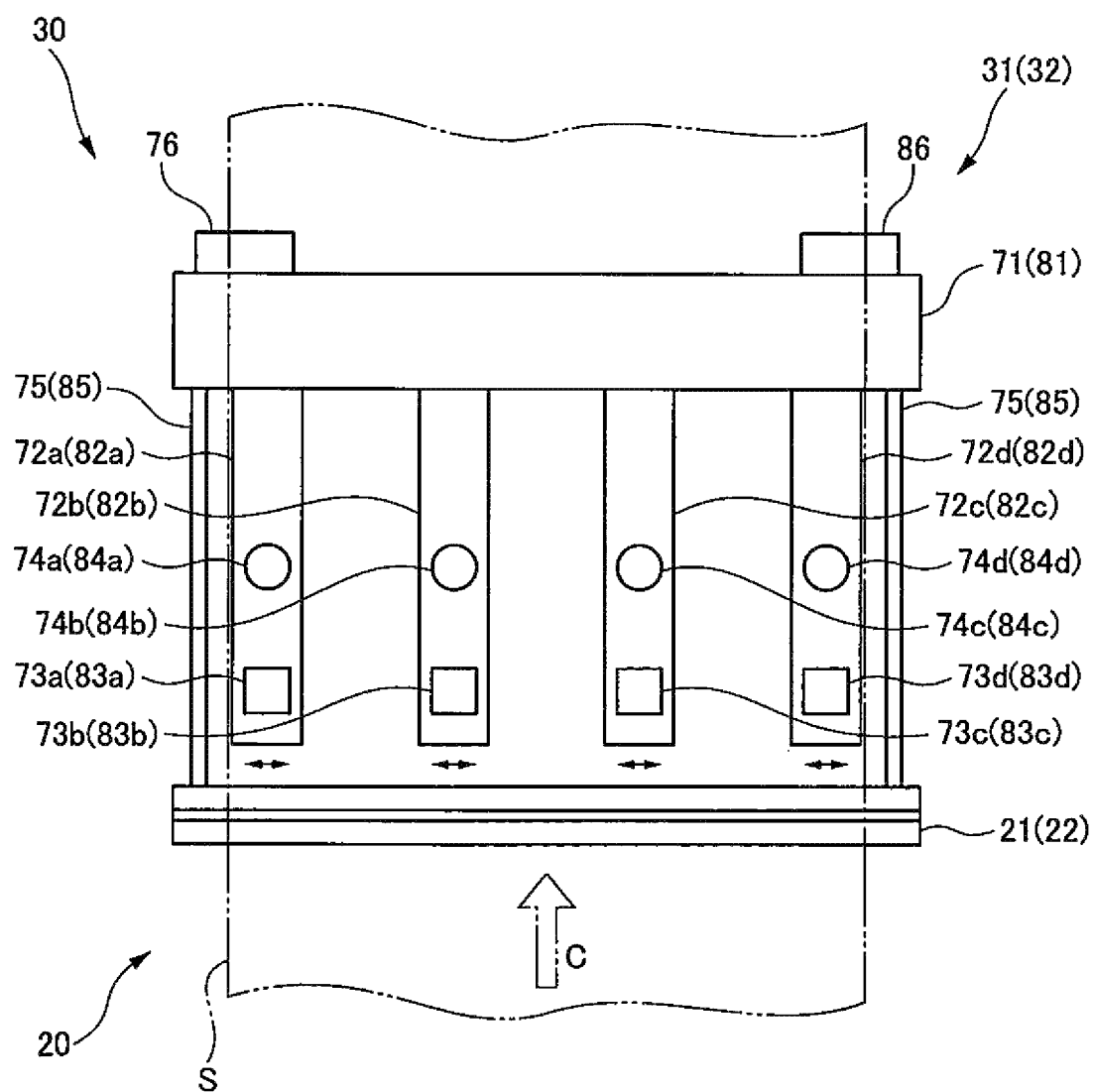
FIG. 2 is a II-II arrow view of FIG. 1, showing a strip warp correction device and a gas wiping nozzle device.
Figure 3:
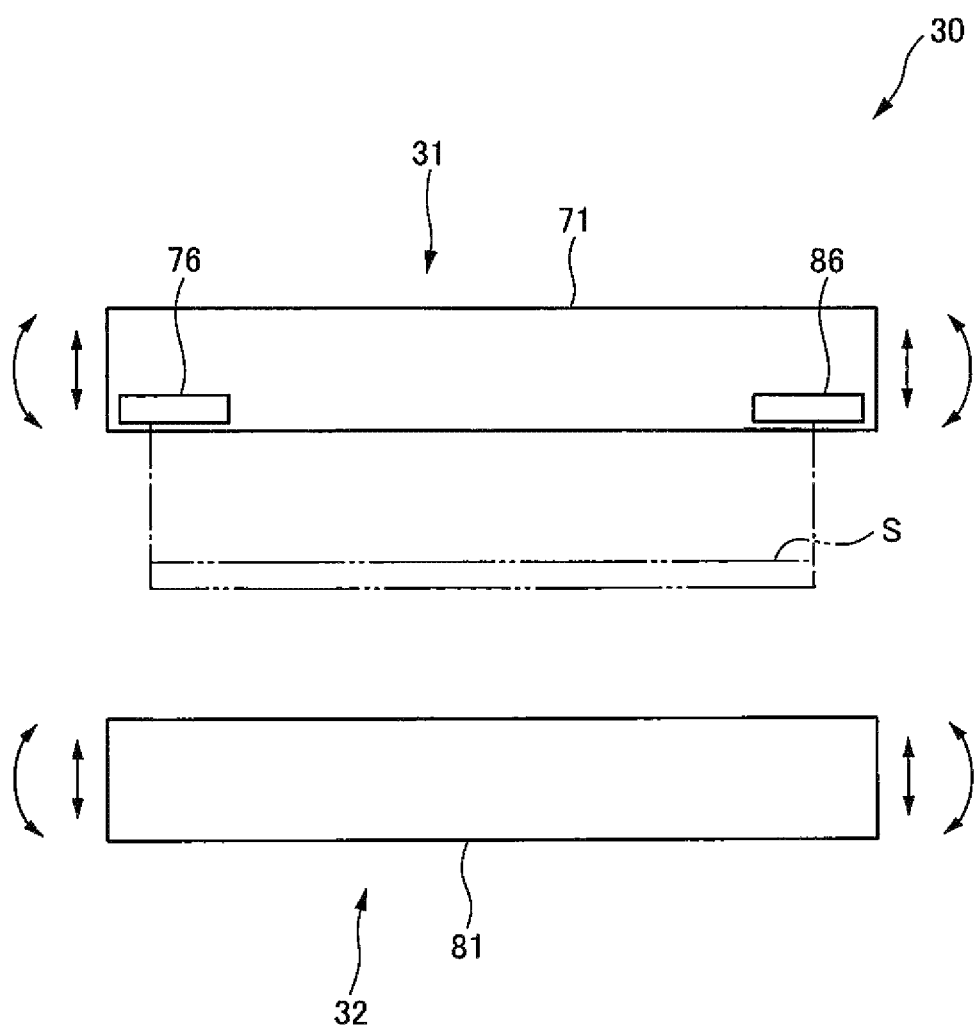
FIG. 3 is a III arrow view of FIG. 1, showing a strip warp correction device.

As depicted in FIGS. 2 and 3, the correction unit 31 includes a support frame 71 that extends in the strip width direction and faces the steel strip S. The support frame 71 has a structure that is movable within the horizontal plane. Thus, the entire correction unit 31 including the support frame 71 can move closer to and away from the steel strip S, and skew within the horizontal plane.

As depicted in FIG. 2, the support frame 71 includes a plurality of (in FIG. 2, four) movable blocks 72a, 72b, 72c, 72d arranged in the strip width direction of the steel strip S. Each of the movable blocks 72a, 72b, 72c, 72d has a structure that is movable individually in the longitudinal direction of the support frame 71 (strip width direction of the steel strip S).

The movable blocks 72a, 72b, 72c, 72d include electromagnets 73a, 73b, 73c, 73d that apply magnetic attractive forces to the steel strip S, and distance sensors 74a, 74b, 74c, 74d that detect distances to the steel strip S. Thus, the plurality of distance sensors 74a, 74b, 74c, 74d are arranged in the strip width direction. The distance sensors 74a, 74b, 74c, 74d may be, for instance, eddy-current type sensors.

Furthermore, as depicted in FIG. 2, the gas wiping nozzle 21 is coupled to the support frame 71 via a connection frame 75 disposed on the opposite end portions of the support frame 71. That is, the gas wiping nozzle 21 is incorporated into the correction unit 31. Thus, as the support frame 71 (correction unit 31) moves within the horizontal plane, the gas wiping nozzle 21 also moves within the horizontal plane in accordance with movement of the support frame 71 (correction unit 31).

Furthermore, the gas wiping nozzle 21 has a structure that is movable toward and away from the steel strip S within the horizontal plane, with respect to the support frame 71. Thus, the gas wiping nozzle 21 can move toward and away from the steal strip S through movement of the support frame 71 (correction unit 31) within the horizontal plane and also through movement of the gas wiping nozzle 21 itself within the horizontal plane with respect to the support frame 71 independently from movement of the support frame 71 (correction unit 31).

As depicted in FIGS. 2 and 3, the correction unit 32 has a similar configuration to that of the correction unit 31. That is, the correction unit 32 includes a support frame 81, movable blocks 82a, 82b, 82c, 82d, electromagnets 83a, 83b, 83c, 83d, and distance sensors 84a, 84b, 84c, 84d. The movable blocks 82, 82b, 82c, 82d of the correction unit 32 move in the longitudinal direction of the support frame 81 (strip width direction of the steel strip S), while always facing the movable blocks 72a, 72b, 72c, 72d of the correction unit 31 across the steel strip S.

Furthermore, the gas wiping nozzle 22 is coupled to the support frame 81 via the connection frame 85. That is, the gas wiping nozzle 22 is incorporated into the correction unit 32. Furthermore, the gas wiping nozzle 22 has a structure that is movable toward and away from the steel strip S within the horizontal plane, with respect to the support frame 81.

As depicted in FIGS. 2 and 3, the strip warp correction device 30 includes upstream-side edge sensors 76, 86 that detect the positions of the edge portions of the steel strip S with respect to the strip width direction. The edge sensor 76 is disposed on the first end portion of the support frame 71 of the correction unit 31. The edge sensor 76 detects the edge position of the first side of the steel strip S with respect to the strip width direction. The other edge sensor 86 is disposed on the second end portion of the support frame 71 of the correction unit 31. The edge sensor 86 detects the edge position of the second side of the steel strip S with respect to the strip width direction. As described above, the edge sensors 76, 86 disposed on the correction unit 31 detect the opposite end portions of the steel strip S in the strip width direction.

The upstream-side edge sensor 76 may be disposed on the support frame 71 and the upstream-side edge sensor 86 may be disposed on the support frame 81. Alternately, the upstream-side edge sensors 76, 86 may be disposed on the support frame 81.

(Configuration of the Plating Adhesion Amount Measuring Device)

Next, the configurations of the plating adhesion amount measurement devices 50, 60 will be described with reference to FIG. 4, which is a planar view, and to FIG. 5, which is a V-V cross-sectional view of FIG. 4. At the arrangement position of the plating adhesion amount measuring devices 50, 60, the steel strip S is transferred in the horizontal direction.

Figure 4:
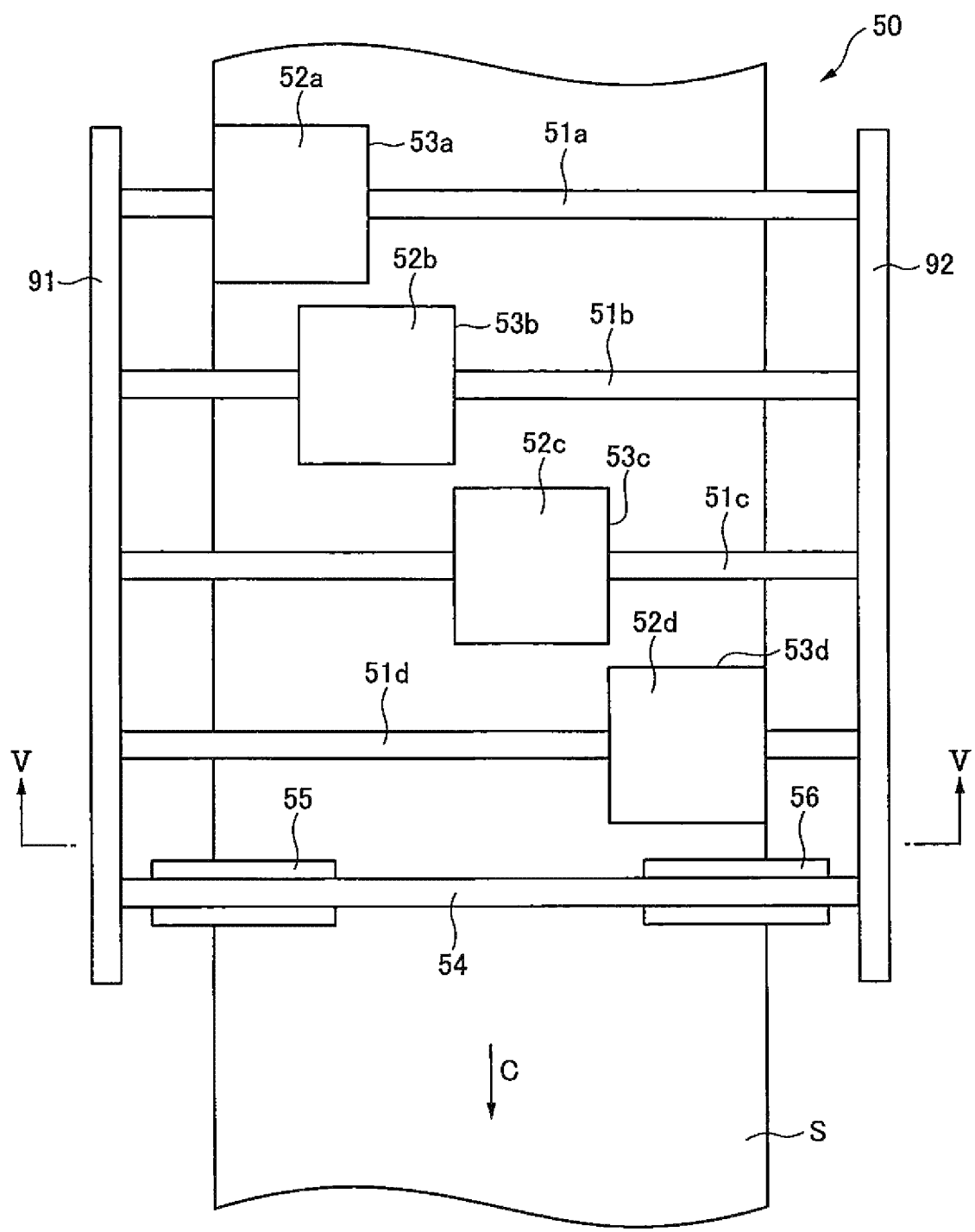
FIG. 4 is a planar view showing a plating adhesion amount measuring device.
Figure 5:
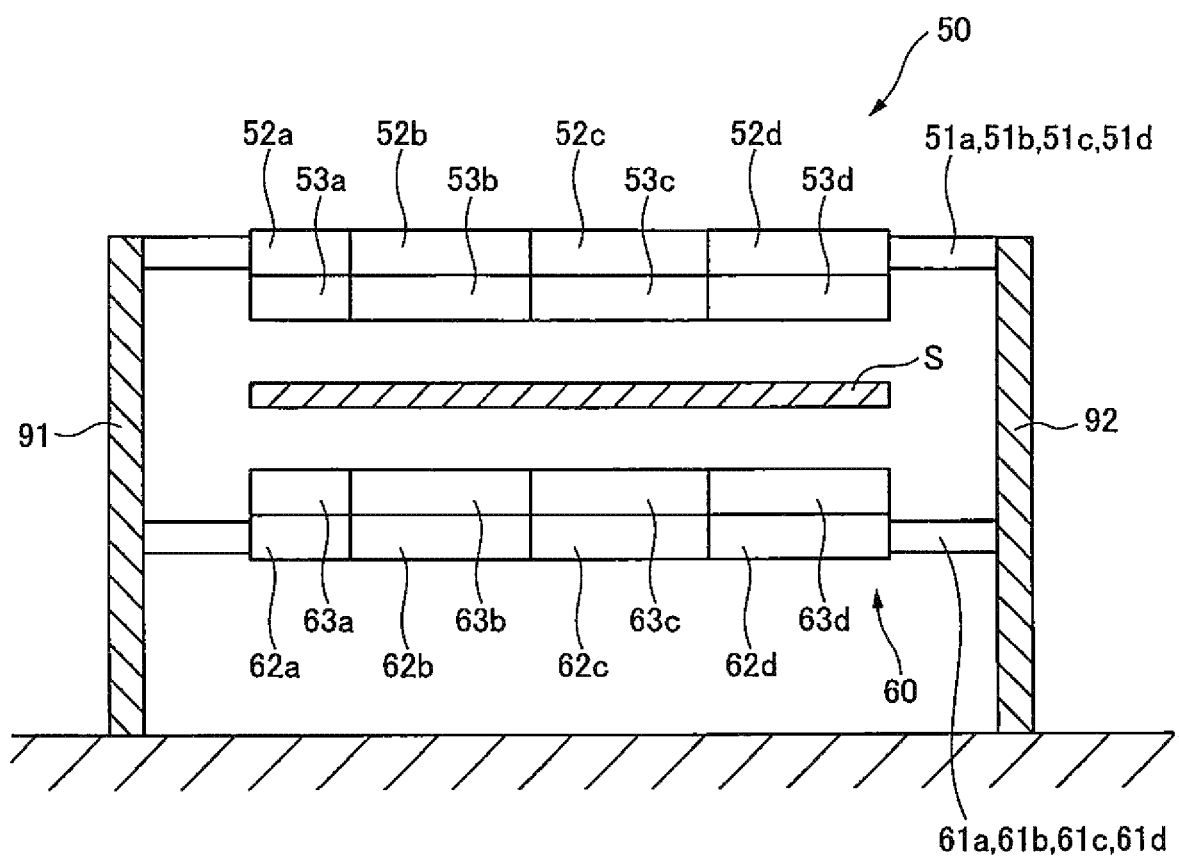
FIG. 5 is a V-V cross-sectional view of FIG. 4.

As depicted in FIGS. 4 and 5, the support structures 91, 92 are disposed fixedly and separate from one another across the transferring position of the steel strip S.

The plating adhesion amount measurement device 50 includes guide rails 51a, 51b, 51c, 51d mounted across the support structures 91, 92 at positions offset in the transferring direction C of the steel strip S. A movable body 52a that is movable in the strip width direction of the steel strip S is disposed on the guide rail 51a. A plating adhesion amount meter 53a is attached to the bottom surface of the movable body 52a. A movable body 52b that is movable in the strip width direction of the steel strip S is disposed on the guide rail 51b. A plating adhesion amount meter 53b is attached to the bottom surface of the movable body 52b. A movable body 52c that is movable in the strip width direction of the steel strip S is disposed on the guide rail 51c. A plating adhesion amount meter 53c is attached to the bottom surface of the movable body 52c. A movable body 52d that is movable in the strip width direction of the steel strip S is disposed on the guide rail 51d. A plating adhesion amount meter 53d is attached to the bottom surface of the movable body 52d.

The plating adhesion amount meters 53a, 53b, 53c, 53d are fluorescence X-ray adhesion amount meters, for instance, and measure the plating adhesion amount of the front surface of the steel strip S. As the movable bodies 52a, 52b, 52c, 53d move along the guide rails 51a, 51b, 51c, 51d, the plating adhesion amount meters 53a, 53b, 53c, 53d can move in the strip width direction of the steel strip S while facing the front surface of the steel strip S.

The beam 54 of the plating adhesion amount measurement device 50 is mounted across the support structures 91, 92 at a position offset in the transferring direction C of the steel strip S with respect to the guide rail 51d. A downstream-side edge sensor 55 and a downstream-side edge sensor 56 are attached to the beam 54. The edge sensor 55 detects the edge position (downstream side position Ed21) of the first side (left side in FIG. 4) of the steel strip S in the strip width direction, and detects the edge position (downstream-side edge position Ed22) of the second side (right side in FIG. 4) of the steel strip S in the strip width direction. While the edge sensors 55, 56 are disposed fixedly on the beam 54, the edge sensors 55, 56 may be movable along the beam 54.

The plating adhesion amount measurement device 60 includes guide rails 61a, 61b, 61c, 61d mounted across the support structures 91, 92 at positions offset in the transferring direction C of the steel strip S. Furthermore, the guide rails 61a, 61b, 61c, 61d of the back-surface side are disposed so as to face the guide rails 51a, 51b, 51c, 51d of the front-surface side. A movable body 62a that is movable in the strip width direction of the steel strip S is disposed on the guide rail 61a. A plating adhesion amount meter 63a is attached to the upper surface of the movable body 62a. A movable body 62b that is movable in the strip width direction of the steel strip S is disposed on the guide rail 61b. A plating adhesion amount meter 63b is attached to the upper surface of the movable body 62b. A movable body 62c that is movable in the strip width direction of the steel strip S is disposed on the guide rail 61c. A plating adhesion amount meter 63c is attached to the upper surface of the movable body 62c. A movable body 62d that is movable in the strip width direction of the steel strip S is disposed on the guide rail 61d. A plating adhesion amount meter 63d is attached to the upper surface of the movable body 62d.

The plating adhesion amount meters 63a, 63b, 63c, 63d are fluorescence X-ray adhesion amount meters, for instance, and measure the plating adhesion amount of the back surface of the steel strip S. As the movable bodies 62a, 62b, 62c, 62d move along the guide rails 61a, 61b, 61c, 61d, the plating adhesion amount meters 63a, 63b, 63c, 63d can move in the strip width direction of the steel strip S while facing the back surface of the steel strip S.

The plating adhesion amount meters generally have a large dimension, and thus only a limited number of plating adhesion amount meters can be arranged in a single line in the strip width direction. For instance, only 3 plating adhesion amount meters can be arranged in a single line in the strip width direction.

In the present example, the plating adhesion amount meters 53a, 53b, 53c, 53d are positioned offset from the upstream side toward the downstream side in the transferring direction C of the steel strip S, on the front-surface side of the steel strip S. Thus, many (in the present example, four) plating adhesion amount meters 53a, 53b, 53c, 53d can be disposed in the transferring direction C of the steel strip S even if the dimension of a plating adhesion amount meter is large. Accordingly, it is possible to measure the plating adhesion amount at many locations in the strip width direction.

Furthermore, the plating adhesion amount meters 63a, 63b, 63c, 63d are positioned offset from the upstream side toward the downstream side in the transferring direction C of the steel strip S, on the back-surface side of the steel strip S. Thus, many (in the present example, four) plating adhesion amount meters 63a, 63b, 63c, 63d can be disposed in the transferring direction C of the steel strip S even if the dimension of a plating adhesion amount meter is large, and thus it is possible to measure the plating adhesion amount at many locations in the strip width direction.

(Configuration of the Control System)

The configuration of the control system of the plating adhesion amount control mechanism will be described with reference to FIG. 6.

Figure 6:
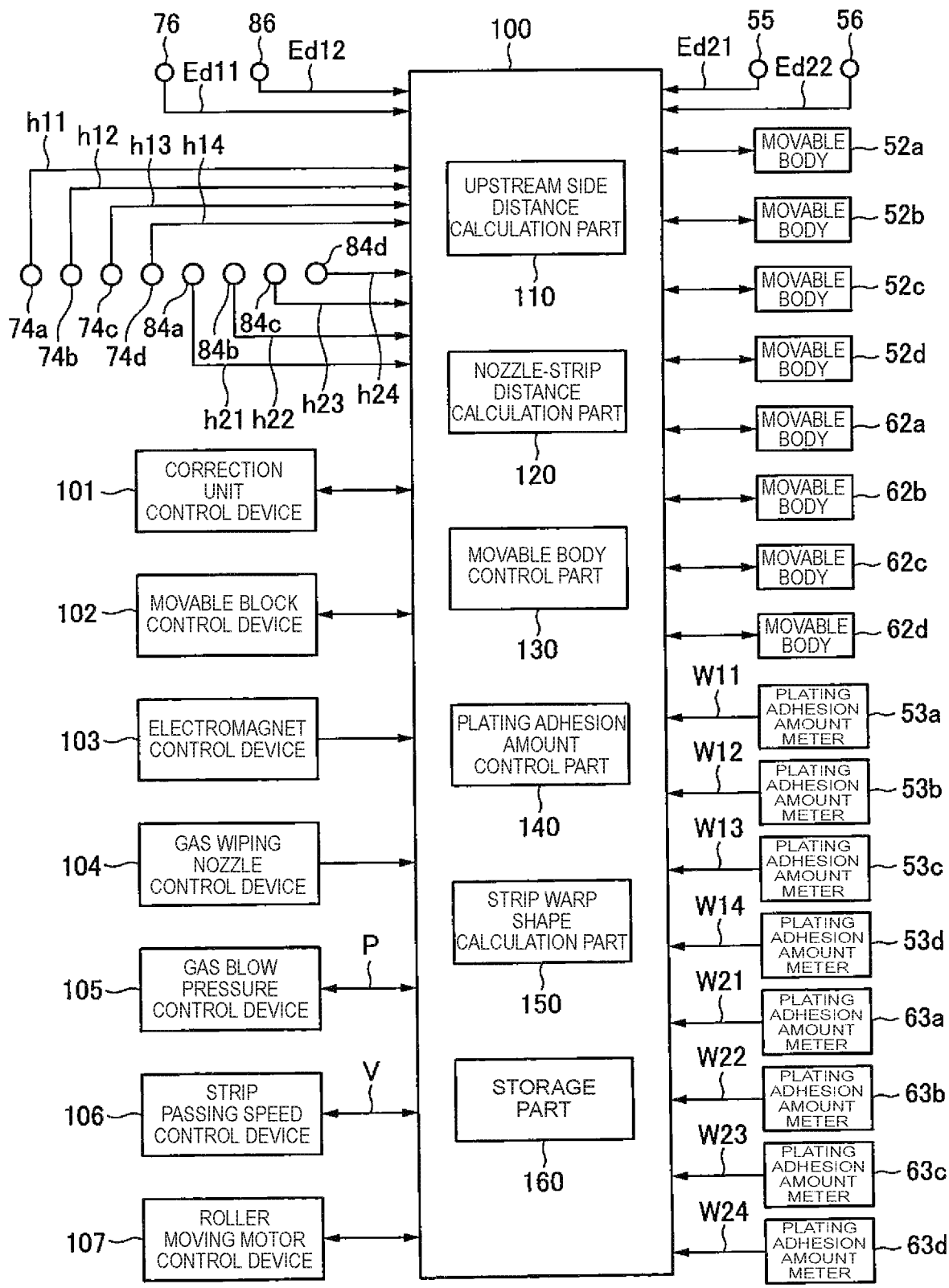
FIG. 6 is a configuration view showing the control system of a plating adhesion amount control mechanism.

As depicted in FIG. 6, the plating adhesion amount control device 100 of the plating adhesion amount control mechanism includes an upstream-side distance calculation part 110, a nozzle-strip distance calculation part 120, a movable body control part 130, a plating adhesion amount control part 140, a strip warp shape calculation part 150, and a storage part 160. The plating adhesion amount control device 100 includes a computer with a software configured to be capable of performing calculation and control processes.

Various devices and sensors as depicted in FIG. 6 are connected to the plating adhesion amount control device 100.

The upstream-side edge sensors 76, 86 disposed on the strip warp correction device 30, that is, at the upstream side position α (see FIG. 9) output signals that indicate the upstream-side edge positions Ed11, Ed12, and these signals are inputted into the plating adhesion amount control device 100. The edge sensors 76, 86 are disposed near the distance sensors 74a, 74b, 74c, 74d, 84a, 84b, 84c, 84d. Thus, the upstream-side edge position Ed11 detected by the edge sensor 76 indicates the edge position of the first end side of the steel strip S at the position in the transferring direction C where the distance sensors 74a, 74b, 74c, 74d, 84a, 84b, 84c, 84d are disposed. The upstream-side edge position Ed12 detected by the edge sensor 86 indicates the edge position of the second end side of the steel strip S at the position in the transferring direction C where the distance sensors 74a, 74b, 74c, 74d, 84a, 84b, 84c, 84d are disposed.

Figure 7:
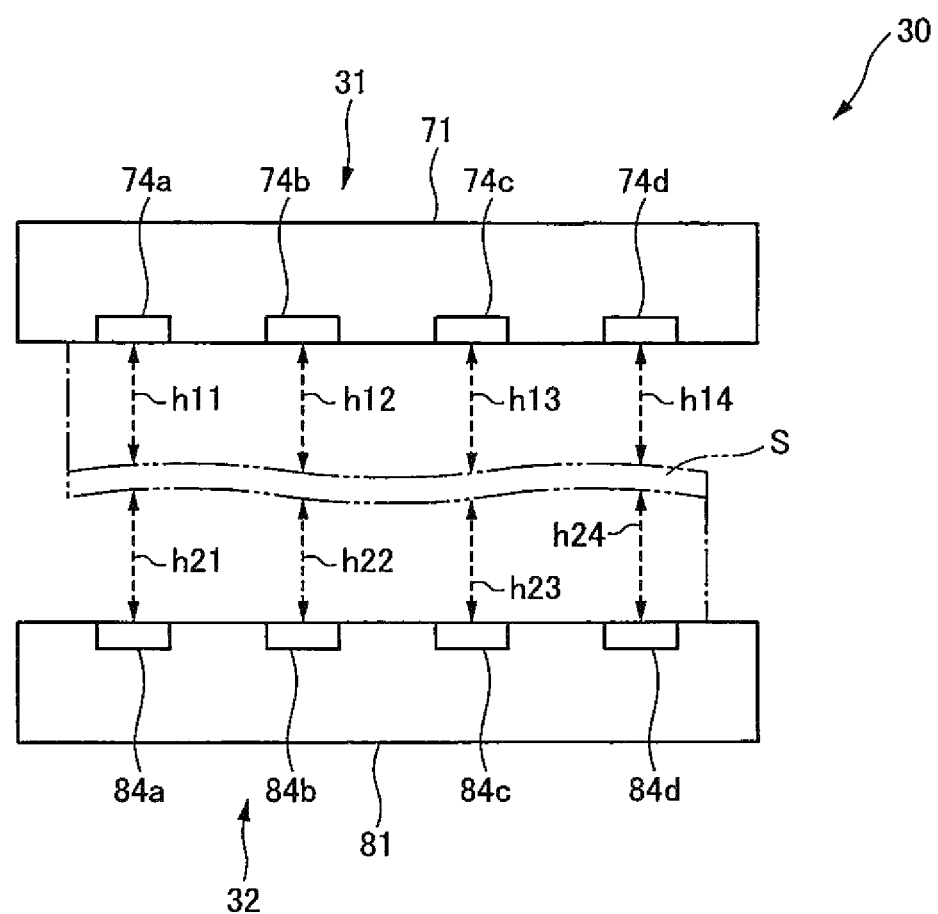
FIG. 7 is a view showing the distance at the position of a distance sensor.

The distance sensors 74a, 74b, 74c, 74d, 84a, 84b, 84c, 84d disposed at the upstream side position α (see FIG. 9) output signals that indicate the distances h11, h12, h13, h14, h21, h22, h23, h24 to the steel strip S (see FIG. 7), and these signals are inputted into the plating adhesion amount control device 100.

Figure 8:
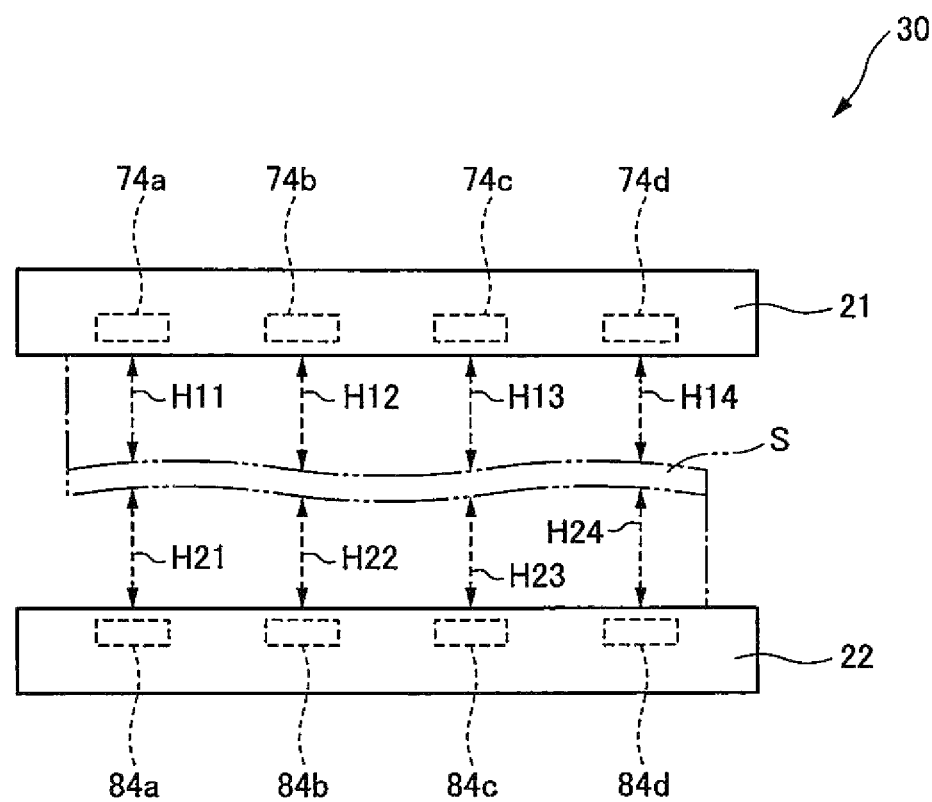
FIG. 8 is a view showing the nozzle-strip distance at the position of the gas wiping nozzles.

With reference to the transferring direction C of the steel strip S, the distances from the electromagnets 73a, 73b, 73c, 73d, 83a, 83b, 83c, 83d to the distance sensors 74a, 74b, 74c, 74d, 84a, 84b, 84c, 84d and the distances from the electromagnets 73a, 73b, 73c, 73d, 83a, 83b, 83c, 83d to the gas wiping nozzles 21, 22 are substantially the same (see FIG. 2). Thus, when the electromagnets 73a, 73b, 73c, 73d, 83a, 83b, 83c, 83d attract the steel strip S and the shape of the steel strip S changes, the extent of the shape change is substantially the same at the arrangement positions of the distance sensors 74a, 74b, 74c, 74d, 84a, 84b, 84c, 84d and the arrangement positions of the gas wiping nozzles 21, 22. As a result, the distances h11, h12, h13, h14, h21, h22, h23, h24 become distances that correspond to the nozzle-strip distances H11, H12, H13, H14, H21, H22, H23, H24, which are distances between the gas wiping nozzles 21, 22 and the steel strip S (see FIGS. 7, 8). Furthermore, FIG. 8 shows a state where the gas wiping nozzles 21, 22 have moved closer to the steel strip S with respect to the correction units 31, 32 (support frames 71, 81).

The nozzle-strip distances H11, H21 are the nozzle-strip distances at positions where virtual lines extending vertically downward from the distance sensors 74a, 84a and the gas wiping nozzles 21, 22 intersect. The nozzle-strip distances H12, H22 are the nozzle-strip distances at positions where virtual lines extending vertically downward from the distance sensors 74b, 84b and the gas wiping nozzles 21, 22 intersect. The nozzle-strip distances H13, H23 are the nozzle-strip distances at positions where virtual lines extending vertically downward from the distance sensors 74c, 84c and the gas wiping nozzles 21, 22 intersect. The nozzle-strip distances H14, H24 are the nozzle-strip distances at positions where virtual lines extending vertically downward from the distance sensors 74d, 84d and the gas wiping nozzles 21, 22 intersect (see FIG. 8).

The correction unit control device 101 performs control operation to move the correction units 31, 32 closer to or away from the steel strip S, and skew the correction units 31, 32 within the horizontal plane. The correction unit control device 101 inputs signals that indicate the movement position of the correction units 31, 32 into the plating adhesion amount control device 100.

The movable block control device 102 performs control operation to move the movable blocks 72a, 72b, 72c, 72d, 82a, 82b, 82c, 82d in the strip width direction of the steel strip S. At this time, the movable block control device 102 performs movement control on the movable blocks 72a, 72b, 72c, 72d, 82a, 82b, 82c, 82d so that the strip width direction positions of the movable block 72a and the movable block 82a are always the same, the strip width direction positions of the movable block 72b and the movable block 82b are always the same, the strip width direction positions of the movable block 72c and the movable block 82c are always the same, and the strip width direction positions of the movable block 72d and the movable block 82d are always the same. The movable block control device 102 inputs signals that indicate the movement positions of the movable blocks 72a, 72b, 72c, 72d, 82a, 82b, 82c, 82d in the strip width direction, that is, signals that indicate the movement positions of the distance sensors 74a, 74b, 74c, 74d, 84a, 84b, 84c, 84d, into the plating adhesion amount control device 100.

The electromagnet control device 103 controls the electric current to be supplied to the electromagnets 73a, 73b, 73c, 73d, 83a, 83b, 83c, 83d, and control the magnetic attractive forces that are applied to the steel strip S. The electromagnet control device 103 inputs the values of electric current supplied to the respective electromagnets 73a, 73b, 73c, 73d, 83a, 83b, 83c, 83d into the plating adhesion amount control device 100.

The gas wiping nozzle control device 104 performs control operation to move the gas wiping nozzles 21, 22 closer to or away from the steel strip S with respect to the support frames 71, 81. The gas wiping nozzle control device 104 inputs signals that indicate the movement amounts of the gas wiping nozzles 21, 22 with respect to the support frames 71, 81 into the plating adhesion amount control device 100.

The gas blow pressure control device 105 controls the blow pressure P of gas blown from the gas wiping nozzles 21, 22. The gas blow pressure control device 105 inputs signals that indicate the blow pressure P of gas into the plating adhesion amount control device 100.

The strip passing speed control device 106 controls the strip passing speed V of the steel strip S by, for instance, adjusting the rotation speed of non-depicted transferring rollers. The strip passing speed control device 106 inputs signals that indicate the strip passing speed V of the steel strip S into the plating adhesion amount control device 100.

The roller moving motor control device 107 adjusts the pass line (strip passing position) of the steel strip S by driving the roller moving motors 14,15 to move the in-tank rollers 12, 13. The roller moving motor control device 107 inputs signals that indicate the pass line (strip passing position) of the steel strip S into the plating adhesion amount control device 100.

The downstream-side edge sensors 55, 56 disposed on the plating adhesion amount measurement device 50, that is, disposed at the downstream side position β (see FIG. 9), output signals that indicate the downstream-side edge positions Ed21, Ed22, and these signals are inputted into the plating adhesion amount control device 100. The edge sensors 55, 56 are disposed near the plating adhesion amount meters 53a, 53b, 53c, 53d, 63a, 63b, 63c, 63d. Thus, the downstream-side edge position Ed21 detected by the edge sensor 55 indicates the edge position of the first end side of the steel strip S at the position in the transferring direction C where the plating adhesion amount meters 53a, 53b, 53c, 53d, 63a, 63b, 63c, 63d are disposed. The downstream-side edge position Ed22 detected by the edge sensor 56 indicates the edge position of the second end side of the steel strip S at the position in the transferring direction C where the plating adhesion amount meters 53a, 53b, 53c, 53d, 63a, 63b, 63c, 63d are disposed.

The movable bodies 52a, 52b, 52c, 52d, 62a, 62b, 62c, 62d move in the strip width direction along the guide rails 51a, 51b, 51c, 51d, 61a, 61b, 61c, 61d on the basis of the control of the movable body control part 130 of the plating adhesion amount control device 100. The movable bodies 52a, 52b, 52c, 52d, 62a, 62b, 62c, 62d input signals that indicate the measurement positions (absolute positions in the strip width direction) of the plating adhesion amount meters 53a, 53b, 53c, 53d, 63a, 63b, 63c, 63d into the plating adhesion amount control device 100. The absolute position is a position measured with reference to a predetermined specific position on the ground as a reference position (origin position).

The plating adhesion amount meters 53a, 53b, 53c, 53d, 63a, 63b, 63c, 63d attached to the movable bodies 52a, 52b, 52c, 52d, 62a, 62b, 62c, 62d measure the plating adhesion amount and output plating adhesion amount actual measurement values W11, W12, W13, W14, W21, W22, W23, W24. These plating adhesion amount actual measurement values are inputted into the plating adhesion amount control device 100.

The upstream-side distance calculation part 110 calculates the specific strip width direction distances X11, X12, X13, X14 (see FIG. 9) between the upstream-side edge position Ed11 and the distance sensors 74a, 74b, 74c, 74d, 84a, 84b, 84c, 84d, on the basis of signals that indicate the movement positions of the distance sensors 74a, 74b, 74c, 74d, 84a, 84b, 84c, 84d in the strip width direction inputted from the movable block control device 102 and signals that indicate the upstream-side edge position Ed11 inputted from the upstream-side edge sensor 76.

The nozzle-strip distance calculation part 120 calculates the nozzle-strip distances H11, H12, H13, H14 between the gas wiping nozzle 21 and the steel strip S and the nozzle-strip distances H21, H22, H23, H24 between the gas wiping nozzle 22 and the steel strip S, on the basis of signals the indicate the distances h11, h12, h13, h14, h21, h22, h23, h24 inputted from the distance sensors 74a, 74b, 74c, 74d, 84a, 84b, 84c, 84d and signals that indicate the movement amounts of the gas wiping nozzles 21, 22 with respect to the support frames 71, 81 inputted from the gas wiping nozzle control device 104 (see FIG. 8).

The nozzle-strip distances H11, H12, H13, H14, H21, H22, H23, H24 are distances obtained by subtracting the movement amounts (movement distances) of the gas wiping nozzles 21, 22 with respect to the support frames 71, 82 from the distances h11, h12, h13, h14, h21, h22, h23, h24.

In a case where the movement amounts (moving distances) of the gas wiping nozzles 21, 22 are zero, the distances h11, h12, h13, h14h, h21, h22, h23, h24 directly become the nozzle-strip distances H11, H12, H13, H14, H21, H22, H23, H24.

Furthermore, in a case where distance sensors for measuring the distances between the steel strip S and the gas wiping nozzles 21, 22 are attached to the gas wiping nozzles 21, 22, the distances h detected by the distance sensors directly become the nozzle-strip distances H.

The movable body control part 130 performs a control to move the movable bodies 52a, 52b, 52c, 52d to which the plating adhesion amount meters 53a, 53b, 53c, 53d are attached in the strip width direction along the guide rails 51a, 51b, 51c, 51d, and a control to move the movable bodies 62a, 62b, 62c, 62d to which the plating adhesion amount meters 63a, 63b, 63c, 63d are attached in the strip width direction along the guide rails 61a, 61b, 61c, 61d. The details of the control will be described below.

The plating adhesion amount control part 140 controls the plating adhesion amount by controlling the nozzle-strip distances H11, H12, H13, H14, H21, H22, H23, H24 by adjusting the movement positions of the correction units 31, 32 with the correction unit control device 101, adjusting the gas blow pressure P with the gas blow pressure control device 105, or by adjusting the strip passing speed V with the strip passing speed control device 106. The details of the control will be described below.

The strip warp shape calculation part 150 obtains the magnetic attractive force on the basis of the values of electric current supplied to the respective electromagnets 73a, 73b, 73c, 73d, 83a, 83b, 83c, 83d that are inputted from the electromagnet control device 103, and calculates the strip warp shape, in the strip width direction of the steel strip S passing the strip warp correction device 30, on the basis of the magnetic attractive forces and the mechanical characteristics of the steel strip S.

The storage part 160 stores, with time (corresponding to the passage of time): the upstream-side edge positions Ed11, Ed12 inputted from the upstream-side edge sensors 76, 86; the downstream-side edge positions Ed21, Ed22 inputted from the downstream-side edge sensors 55, 56; signals that indicate the measurement positions (absolute positions in the strip width direction) of the plating adhesion amount meters 53a, 53b, 53c, 53d, 63a, 63b, 63c, 63d inputted from the movable bodies 52a, 52b, 52c, 52d, 62a, 62b, 62c, 62d; the plating adhesion amount actual measurement values W11, W12, W13, W14, W21, W22, W23, W24 inputted from the plating adhesion amount meters 53a, 53b, 53c, 53d, 63a, 63b, 63c, 63d; the gas blow pressure P inputted from the gas blow pressure control device 105; the strip passing speed V inputted from the strip passing speed control device 106; the pass line (steel-strip passing position) inputted from the roller moving motor control device 107; the specific strip width direction distances X11, X12, X13, X14 calculated by the upstream-side distance calculation part 110; the nozzle-strip distances H11, H12, H13, H14, H21, H22, H23, H24 calculated by the nozzle-strip distance calculation part 120; and the strip warp shape in the strip width direction of the steel strip S calculated by the strip warp shape calculation part 150.

(Premise for Describing the Control Operation)

The control operation will be described with reference to FIG. 9, which is a development view of the transferred state of the steel strip S.

In FIG. 9 showing the front-surface side of the steel strip S, the upstream side position α is a position where the distance sensors 74a (84a), 74b (84b), 74c (84c), 74d (84d) of the strip warp correction device 30 are positioned with respect to the transferring direction C of the steel strip S, and is in a range where these distance sensors can measure the distance to the steel strip S. The downstream position β is a position where the plating adhesion amount meters 53a (63a), 53b (63b), 53c (63c), 53d (63d) of the plating adhesion amount measurement devices 50, 60 are positioned with respect to the transferring direction C of the steel strip S, and is in a range where these plating adhesion amount meters can measure the plating adhesion amount.

In FIG. 9, the edge position of the steel strip S is different at the upstream side (upper side in FIG. 9; the arrangement position of the strip warp correction device 30) and the downstream side (lower side in FIG. 9; the arrangement position of the plating adhesion amount measuring devices 50, 60) with respect to the transferring direction C of the steel strip S, which means that the steel strip S is meandering. In a case where the steel strip S meanders in the strip width direction while being transferred in the transferring direction C, the upstream-side edge positions Ed11, Ed12 and the downstream-side edge positions Ed21, Ed22 become offset in the strip width direction with respect to the absolute position (ground).

To describe the operation, time is defined as follows.

(1) When positions Y1, Y2, Y3, Y4 on the steel strip S are set as different positions in the transferring direction C of the steel strip S, t1 is the time when the top position Y1 passes the upstream position α, t2 is the time when the position Y2 passes the upstream position α, t3 is the time when the position Y3 passes the upstream position α, and t4 is the time when the position Y4 passes the upstream position α.

(2) The position Y1 passes the downstream position β after passage of time T1 after the position Y1 passes the upstream position α. The position Y2 passes the downstream position β after passage of time T2 after the position Y2 passes the upstream position α. The position Y3 passes the downstream position β after passage of time T3 after the position Y3 passes the upstream position α. The position Y4 passes the downstream position β after passage of time T4 after the position Y4 passes the upstream position α. The times T1, T2, T3, T4 are determined by the distance between the upstream position α and the downstream position β (distance in the transferring direction C of the steel strip S) and the strip passing speed V. The times T1, T2, T3, T4 are constant when the strip passing speed V is constant. When the strip passing speed V changes (increases or decreases) while the positions Y1, Y2, Y3, Y4 reach the downstream position β from the upstream position α, the times T1, T2, T3, T4 become different from one another.

(Overview of the Control Operation)

The control operation will be described.

(a) Obtain the specific strip width direction distance X11 (t1), which is a distance between the upstream-side edge position Ed11 (t1) and the distance sensors 74a, 84a, at a certain time (e.g. time t1). Further, at this time (t1), calculate the plating adhesion amount estimation value We (74a, t1) of the front-surface side and the plating adhesion amount estimation value We (84a, t1) of the back-surface side at a position offset from the upstream-side edge position Ed11 (t1) in the strip width direction by the specific strip width direction distance X11 (t1) ("upstream measurement surface portion"), that is, the position facing the distance sensors 74a, 84a. This estimation calculation is performed by using the "plating adhesion amount estimation expression". The plating adhesion amount estimation expression represents a relationship between "the nozzle-strip distance H, the gas blow pressure P, the strip passing speed V of the steel strip, and the specific strip width direction distance X at the upstream side", and "plating adhesion amount estimation value We".

(b) At the time (e.g. time t1+T1) when time T1 passes after the above time (e.g. t1), move the measurement position of the plating adhesion amount meters 53a, 63a so that the specific strip width direction distance X21 (t1+T1), which is a distance between the downstream-side edge position Ed21 (t1+T1) and the measurement position of the plating adhesion amount meters 53a, 63a, becomes equal to the specific strip width direction distance X11 (t1). Of the surface of the steel strip S, the position corresponding to the measurement position of the plating adhesion amount meters 53a, 63a that has moved so that the specific strip width direction distance X21 (t1+T1) becomes equal to the specified width directional distance X11 (t1) is the "downstream-side measurement surface portion". Further, at this time (t1+T1), detect the plating adhesion amount actual measurement values W11 (t1+T1), W21 (t1+T1), at the downstream-side measurement surface portion.

(c) "Upstream-side measurement surface portion" at a certain time (e.g. time t1) and the above "downstream-side measurement surface portion" at the above time (e.g. time t1+T1) when time T1 passes after the time (e.g. time t1), are the same portion (position) of the strip surface of the steel strip S. That is, the "upstream-side measurement surface portion" at a time (e.g. time t1) is transferred from the upstream side toward the downstream side in the transferring direction C with time, and the portion corresponding to the position of the "upstream-side measurement surface portion" becomes the "downstream-side measurement surface portion", at the time (e.g. time t1+T1) after passage of time T1 after the time (e.g. time t1).

In other words, the "upstream-side measurement surface portion" at a certain time (e.g. time t1) and the above "downstream-side measurement surface portion" at the time (e.g. time t1+T1) after passage of time T1 after the time (e.g. time t1), are the same portion (position) of the strip surface of the steel strip S, both in the longitudinal direction and the strip width direction of the strip surface of the steel strip S.

(d) Obtain the differences Δ (74a, t1), Δ (84a, t1) between the plating adhesion amount estimation values We (74a, t1), We (84a, t1) obtained in the above (a) and the plating adhesion amount actual measurement values W11 (t1+T1), W21 (t1+T1) obtained in the above (b).

(e) Correct the "plating adhesion amount estimation expression" so that the differences Δ (74a, t1), Δ (84a, t1) become zero, in other words, so that the plating adhesion amount estimation values We (74a, t1), We (84a, t) become equal to the plating adhesion amount actual measurement values W11 (t1+T1), W21 (t1+T1).

(f) By using the corrected "plating adhesion amount estimation expression" to control the nozzle-strip distance H, the gas blow pressure P, and the strip passing speed V of the steel strip, it is possible to control the plating adhesion amount with high accuracy.

(Detailed Description of the Control Operation)

The control operation will be described in detail.

The upstream-side distance calculation part 110 calculates and obtains the specific strip width direction distances X11, X12, X13, X14 between the upstream-side edge position Ed11 and the distance sensors 74a (84a), 74b (84b), 74c (84c), 74d (84d) at the respective times t1, t2, t3, t4, and so on (see FIG. 9).

That is, the upstream-side distance calculation part 110 obtains the following strip width direction positions at the respective times.

The specific strip width direction distance X11 (t1) between the upstream-side edge position Ed11 (t1) and the distance sensor 74a (84a), the specific strip width direction distance X12 (t1) between the upstream-side edge position Ed11 (t1) and the distance sensor 74b (84b), the specific strip width direction distance X13 (t1) between the upstream-side edge position Ed11 (t1) and the distance sensor 74c (84c), and the specific strip width direction distance X14 (t1) between the upstream-side edge position Ed11 (t1) and the distance sensor 74d (84d), at time t1.

The specific strip width direction distance X11 (t2) between the upstream-side edge position Ed11 (t2) and the distance sensor 74a (84a), the specific strip width direction distance X12 (t2) between the upstream-side edge position Ed11 (t2) and the distance sensor 74b (84b), the specific strip width direction distance X13 (t2) between the upstream-side edge position Ed11 (t2) and the distance sensor 74c (84c), and the specific strip width direction distance X14 (t2) between the upstream-side edge position Ed11 (t2) and the distance sensor 74d (84d), at time t2.

The specific strip width direction distance X11 (t3) between the upstream-side edge position Ed11 (t3) and the distance sensor 74a (84a), the specific strip width direction distance X12 (t3) between the upstream-side edge position Ed11 (t3) and the distance sensor 74b (84b), the specific strip width direction distance X13 (t3) between the upstream-side edge position Ed11 (t3) and the distance sensor 74c (84c), and the specific strip width direction distance X14 (t3) between the upstream-side edge position Ed11 (t3) and the distance sensor 74d (84d), at time t3.

The specific strip width direction distance X11 (t4) between the upstream-side edge position Ed11 (t4) and the distance sensor 74a (84a), the specific strip width direction distance X12 (t4) between the upstream-side edge position Ed11 (t4) and the distance sensor 74b (84b), the specific strip width direction distance X13 (t4) between the upstream-side edge position Ed11 (t4) and the distance sensor 74c (84c), and the specific strip width direction distance X14 (t4) between the upstream-side edge position Ed11 (t4) and the distance sensor 74c (84c), at time t4.

Similarly, obtain the specific strip width direction distances X11 (t5, t6, . . . ), X12 (t5, t6, . . . ), X13 (t5, t6, . . . ), X14 (t5, t6, . . . ) between the upstream-side edge position Ed11 (t5, t6, . . . ) and the distance sensors 74a (84a), 74b (84b), 74c (84c), 74d (84c), at the subsequent times t5, t6, and so on.

In a case where the steel strip S meanders while being transferred, the upstream-side edge position Ed11 (t1, t2, t3, t4, . . . ) changes in the strip width direction at each time.

The specific strip width direction distances X11 (t1, t2, t3, t4, t5, t6, . . . ), X12 (t1, t2, t3, t4, t5, t6, . . . ), X13 (t1, t2, t3, t4, t5, t6, . . . ), X14 (t1, t2, t3, t4, t5, t6, . . . ) calculated as described above at the respective times (t1, t2, t3, t4, t5, t6, . . . ) are stored in the storage part 160.

The nozzle-strip distance calculation part 120 calculates and obtains the nozzle-strip distances H11, H12, H13, H14 between the gas wiping nozzle 21 and the steel strip S and the nozzle-strip distances H21, H22, H23, H24 between the gas wiping nozzle 22 and the steel strip S, at respective times t1, t2, t3, t4, and so on (see FIG. 8).

That is, the nozzle-strip distance calculation part 120 obtains the following nozzle-strip distances H at the respective times.

Nozzle-strip distances H11 (t1), H21 (t1), H12 (t1), H22 (t1), H13 (t1), H23 (t1), H14 (t1), H24 (t1), at time t1.

Nozzle-strip distances H11 (t2), H21 (t2), H12 (t2), H22 (t2), H13 (t2), H23 (t2), H14 (t2), H24 (t2), at time t2.

Nozzle-strip distances H11 (t3), H21 (t3), H12 (t3), H22 (t3), H13 (t3), H23 (t3), H14 (t3), H24 (t3), at time t3.

Nozzle-strip distances H11 (t4), H21 (t4), H12 (t4), H22 (t4), H13 (t4), H23 (t4), H14 (t4), H24 (t4), at time t4.

Similarly, obtain the nozzle-strip distances H11 (t5, t6, . . . ), H21 (t5, t6, . . . ), H12 (t5, t6, . . . ), H22 (t5, t6, . . . ), H13 (t5, t6, . . . ), H23 (t5, t6, . . . ), H14 (t5, t6, . . . ), H24 (t5, t6, . . . ), at the subsequent times t5, t6, and so on.

The nozzle-strip distances H11 (t1, 2, t3, t4, t5, t6, . . . ), H21 (t1, t2, t3, t4, t5, t6, . . . ), H12 (t1, t2, t3, t4, t5, t6, . . . ), H22 (t1, t2, t3, t4, t5, t6, . . . ), H13 (t1, t2, t3, t4, t5, t6, . . . ), H23 (t1, t2, t3, t4 t5, t6, . . . ), H14 (t1, t2, t3, t4, t5, t6, . . . ), H24 (t1, t2, t3, t4, t5, t6, . . . ) calculated as described above at the respective times (t1, t2, t3, t4, t5, t6, . . . ) are stored in the storage part 160.

The movable body control part 130 defines the specific strip width direction distances of the measurement positions of the plating adhesion amount meters 53a (63a), 53b (63b), 53c (63c), 53d (63d) as follows.

Define the distance between the downstream-side edge position Ed21 and the plating adhesion amount meter 53a (63a) as the specific strip width direction distance X21.

Define the distance between the downstream-side edge position Ed21 and the plating adhesion amount meter 53b (63b) as the specific strip width direction distance X22.

Define the distance between the downstream-side edge position Ed21 and the plating adhesion amount meter 53c (63c) as the specific strip width direction distance X23.

Define the distance between the downstream-side edge position Ed21 and the plating adhesion amount meter 53d (63d) as the specific strip width direction distance X24 (see FIG. 9).

The movable body control part 130 calculates the specific strip width direction distances X21, X22, X23, X24 on the basis of the downstream-side edge position Ed21 obtained by the downstream-side edge sensor 55 and the measurement positions (absolute positions in the strip width direction) of the plating adhesion amount meters 53a, 53b, 53c, 53d, 63a, 63b, 63c, 63d.

The movable body control part 130 recognizes each of the times t1, t2, t3, t4, t5, and so on. Further, the movable body control part 130 obtains times T1, T2, T3, T4, T5, and so on, on the basis of the distance between the upstream position α and the downstream position β (pre-measured distance in the transferring direction C) and the strip passing speed V inputted from the strip passing speed control device 106.

Furthermore, the movable body control part 130 imports the specific strip width direction distances X11 (t1, t2, t3, t4, t5, t6, . . . ), X12 (t1, t2, t3, t4, t5, t6, . . . ), X13 (t1, t2, t3, t4, t5, t6, . . . ), X14 (t1, t2, t3, t4, t5, t6, . . . ) between the upstream-side edge position Ed11 (t1, t2, t3, t4, t5, t6, . . . ) and the distance sensors 74*a* (84*a*), 74*b* (84*b*), 74*c* (84*c*), 74*d* (84*c*) at the respective times (t1, t2, t3, t4, t5, t6, . . . ).

Further, the movable body control part 130 performs a control to move the movable bodies 52*a*, 62*a*, 52*b*, 62*b*, 52*c*, 62*c*, 52*d*, 62*d* as described below.

The movable body control part 130 performs the following control at the time (t1+T1) when time T1 passes after time t1.

Move the movable bodies 52*a*, 62*a* so that the specific strip width direction distance X21 (t1+T1) between the downstream-side edge position Ed21+T1) at time (t1+T1) and the plating adhesion amount meters 53*a*, 63*a* becomes the specific strip width direction distance X11 (t11).

Move the movable bodies 52*b*, 62*b* so that the specific strip width direction distance X22 (t1+T1) between the downstream-side edge position Ed21+T1) at time (t1+T1) and the plating adhesion amount meters 53*b*, 63*b* becomes the specific strip width direction distance X12 (t11).

Move the movable bodies 52*c*, 62*c* so that the specific strip width direction distance X23 (t1+T1) between the downstream-side edge position Ed21+T1) at time (t1+T1) and the plating adhesion amount meters 53*c*, 63*c* becomes the specific strip width direction distance X13 (t11).

Move the movable bodies 52*d*, 62*d* so that the specific strip width direction distance X24 (t1+T1) between the downstream-side edge position Ed21+T1) at time (t1+T1) and the plating adhesion amount meters 53*d*, 63*d* becomes the specific strip width direction distance X14 (t11).

Accordingly, the respective distances in the strip width direction between the upstream-side edge position Ed11 (t1) and the distance sensors 74*a* (84*a*), 74*b* (84*b*), 74*c* (84*c*), 74*d* (84*d*) at the time when the position Y1 is at the upstream side position α at time t1 become equal to the respective distances in the strip width direction between the downstream-side edge position Ed21 (t1) and the plating adhesion amount meters 53*a* (63*a*), 53*b* (63*b*), 53*c* (63*c*), 53*d* (63*d*) at the time when the position Y1 is at the downstream side position β at time (t1+T1).

As a result, of the surfaces (front surface and back surface) of the steel strip S, the respective portions (upstream-side measurement surface portions) that the distance sensors 74*a* (84*a*), 74*b* (84*b*), 74*c* (84*c*), 74*d* (84*d*) face at time t1 and the respective portions (downstream-side measurement surface portions) that the measurement positions of the plating adhesion amount meters 53*a* (63*a*), 53*b* (63*b*), 53*c* (63*c*), 53*d* (63*d*) face at time (t1+T1) are the same. As described above, it is one of the major features of the present working example to carry out a control such that the upstream-side measurement surface portions and the downstream-side measurement surface portions become the same.

At time (t1+T1), the plating adhesion amount meters 53*a*, 53*b*, 53*c*, 53*d*, 63*a*, 63*b*, 63*c*, 63*d* face the downstream-side measurement surface portions, measure the plating adhesion amount of the downstream-side measurement surface portions, and output the plating adhesion amount actual measurement values W11 (t1+T1), W12 (t1+T1), W13 (t1+T1), W14 (t1+T1), W21 (t1+T1), W22 (t1+T1), W23 (t1+T1), W24 (t1+T1). The plating adhesion amount actual measurement values W11 (t1+T1), W12 (t1+T1), W13 (t1+T1), W14 (t1+T1), W21 (t1+T1), W22 (t1+T1), W23 (t1+T1), W24 (t1+T1) are stored in the storage part 160.

The movable body control part 130 performs the following control at the time (t2+T2) when time T2 passes after time t2.

Move the movable bodies 52*a*, 62*a* so that the specific strip width direction distance X21 (t2+T2) between the downstream-side edge position Ed21 (t2+T2) at time (t2+T2) and the plating adhesion amount meters 53*a*, 63*a* becomes the specific strip width direction distance X11 (t2).

Move the movable bodies 52*b*, 62*b* so that the specific strip width direction distance X22 (t2+T2) between the downstream-side edge position Ed21 (t2+T2) at time (t2+T2) and the plating adhesion amount meters 53*b*, 63*b* becomes the specific strip width direction distance X12 (t2).

Move the movable bodies 52*c*, 62*c* so that the specific strip width direction distance X23 (t2+T2) between the downstream-side edge position Ed21 (t2+T2) at time (t2+T2) and the plating adhesion amount meters 53*c*, 63*c* becomes the specific strip width direction distance X13 (t2).

Move the movable bodies 52*d*, 62*d* so that the specific strip width direction distance X24 (t2+T2) between the downstream-side edge position Ed21 (t2+T2) at time (t2+T2) and the plating adhesion amount meters 53*d*, 63*d* becomes the specific strip width direction distance X14 (t2).

Accordingly, the respective distances in the strip width direction between the upstream-side edge position Ed11 (t2) and the distance sensors 74*a* (84*a*), 74*b* (84*b*), 74*c* (84*c*), 74*d* (84*d*) at time t2 when the position Y2 is at the upstream side position α become equal to the respective distances in the strip width direction between the downstream-side edge position Ed21 (t2) and the plating adhesion amount meters 53*a* (63*a*), 53*b* (63*b*), 53*c* (63*c*), 53*d* (63*d*) at the time (t2+T2) when the position Y2 is at the downstream side position β.

As a result, of the surfaces (front surface and back surface) of the steel strip S, the respective portions (upstream-side measurement surface portions) that the distance sensors 74*a* (84*a*), 74*b* (84*b*), 74*c* (84*c*), 74*d* (84*d*) face at time t2 and the respective portions (downstream-side measurement surface portions) that the measurement positions of the plating adhesion amount meters 53*a* (63*a*), 53*b* (63*b*), 53*c* (63*c*), 53*d* (63*d*) face at time (t2+T2) are the same.

At time (t2+T2), the plating adhesion amount meters 53*a*, 53*b*, 53*c*, 53*d*, 63*a*, 63*b*, 63*c*, 63*d* face the downstream-side measurement surface portions, measure the plating adhesion amount of the downstream-side measurement surface portions, and output the plating adhesion amount actual measurement values W11 (t2+T2), W12 (t2+T2), W13 (t2+T2), W14 (t2+T2), W21 (t2+T2), W22 (t2+T2), W23 (t2+T2), W24 (t2+T2). The plating adhesion amount actual measurement values W11 (t2+T2), W12 (t2+T2), W13 (t2+T2), W14 (t2+T2), W21 (t2+T2), W22 (t2+T2), W23 (t2+T2), W24 (t2+T2) are stored in the storage part 160.

The movable body control part 130 performs the following control at the time (t3+T3) when time T3 passes after time t3.

Move the movable bodies 52*a*, 62*a* so that the specific strip width direction distance X21 (t3+T3) between the downstream-side edge position Ed21 (t3+T3) at time (t3+T3) and the plating adhesion amount meters 53*a*, 63*a* becomes the specific strip width direction distance X11 (t3).

Move the movable bodies 52*b*, 62*b* so that the specific strip width direction distance X22 (t3+T3) between the downstream-side edge position Ed21 (t3+T3) at time (t3+T3) and the plating adhesion amount meters 53*b*, 63*b* becomes the specific strip width direction distance X12 (t3).

Move the movable bodies 52c, 62c so that the specific strip width direction distance X23 (t3+T3) between the downstream-side edge position Ed21 (t3+T3) at time (t3+T3) and the plating adhesion amount meters 53c, 63c becomes the specific strip width direction distance X13 (t3).

Move the movable bodies 52d, 62d so that the specific strip width direction distance X24 (t3+T3) between the downstream-side edge position Ed21 (t3+T3) at time (t3+T3) and the plating adhesion amount meters 53d, 63d becomes the specific strip width direction distance X14 (t3).

Accordingly, the respective distances in the strip width direction between the upstream-side edge position Ed11 (t3) and the distance sensors 74a (84a), 74b (84b), 74c (84c), 74d (84d) at the time t3 when the position Y3 is at the upstream side position α become equal to the respective distances in the strip width direction between the downstream-side edge position Ed21 (t3) and the plating adhesion amount meters 53a (63a), 53b (63b), 53c (63c), 53d (63d) at the time (t3+T3) when the position Y3 is at the downstream side position β.

As a result, of the surfaces (front surface and back surface) of the steel strip S, the respective portions (upstream-side measurement surface portions) that the distance sensors 74a (84a), 74b (84b), 74c (84c), 74d (84d) face at time t3 and the respective portions (downstream-side measurement surface portions) that the measurement positions of the plating adhesion amount meters 53a (63a), 53b (63b), 53c (63c), 53d (63d) face at time (t3+T3) become the same.

At time (t3+T3), the plating adhesion amount meters 53a, 53b, 53c, 53d, 63a, 63b, 63c, 63d face the downstream-side measurement surface portions, measure the plating adhesion amount of the downstream-side measurement surface portions, and output the plating adhesion amount actual measurement values W11 (t3+T3), W12 (t3+T3), W13 (t3+T3), W14 (t3+T3), W21 (t3+T3), W22 (t3+T3), W23 (t3+T3), W24 (t3+T3). The plating adhesion amount actual measurement values W11 (t3+T3), W12 (t3+T3), W13 (t3+T3), W14 (t3+T3), W21 (t3+T3), W22 (t3+T3), W23 (t3+T3), W24 (t3+T3) are stored in the storage part 160.

The movable body control part 130 performs the following control at the time (t4+T4) when time T4 passes after time t4.

Move the movable bodies 52a, 62a so that the specific strip width direction distance X21 (t4+T4) between the downstream-side edge position Ed21 (t4+T4) at time (t4+T4) and the plating adhesion amount meters 53a, 63a becomes the specific strip width direction distance X11 (t4).

Move the movable bodies 52b, 62b so that the specific strip width direction distance X22 (t4+T4) between the downstream-side edge position Ed21 (t4+T4) at time (t4+T4) and the plating adhesion amount meters 53b, 63b becomes the specific strip width direction distance X12 (t4).

Move the movable bodies 52c, 62c so that the specific strip width direction distance X23 (t4+T4) between the downstream-side edge position Ed21 (t4+T4) at time (t4+T4) and the plating adhesion amount meters 53c, 63c becomes the specific strip width direction distance X13 (t4).

Move the movable bodies 52d, 62d so that the specific strip width direction distance X24 (t4+T4) between the downstream-side edge position Ed21 (t4+T4) at time (t4+T4) and the plating adhesion amount meters 53d, 63d becomes the specific strip width direction distance X14 (t4).

Accordingly, the respective distances in the strip width direction between the upstream-side edge position Ed11 (t4) and the distance sensors 74a (84a), 74b (84b), 74c (84c), 74d (84d) at the time t4 when the position Y4 is at the upstream side position α become equal to the respective distances in the strip width direction between the downstream-side edge position Ed21 (t4) and the plating adhesion amount meters 53a (63a), 53b (63b), 53c (63c), 53d (63d) at the time (t4+T4) when the position Y4 is at the downstream side position β.

As a result, of the surfaces (front surface and back surface) of the steel strip S, the respective portions (upstream-side measurement surface portions) that the distance sensors 74a (84a), 74b (84b), 74c (84c), 74d (84d) face at time t4 and the respective portions (downstream-side measurement surface portions) that the measurement positions of the plating adhesion amount meters 53a (63a), 53b (63b), 53c (63c), 53d (63d) face at time (t4+T4) become the same.

At time (t4+T4), the plating adhesion amount meters 53a, 53b, 53c, 53d, 63a, 63b, 63c, 63d face the downstream-side measurement surface portions, measure the plating adhesion amount of the downstream-side measurement surface portions, and output the plating adhesion amount actual measurement values W11 (t4+T4), W12 (t4+T4), W13 (t4+T4), W14 (t4+T4), W21 (t4+T4), W22 (t4+T4), W23 (t4+T4), W24 (t4+T4). The plating adhesion amount actual measurement values W11 (t4+T4), W12 (t4+T4), W13 (t4+T4), W14 (t4+T4), W21 (t4+T4), W22 (t4+T4), W23 (t4+T4), W24 (t4+T4) are stored in the storage part 160.

The movable body control part 130 performs a similar control to the above also at the respective times (t5+T5), (t6+T6), and so on, when times T5, T6 pass after times t5, t6. That is, the movable body control part 130 moves the movable bodies 52a (62a), 52b (62b), 52c (62c), 52d (62d) so that the respective distances, in the strip width direction, between the downstream-side edge position Ed21 (t5, t6, . . . ) at the times (t5+T5), (t6+T6), and so on and the plating adhesion amount meters 53a (63a), 53b (63b), 53c (63c), 53d (63d) become equal to the respective distances in the strip width direction between the upstream-side edge position Ed11 (t5, t6, . . . ) and the distance sensors 74a (84a), 74b (84b), 74c (84c), 74d (84d).

As a result, of the surfaces (front surface and back surface) of the steel strip S, the respective portions (upstream-side measurement surface portions) that the distance sensors 74a (84a), 74b (84b), 74c (84c), 74d (84d) face at time t5, t6, and so on, and the respective portions (downstream-side measurement surface portions) that the plating adhesion amount meters 53a (63a), 53b (63b), 53c (63c), 53d (63d) face at time (t5+T5), (t6+T6), and so on, become the same.

At time (t5+T5), (t6+T6), and so on, the plating adhesion amount meters 53a, 53b, 53c, 53d, 63a, 63b, 63c, 63d face the downstream-side measurement surface portions, measure the plating adhesion amount of the downstream-side measurement surface portions, and output the plating adhesion amount actual measurement values W11 (t5+T5), (t6+T6), and so on, W12 (t5+T5), (t6+T6), and so on, W13 (t5+T5), (t6+T6), and so on, W14 (t5+T5), (t6+T6), and so on, W21 (t5+T5), (t6+T6), and so on, W22 (t5+T5), (t6+T6), and so on, W23 (t5+T5), (t6+T6), and so on, W24 (t5+T5), (t6+T6), and so on. The plating adhesion amount actual measurement values W11 (t5+T5), (t6+T6), and so on, W12 (t5+T5), (t6+T6), and so on, W13 (t5+T5), (t6+T6), and so on, W14 (t5+T5), (t6+T6), and so on, W21 (t5+T5), (t6+T6), and so on, W22 (t5+T5), (t6+T6), and so on, W23 (t5+T5), (t6+T6), and so on, W24 (t5+T5), (t6+T6), and so on, are stored in the storage part 160.

The strip warp shape calculation part 150 detects the strip warp shape in the strip width direction of the steel strip S at the respective times t1, t2, t3, t4, and so on. The strip warp shape at the respective times t1, t2, t3, t4, and so on, are stored in the storage part 160.

For instance, an estimation model expression of the plating adhesion amount (plating adhesion amount estimation expression) as in the following expression (1), for instance, is set for the plating adhesion amount control part 140.

$$We = G \cdot H^{n1} \cdot P^{n2} \cdot V^{n3} \qquad (1)$$

Herein, We [g/m$^2$] is the plating adhesion amount estimation value, H [mm] is the nozzle-strip distance, P [kPa] is the blow pressure of gas injected from the gas wiping nozzles 21, 22, V is the strip passing speed, and G, n1, n2, n3, and n4 are coefficients.

The estimation model expression of the plating adhesion amount is created on the basis of data obtained during many actual operations in the past.

Further, when using the nozzle-strip distances H [mm] at positions away from the upstream-side edge position Ed11 by the specific strip width direction distances X11, X12, X13, X14 (positions facing the distance sensors 74a (84a), 74b (84b), 74c (84c), 74d (84d)), it is possible to calculate the respective plating adhesion amount estimation values We [g/m$^2$] at positions away from the upstream-side edge position Ed11 by the specific strip width direction distances X11, X12, X13, X14.

The plating adhesion amount control part 140 receives the adhesion value of plating that should adhere to the steel strip S, that is, the plating adhesion amount target value Wo, as the plating adhesion amount estimation value We. The plating adhesion amount control part 140 calculates the value of the nozzle-strip distance H, the value of the blow pressure P of gas, and the strip passing speed V at which it is possible to obtain the plating adhesion amount estimation value We being the plating adhesion amount target value Wo, and control the nozzle-strip distance H, the blow pressure P of gas, and the strip passing speed V to become the calculated values of H, P, V.

The plating adhesion amount control part 140 controls the nozzle-strip distances H11, H12, H13, H14, H21, H22, H23, H24 by adjusting the movement positions of the correction units 31, 32 with the correction unit control device 101, adjusts the gas blow pressure P with the gas blow pressure control device 105, or adjusts the strip passing speed V with the strip passing speed control device 106, so as to obtain the nozzle-strip distance H, the gas blow pressure P, and the strip passing speed V obtained by calculation, so that the plating adhesion amount estimation value We becomes equal to the plating adhesion amount target value Wo.

Meanwhile, it is also possible to control the nozzle-strip distances H11, H12, H13, H14, H21, H22, H23, H24, by adjusting the strip passing position with the roller moving motor control device 107.

The plating adhesion amount control part 140 imports the nozzle-strip distances H11 (t1, 2, t3, t4, t5, t6, ...), H21 (t1, t2, t3, t4, t5, t6, ...), H12 (t1, t2, t3, t4, t5, t6, ...), H22 (t1, t2, t3, t4, t5, t6, ...), H13 (t1, t2, t3, t4, t5, t6, ...), H23 (t1, t2, t3, t4 t5, t6, ...), H14 (t1, t2, t3, t4, t5, t6, ...), H24 (t1, t2, t3, t4, t5, t6, ...) at the respective times (t1, t2, t3, t4, t5, t6, ...) stored in the storage part 160.

Furthermore, the plating adhesion amount control part 140 imports the gas blow pressures P (t1), P (t2), P (t3), P (t4), P (t5), P (t6), and so on, at the respective time (t1, t2, t3, t4, t5, t6, ...) stored in the storage part 160.

Furthermore, the plating adhesion amount control part 140 imports the strip passing speeds V (t1), V (t2), V (t3), V (t4), V (t5), V (t6), and so on, at the respective time (t1, t2, t3, t4, t5, t6, ...) stored in the storage part 160.

Furthermore, the plating adhesion amount control part 140 obtains the plating adhesion amount estimation value We of each pf the portions (upstream-side measurement surface portions) facing the distance sensors 74a, 74b, 74c, 74d, 74e, 84a, 84b, 84c, 84d, at time t1, of the surfaces (front surface and back surface) of the steel strip S.

That is, at time t1, of the surfaces of the steel strip S, the plating adhesion amount control part 140 obtains the plating adhesion amount estimation values We of the upstream side measurement portions facing the respective distance sensors 74a, 74b, 74c, 74d, 84a, 84b, 84c, 84d positioned away from the upstream-side edge position Ed11 (t1) by the specific strip width direction distances X11 (t1), X12 (t1), X13 (t1), X14 (t1).

The detailed description is as follows.

The plating adhesion amount control part 140 obtains the plating adhesion amount estimation value We (74a, t1) of the portion facing the distance sensor 74a (upstream-side measurement surface portion) by substituting the gas blow pressure P (t1) at time t1, the nozzle-strip distance H11 (t1) at time t1, and the strip passing speed V (t1) at time t1 into the above expression (1).

The plating adhesion amount control part 140 obtains the plating adhesion amount estimation value We (74b, t1) of the portion facing the distance sensor 74b (upstream-side measurement surface portion) by substituting the gas blow pressure P (t1) at time t1, the nozzle-strip distance H12 (t1) at time t1, and the strip passing speed V (t1) at time t1 into the above expression (1).

The plating adhesion amount control part 140 obtains the plating adhesion amount estimation value We (74c, t1) of the portion facing the distance sensor 74c (upstream-side measurement surface portion) by substituting the gas blow pressure P (t1) at time t1, the nozzle-strip distance H13 (t1) at time t1, and the strip passing speed V (t1) at time t1 into the above expression (1).

The plating adhesion amount control part 140 obtains the plating adhesion amount estimation value We (74d, t1) of the portion facing the distance sensor 74d (upstream-side measurement surface portion) by substituting the gas blow pressure P (t1) at time t1, the nozzle-strip distance H14 (t1) at time t1, and the strip passing speed V (t1) at time t1 into the above expression (1).

The plating adhesion amount control part 140 obtains the plating adhesion amount estimation value We (84a, t1) of the portion facing the distance sensor 84a (upstream-side measurement surface portion) by substituting the gas blow pressure P (t1) at time t1, the nozzle-strip distance H21 (t1) at time t1, and the strip passing speed V (t1) at time t1 into the above expression (1).

The plating adhesion amount control part 140 obtains the plating adhesion amount estimation value We (84b, t1) of the portion facing the distance sensor 84b (upstream-side measurement surface portion) by substituting the gas blow pressure P (t1) at time t1, the nozzle-strip distance H22 (t1) at time t1, and the strip passing speed V (t1) at time t1 into the above expression (1).

The plating adhesion amount control part 140 obtains the plating adhesion amount estimation value We (84c, t1) of the portion facing the distance sensor 84c (upstream-side measurement surface portion) by substituting the gas blow pressure P (t1) at time t1, the nozzle-strip distance H23 (t1) at time t1, and the strip passing speed V (t1) at time t1 into the above expression (1).

The plating adhesion amount control part 140 obtains the plating adhesion amount estimation value We (84*d*, t1) of the portion facing the distance sensor 84*d* (upstream-side measurement surface portion) by substituting the gas blow pressure P (t1) at time t1, the nozzle-strip distance H24 (t1) at time t1, and the strip passing speed V (t1) at time t1 into the above expression (1).

Also at other times t2, t3, t4, t5, t6, and so on, the plating adhesion amount control part 140 obtains the plating adhesion amount estimation values We at the upstream-side measurement surface portions facing the respective distance sensors 74*a*, 74*b*, 74*c*, 74*d*, 84*a*, 84*b*, 84*c*, 84*d*, positioned away from the upstream-side edge position Ed11 (t2, t3, t4, t5, t6, . . . ) by the specific strip width direction distances X11 (t2, t3, t4, t5, t6, . . . ), X12 (t2, t3, t4, t5, t6, . . . ), X13 (t2, t3, t4, t5, t6, . . . ), X14 (t2, t3, t4, t5, t6, . . . ), of the surfaces of the steel strip S.

That is, the plating adhesion amount control part 140 obtains:
the plating adhesion amount estimation values We (74*a*, t2), We (74*a*, t3), We (74*a*, t4), We (74*a*, t5), We (74*a*, t6), and so on, of the portion (upstream-side measurement surface portion) facing the distance sensor 74*a*;
the plating adhesion amount estimation values We (74*b*, t2), We (74*b*, t3), We (74*b*, t4), We (74*b*, t5), We (74*b*, t6), and so on, of the portion (upstream-side measurement surface portion) facing the distance sensor 74*b*;
the plating adhesion amount estimation values We (74*c*, t2), We (74*c*, t3), We (74*c*, t4), We (74*c*, t5), We (74*c*, t6), and so on, of the portion (upstream-side measurement surface portion) facing the distance sensor 74*c*;
the plating adhesion amount estimation values We (74*d*, t2), We (74*d*, t3), We (74*d*, t4), We (74*d*, t5), We (74*d*, t6), and so on, of the portion (upstream-side measurement surface portion) facing the distance sensor 74*d*;
the plating adhesion amount estimation values We (84*a*, t2), We (84*a*, t3), We (84*a*, t4), We (84*a*, t5), We (84*a*, t6), and so on, of the portion (upstream-side measurement surface portion) facing the distance sensor 84*a*;
the plating adhesion amount estimation values We (84*b*, t2), We (84*b*, t3), We (84*b*, t4), We (84*b*, t5), We (84*b*, t6), and so on, of the portion (upstream-side measurement surface portion) facing the distance sensor 84*b*;
the plating adhesion amount estimation values We (84*c*, t2), We (84*c*, t3), We (84*c*, t4), We (84*c*, t5), We (84*c*, t6), and so on, of the portion (upstream-side measurement surface portion) facing the distance sensor 84*c*; and
The plating adhesion amount estimation values We (84*d*, t2), We (84*d*, t3), We (84*d*, t4), We (84*d*, t5), We (84*d*, t6), and so on, of the portion (upstream-side measurement surface portion) facing the distance sensor 84*d*.

The storage part 160 stores the plating adhesion amount estimation value We at each upstream-side measurement surface portion at each time.

As described above, of the surfaces (front surface and back surface) of the steel strip S, the respective portions (upstream-side measurement surface portions) that the distance sensors 74*a* (84*a*), 74*b* (84*b*), 74*c* (84*c*), 74*d* (84*d*) face at time t1, t2, t3, t4, t5, t6, and so on, and the respective portions (downstream-side measurement surface portions) that the measurement positions of the plating adhesion amount meters 53*a* (63*a*), 53*b* (63*b*), 53*c* (63*c*), 53*d* (63*d*) face at time (t1+T1), (t2+T2), (t3+T3), (t4+T4), (t5+T5), (t6+T6), and so on, are the same.

Thus, the plating adhesion amount control part 140 extracts, from the storage part 160, the plating adhesion amount estimation values We of the respective portions (upstream-side measurement surface portions) that the distance sensors 74*a* (84*a*), 74*b* (84*b*), 74*c* (84*c*), 74*d* (84*d*) face at time t1, t2, t3, t4, t5, t6, and so on, and the plating adhesion amount actual measurement values W of the respective portions (downstream-side measurement surface portions) that the measurement positions of the plating adhesion amount meters 53*a* (63*a*), 53*b* (63*b*), 53*c* (63*c*), 53*d* (63*d*) face at time (t1+T1), (t2+T2), (t3+T3), (t4+T4), (t5+T5), (t6+T6), and so on, and compare the plating adhesion amount estimation values We with the plating adhesion amount actual measurement values W to obtain the differences Δ (see FIGS. 10 and 11).

The detailed description with reference to FIGS. 10 and 11 is as follows.

The plating adhesion amount control part 140 compares the plating adhesion amount estimation values at time t1 with the plating adhesion amount actual measurement values at time (t1+T1) as follows to obtain the differences.

The plating adhesion amount control part 140 compares the plating adhesion amount estimation value We (74*a*, t1) with the plating adhesion amount actual measurement value W11 (t1+T1) and obtain the difference Δ (74*a*, t1) therebetween.

The plating adhesion amount control part 140 compares the plating adhesion amount estimation value We (74*b*, t1) with the plating adhesion amount actual measurement value W12 (t1+T1) and obtain the difference Δ (74*b*, t1) therebetween.

The plating adhesion amount control part 140 compares the plating adhesion amount estimation value We (74*c*, t1) with the plating adhesion amount actual measurement value W13 (t1+T1) and obtain the difference Δ (74*c*, t1) therebetween.

The plating adhesion amount control part 140 compares the plating adhesion amount estimation value We (74*d*, t1) with the plating adhesion amount actual measurement value W14 (t1+T1) and obtain the difference Δ (74*d*, t1) therebetween.

The plating adhesion amount control part 140 compares the plating adhesion amount estimation value We (84*a*, t1) with the plating adhesion amount actual measurement value W21 (t1+T1) and obtain the difference Δ (84*a*, t1) therebetween.

The plating adhesion amount control part 140 compares the plating adhesion amount estimation value We (84*b*, t1) with the plating adhesion amount actual measurement value W22 (t1+T1) and obtain the difference Δ (84*b*, t1) therebetween.

The plating adhesion amount control part 140 compares the plating adhesion amount estimation value We (84*c*, t1) with the plating adhesion amount actual measurement value W23 (t1+T1) and obtain the difference Δ (84*c*, t1) therebetween.

The plating adhesion amount control part 140 compares the plating adhesion amount estimation value We (84*d*, t1) with the plating adhesion amount actual measurement value W24 (t1+T1) and obtain the difference Δ (84*d*, t1) therebetween.

The plating adhesion amount control part 140 compares the plating adhesion amount estimation value at time t2 with the plating adhesion amount actual measurement value at time (t2+T2) as follows to obtain the difference.

The plating adhesion amount control part 140 compares the plating adhesion amount estimation value We (74*a*, t2)

with the plating adhesion amount actual measurement value W11 (t2+T2) and obtain the difference Δ (74a, t2) therebetween.

The plating adhesion amount control part 140 compares the plating adhesion amount estimation value We (74*b*, t2) with the plating adhesion amount actual measurement value W12 (t2+T2) and obtain the difference Δ (74*b*, t2) therebetween.

The plating adhesion amount control part 140 compares the plating adhesion amount estimation value We (74*c*, t2) with the plating adhesion amount actual measurement value W13 (t2+T2) and obtain the difference Δ (74*c*, t2) therebetween.

The plating adhesion amount control part 140 compares the plating adhesion amount estimation value We (74*d*, t2) with the plating adhesion amount actual measurement value W14 (t2+T2) and obtain the difference Δ (74*d*, t2) therebetween.

The plating adhesion amount control part 140 compares the plating adhesion amount estimation value We (84*a*, t2) with the plating adhesion amount actual measurement value W21 (t2+T2) and obtain the difference Δ (84*a*, t2) therebetween.

The plating adhesion amount control part 140 compares the plating adhesion amount estimation value We (84*b*, t2) with the plating adhesion amount actual measurement value W22 (t2+T2) and obtain the difference Δ (84*b*, t2) therebetween.

The plating adhesion amount control part 140 compares the plating adhesion amount estimation value We (84*c*, t2) with the plating adhesion amount actual measurement value W23 (t2+T2) and obtain the difference Δ (84*c*, t2) therebetween.

The plating adhesion amount control part 140 compares the plating adhesion amount estimation value We (84*d*, t2) with the plating adhesion amount actual measurement value W24 (t2+T2) and obtain the difference Δ (84*d*, t2) therebetween.

The plating adhesion amount control part 140 compares the plating adhesion amount estimation value at time t3 with the plating adhesion amount actual measurement value at time (t3+T3) as follows to obtain the difference.

The plating adhesion amount control part 140 compares the plating adhesion amount estimation value We (74*a*, t3) with the plating adhesion amount actual measurement value W11 (t3+T3) and obtain the difference Δ (74*a*, t3) therebetween.

The plating adhesion amount control part 140 compares the plating adhesion amount estimation value We (74*b*, t3) with the plating adhesion amount actual measurement value W12 (t3+T3) and obtain the difference Δ (74*b*, t3) therebetween.

The plating adhesion amount control part 140 compares the plating adhesion amount estimation value We (74*c*, t3) with the plating adhesion amount actual measurement value W13 (t3+T3) and obtain the difference Δ (74*c*, t3) therebetween.

The plating adhesion amount control part 140 compares the plating adhesion amount estimation value We (74*d*, t3) with the plating adhesion amount actual measurement value W14 (t3+T3) and obtain the difference Δ (74*d*, t3) therebetween.

The plating adhesion amount control part 140 compares the plating adhesion amount estimation value We (84*a*, t3) with the plating adhesion amount actual measurement value W21 (t3+T3) and obtain the difference Δ (84*a*, t3) therebetween.

The plating adhesion amount control part 140 compares the plating adhesion amount estimation value We (84*b*, t3) with the plating adhesion amount actual measurement value W22 (t3+T3) and obtain the difference Δ (84*b*, t3) therebetween.

The plating adhesion amount control part 140 compares the plating adhesion amount estimation value We (84*c*, t3) with the plating adhesion amount actual measurement value W23 (t3+T3) and obtain the difference Δ (84*c*, t3) therebetween.

The plating adhesion amount control part 140 compares the plating adhesion amount estimation value We (84*d*, t3) with the plating adhesion amount actual measurement value W24 (t3+T3) and obtain the difference Δ (84*d*, t3) therebetween.

Subsequently, the plating adhesion amount control part 140 compares the plating adhesion amount estimation value at time t4, t5, t6, and so on with the plating adhesion amount actual measurement value at time (t4+T4), (t5+T5), (t6+T6), and so on similarly, to obtain the following differences.

Differences Δ (74*a*, t4), Δ (74*a*, t5), Δ (74*a*, t6), and so on.
Differences Δ (74*b*, t4), Δ (74*b*, t5), Δ (74*b*, t6), and so on.
Differences Δ (74*c*, t4), Δ (74*c*, t5), Δ (74*c*, t6), and so on.
Differences Δ (74*d*, t4), Δ (74*d*, t5), Δ (74*d*, t6), and so on.
Differences Δ (84*a*, t4), Δ (84*a*, t5), Δ (84*a*, t6), and so on.
Differences Δ (84*b*, t4), Δ (84*b*, t5), Δ (84*b*, t6), and so on.
Differences Δ (84*c*, t4), Δ (84*c*, t5), Δ (84*c*, t6), and so on.
Differences Δ (84*d*, t4), Δ (84*d*, t5), Δ (84*d*, t6), and so on.

The respective differences Δ obtained as described above are stored in the storage part 160.

The plating adhesion amount control part 140 corrects the coefficients G, n1, n2, n3, n4 of the estimation model expression of the plating adhesion amount shown by the above expression (1), at predetermined timings so that the obtained differences Δ become zero. By correcting the coefficients as described above, the accuracy of the estimation model expression of the plating adhesion amount improves, and the adhesion amount of plating that should adhere to the steel strip S approaches the target adhesion amount more accurately.

In this case, with respect to both of the transferring direction of the steel strip S and the strip width direction of the steel strip S, of the surfaces of the steel strip S (front surface and back surface), each portion (upstream-side measurement surface portion) where the plating adhesion amount estimation value We is estimated and each portion (downstream-side measurement surface portion) where the plating adhesion amount actual measurement value is measured are the same portion, and thus the accuracy of the differences Δ obtained as described above is high. The coefficients G, n1, n2, n3, n4 of the estimation model expression of the plating adhesion amount are corrected on the basis of the highly accurate differences Δ, and thus the correction accuracy of the coefficients also improves. Furthermore, since the plating adhesion amount is controlled by using the estimation model expression of the plating adhesion amount whose coefficient is corrected with high accuracy, the control accuracy of the plating adhesion amount also improves.

By using the corrected "plating adhesion amount estimation expression" to control the nozzle-strip distance H, the gas blow pressure P, and the strip passing speed V of the steel strip, it is possible to control the plating adhesion amount with high accuracy.

Moreover, the specific strip width direction distances X11, X12, X13, X14 to the distance sensors 74*a* (84*a*), 74*b* (84*b*), 74*c* (84*c*), 74*d* (84*d*) are distances with respect to the upstream-side edge position Ed11, and the specific strip width direction distances X21, X22, X23, X24 to the measurement positions of the plating adhesion amount meters 53a (63a), 53b (63b), 53c (63c), 53d (63d), are distances with respect to the downstream-side edge position Ed21. Thus, even if the steel strip S meanders when being transferred, the above described calculation is not influenced negatively, and the above coefficient correction and the above plating adhesion amount control can be performed accurately.

Furthermore, with the plating adhesion amount control part 140 correcting the coefficients G, n1, n2, n3, n4 of the estimation model expression of the plating adhesion amount shown by the above expression (1) so that the differences Δ become zero each time the above differences Δ are obtained, the response speed for correcting the plating adhesion amount by using the corrected estimation model expression of the plating adhesion amount increases.

Thus, the response speed increases when correcting the plating adhesion amount by changing the gas blow pressure or the like quickly when the joint between the precedent steel strip and the subsequent steel strip having a different plating adhesion amount target value from the precedent steel strip passes the arrangement position of the gas wiping nozzles 21, 22 to change the amount of molten metal that adheres to the subsequent steel strip.

Further, in a case where the plating adhesion amount does not become a target plating adhesion amount merely by correction of the coefficients G, n1, n2, n3, n4 of the estimation model expression of the plating adhesion amount described in the above (1), the setting is reconfigured so as to use an estimation model expression of the plating adhesion amount that is a different function expression, instead of the estimation model expression of the plating adhesion amount according to the above expression (1).

Second Working Example

Next, the plating adhesion amount control mechanism and the plating adhesion amount control method according to the second working example of the present invention will be described. In the second working example, the control operation by the movable body control part 130 and the calculation operation by the plating adhesion amount control part 140 are different from those of the first working example. Thus, the difference from the first working example will be mainly described. The other calculation operations are similar to those of the first working example, and thus the same description will not be repeated.

For the movable body control part 130, four specific strip width direction distances X31, X32, X33, X34, with respect to the downstream-side edge position Ed21 (see FIG. 12), are preliminarily set. The specific strip width direction distances X31, X32, X33, X34 are each a prefixed distance extending in the strip width direction from the edge position of the steel strip S.

Further, the movable body control part 130 carries out the following controls each time.

Move the movable bodies 52a, 62a so that the distance between the downstream-side edge position Ed21 and the plating adhesion amount meters 53a, 63a becomes the specific strip width direction distance X31.

Move the movable bodies 52b, 62b so that the distance between the downstream-side edge position Ed21 and the plating adhesion amount meters 53b, 63b becomes the specific strip width direction distance X32.

Move the movable bodies 52c, 62c so that the distance between the downstream-side edge position Ed21 and the plating adhesion amount meters 53c, 63c becomes the specific strip width direction distance X33.

Move the movable bodies 52d, 62d so that the distance between the downstream-side edge position Ed21 and the plating adhesion amount meters 53d, 63d becomes the specific strip width direction distance X34.

Of the surfaces (front surface and back surface) of the steel strip S, the respective portions facing the measurement positions of the plating adhesion amount meters 53a (63a), 53b (63b), 53c (63c), 53d (63d) become the downstream-side measurement surface portions.

(Overview of the Control Operation)

The overview of the control operation will be described.

(a) At a certain time (e.g. time t1), calculate the plating adhesion amount estimation value We (X31F, t1) of the front-surface side and the plating adhesion amount estimation value We (W31B, t1) of the back-surface side at a position offset from the upstream-side edge position Ed11 (t1) in the strip width direction by the specific strip width direction distance X31 being a fixed distance ("upstream measurement surface portion"). This estimation calculation is performed by using "plating adhesion amount estimation expression". The plating adhesion amount estimation expression represents a relationship between "the nozzle-strip distance H, the gas blow pressure P, the strip passing speed V of the steel strip, and the specific strip width direction distance X at the upstream side", and the "plating adhesion amount estimation value We".

(b) At the time (e.g. time t1+T1) when time T1 passes after the above time (e.g. time t1), move the measurement position of the plating adhesion amount meters 53a, 63a to a position offset from the downstream-side edge position Ed21+T1) by the specific strip width direction distance X31 being is fixed distance. Of the surface of the steel strip S, the position corresponding to the measurement position of the plating adhesion amount meters 53a, 63a that has moved to a position offset from the downstream-side edge position Ed21+T1) in the strip width direction by the specific strip width direction distance X31 is the "downstream-side measurement surface portion". Further, detect the plating adhesion amount actual measurement values W11 (t1+T1), W21+T1), at the downstream-side measurement surface portion, at this time (t1+T1).

(c) The "upstream-side measurement surface portion" at a certain time (e.g. time t1) and the above "downstream-side measurement surface portion" at the time (e.g. time t1+T1) when time T1 passes after the time (e.g. time t1) are the same portion (position) of the strip surface of the steel strip S. That is, the "upstream-side measurement surface portion" at a time (e.g. time t1) is transferred from the upstream side toward the downstream side of the transferring direction C with time, and the position of the "upstream-side measurement surface portion" becomes the "downstream-side measurement surface portion", at the time (e.g. time t1+T1) when time T1 passes from the time (e.g. time t1).

In other words, the "upstream-side measurement surface portion" at a certain time (e.g. time t1) and the above "downstream-side measurement surface portion" at the time (e.g. time t1+T1) when time T1 passes after the time (e.g. time t1), are the same portion (position) of the strip surface of the steel strip S, both in the longitudinal direction and the strip width direction of the strip surface of the steel strip S.

(d) Obtain the differences Δ (X31F, t1), Δ (X31B, t1) between the plating adhesion amount estimation values We (X31F, t1), We (X31B, t) obtained in the above (a) and the plating adhesion amount actual measurement values W11 (t1+T1), W21 (t1+T1) obtained in the above (b).

(e) Correct the "plating adhesion amount estimation expression" so that the differences Δ (X31F, t1), Δ (X31B, t1) become zero, in other words, so that the plating adhesion amount estimation values We (X31F, t1), We (X31B, t) become equal to the plating adhesion amount actual measurement values W11+T1), W21 (t1+T1).

(f) By using the corrected "plating adhesion amount estimation expression" to control the nozzle-strip distance H, the gas blow pressure P, and the strip passing speed V of the steel strip, it is possible to control the plating adhesion amount with high accuracy.

(Detailed Description of the Control Operation)

The control operation will be described in detail.

The plating adhesion amount meters 53*a*, 53*b*, 53*c*, 53*d*, 63*a*, 63*b*, 63*c*, 63*d*:

at time (t1+T1), measure the plating adhesion amount, and output the plating adhesion amount actual measurement values W11 (t1+T1), W12 (t1+T1), W13 (t1+T1), W14 (t1+T1), W21 (t1+T1), W22 (t1+T1), W23 (t1+T1), W24 (t1+T1);

at time (t2+T2), measure the plating adhesion amount, and output the plating adhesion amount actual measurement values W11 (t2+T2), W12 (t2+T2), W13 (t2+T2), W14 (t2+T2), W21 (t2+T2), W22 (t2+T2), W23 (t2+T2), W24 (t2+T2);

at time (t3+T3), measure the plating adhesion amount, and output the plating adhesion amount actual measurement values W11 (t3+T3), W12 (t3+T3), W13 (t3+T3), W14 (t3+T3), W21 (t3+T3), W22 (t3+T3), W23 (t3+T3), W24 (t3+T3); and at time (t4+T4), measure the plating adhesion amount, and output the plating adhesion amount actual measurement values W11 (t4+T4), W12 (t4+T4), W13 (t4+T4), W14 (t4+T4), W21 (t4+T4), W22 (t4+T4), W23 (t4+T4), W24 (t4+T4).

Also, at subsequent time (t5+T5), (t6+T6), and so on, the plating adhesion amount meters 53*a*, 53*b*, 53*c*, 53*d*, 63*a*, 63*b*, 63*c*, 63*d* output the plating adhesion amount actual measurement values.

Accordingly, the following values outputted at the respective times (t1+T1), (t2+T2), (t3+T3), (t4+T4), (t5+T5), (t6+T6), and so on, are stored in the storage part 160.

The plating adhesion amount actual measurement values W11 (t1+T1), W12 (t1+T1), W13 (t1+T1), W14 (t1+T1), W21 (t1+T1), W22 (t1+T1), W23 (t1+T1), W24 (t1+T1).

The plating adhesion amount actual measurement values W11 (t2+T2), W12 (t2+T2), W13 (t2+T2), W14 (t2+T2), W21 (t2+T2), W22 (t2+T2), W23 (t2+T2), W24 (t2+T2).

The plating adhesion amount actual measurement values W11 (t3+T3), W12 (t3+T3), W13 (t3+T3), W14 (t3+T3), W21 (t3+T3), W22 (t3+T3), W23 (t3+T3), W24 (t3+T3).

The plating adhesion amount actual measurement values W11 (t4+T4), W12 (t4+T4), W13 (t4+T4), W14 (t4+T4), W21 (t4+T4), W22 (t4+T4), W23 (t4+T4), W24 (t4+T4).

The plating adhesion amount actual measurement values W11 (t5+T5), W12 (t5+T5), W13 (t5+T5), W14 (t5+T5), W21 (t5+T5), W22 (t5+T5), W23 (t5+T5), W24 (t5+T5).

The plating adhesion amount actual measurement values W11 (t6+T6), W12 (t6+T6), W13 (t6+T6), W14 (t6+T6), W21 (t6+T6), W22 (t6+T6), W23 (t6+T6), W24 (t6+T6), and so on.

The plating adhesion amount control part 140 imports the strip warp shape of the steel strip S in the strip width direction at the respective times t1, t2, t3, t4, and so on, stored in the storage part 160.

Furthermore, the plating adhesion amount control part 140 imports the nozzle-strip distances H11, H12, H13, H14, H21, H22, H23, H24, and so on, at the respective times t1, t2, t3, t4, and so on, stored in the storage part 160. The nozzle-strip distances H11, H12, H13, H14, H21, H22, H23, H24 are nozzle-strip distances at arrangement positions of the distance sensors 74*a*, 74*b*, 74*c*, 74*d*, 84*a*, 84*b*, 84*c*, 8*d*.

Further, the plating adhesion amount control part 140 calculates the nozzle-strip distances H11, H12, H13, H14, H21, H22, H23, H24 at time t1 by interpolation taking into account the strip warp shape of the steel strip S in the strip width direction at time t1, and thereby obtains the nozzle-strip distance H11*c*, H12*c*, H13*c*, H14*c*, H21*c*, H22*c*, H23*c*, H24*c* at positions away from the upstream-side edge position Ed11 by the specific strip width direction distances X31, X32, X33, X34 at time t1.

By substituting the above described interpolated nozzle-strip distances H11*c*, H12*c*, H13*c*, H14*c*, H21*c*, H22*c*, H23*c*, H24*c* into the estimation model expression of the plating adhesion amount of the expression (1), it is possible to obtain the respective plating adhesion amount estimation values We at positions away from the upstream-side edge position Ed11 by the specific strip width direction distances X31, X32, X33, X34.

That is, in the second working example, the "plating adhesion amount estimation expression" is the calculation method of obtaining the plating adhesion amount estimation values We by substituting the nozzle-strip distances at positions away by the specific strip width direction distances (nozzle-strip distances obtained by interpolation) into the estimation model expression of the plating adhesion amount according to the above expression (1).

Thus, the plating adhesion amount control part 140 substitutes the nozzle-strip distances H11*c*, H12*c*, H13*c*, H14*c*, H21*c*, H22*c*, H23*c*, H24*c* into the estimation model expression of the plating adhesion amount of the expression (1) at time t1, to obtain the following at time t1 and at the upstream side position α.

The plating adhesion amount estimation value We (X31F, t1) at the front-surface side of the steel strip S at the position (upstream-side measurement surface portion) where the specific strip width direction distance from the upstream-side edge position Ed11 is X31.

The plating adhesion amount estimation value We (X32F, t1) at the front-surface side of the steel strip S at the position (upstream-side measurement surface portion) where the specific strip width direction distance from the upstream-side edge position Ed11 is X32.

The plating adhesion amount estimation value We (X33F, t1) at the front-surface side of the steel strip S at the position (upstream-side measurement surface portion) where the specific strip width direction distance from the upstream-side edge position Ed11 is X33.

The plating adhesion amount estimation value We (X34F, t1) at the front-surface side of the steel strip S at the position (upstream-side measurement surface portion) where the specific strip width direction distance from the upstream-side edge position Ed11 is X34.

The plating adhesion amount estimation value We (X31B, t1) at the back-surface side of the steel strip S at the position (upstream-side measurement surface portion) where the specific strip width direction distance from the upstream-side edge position Ed11 is X31.

The plating adhesion amount estimation value We (X32B, t1) at the back-surface side of the steel strip S at the position (upstream-side measurement surface portion) where the specific strip width direction distance from the upstream-side edge position Ed11 is X32.

The plating adhesion amount estimation value We (X33B, t1) at the back-surface side of the steel strip S at the position (upstream-side measurement surface portion) where the specific strip width direction distance from the upstream-side edge position Ed11 is X33.

The plating adhesion amount estimation value We (X34B, t1) at the back-surface side of the steel strip S at the position (upstream-side measurement surface portion) where the specific strip width direction distance from the upstream-side edge position Ed11 is X34.

Similarly, the plating adhesion amount control part 140 obtains the following at times t2, t3, t4, t5, t6, and so on, at the upstream side position α:

The plating adhesion amount estimation values We (X31F, t2), We (X31F, t3), We (X31F, t4), We (X31F, t5), We (X31F, t6), and so on, at the front-surface side of the steel strip S at the position (upstream-side measurement surface portion) where the specific strip width direction distance from the upstream-side edge position Ed11 is X31;

The plating adhesion amount estimation values We (X31B, t2), We (X31B, t3), We (X31B, t4), We (X31B, t5), We (X31B, t6), and so on, at the back-surface side of the steel strip S at the position (upstream-side measurement surface portion) where the specific strip width direction distance from the upstream-side edge position Ed11 is X31;

The plating adhesion amount estimation values We (X32F, t2), We (X32F, t3), We (X32F, t4), We (X32F, t5), We (X32F, t6), and so on, at the front-surface side of the steel strip S at the position (upstream-side measurement surface portion) where the specific strip width direction distance from the upstream-side edge position Ed11 is X32;

The plating adhesion amount estimation values We (X32B, t2), We (X32B, t3), We (X32B, t4), We (X32B, t5), We (X32B, t6), and so on, at the back-surface side of the steel strip S at the position (upstream-side measurement surface portion) where the specific strip width direction distance from the upstream-side edge position Ed11 is X32;

The plating adhesion amount estimation values We (X33F, t2), We (X33F, t3), We (X33F, t4), We (X33F, t5), We (X33F, t6), and so on, at the front-surface side of the steel strip S at the position (upstream-side measurement surface portion) where the specific strip width direction distance from the upstream-side edge position Ed11 is X33;

The plating adhesion amount estimation values We (X33B, t2), We (X33B, t3), We (X33B, t4), We (X33B, t5), We (X33B, t6), and so on, at the back-surface side of the steel strip S at the position (upstream-side measurement surface portion) where the specific strip width direction distance from the upstream-side edge position Ed11 is X33;

The plating adhesion amount estimation values We (X34F, t2), We (X34F, t3), We (X34F, t4), We (X34F, t5), We (X34F, t6), and so on, at the front-surface side of the steel strip S at the position (upstream-side measurement surface portion) where the specific strip width direction distance from the upstream-side edge position Ed11 is X34; and The plating adhesion amount estimation values We (X34B, t2), We (X34B, t3), We (X34B, t4), We (X34B, t5), We (X34B, t6), and so on, at the back-surface side of the steel strip S at the position (upstream-side measurement surface portion) where the specific strip width direction distance from the upstream-side edge position Ed11 is X34;

The plating adhesion amount estimation values We at the positions (upstream-side measurement surface portions) where the specific strip width direction distances from the upstream-side edge position Ed11 are X31, X32, X33, X34 at the respective times t1, t2, t3, t4, t5, t6, and so on, are stored in the storage part 160.

In the second working example, of the surfaces (front surface and back surface) of the steel strip S, the respective positions (upstream-side measurement surface portions) away from the upstream-side edge position Ed11 by the specific strip width direction distances X31, X32, X33, X34, which are positions to obtain the plating adhesion amount estimation values We at times t1, t2, t3, t4, t5, t6, and so on, are the same as the respective positions (downstream-side measurement surface portions) away from the downstream-side edge position Ed21 by the specific strip width direction distances X31, X32, X33, 34, which are positions to obtain the plating adhesion amount actual measurement values Wo at times t1+T1, t2+T2, t3+T3, T4+T4, t5+T5, t6+T6, and so on.

Thus, the plating adhesion amount control part 140 exports, from the storage part 160, the plating adhesion amount estimation values We at the respective positions (upstream-side measurement surface portions) away from the upstream-side edge position Ed11 by the specific strip width direction distances X31, X32, X33, X34, at times t1, t2, t3, t4, t5, t6, and so on, and the plating adhesion amount actual measurement values W at the respective positions (downstream-side measurement surface portions) away from the downstream-side edge position Ed21 by the specific strip width direction distances X31, X32, X33, X34 at times (t1+T1), (t2+T2), (t3+T3), (t4+T4), (t5+T5), (t6+T6), and so on, and compare the plating adhesion amount estimation values We with the plating adhesion amount actual measurement values W to obtain the differences Δ (see FIGS. 13 and 14).

The detailed description with reference to FIGS. 13 and 14 is as follows.

The plating adhesion amount control part 140 compares the plating adhesion amount estimation values We at time t1 with the plating adhesion amount actual measurement values W at time (t1+T1) as follows to obtain the differences.

The plating adhesion amount control part 140 compares the plating adhesion amount estimation value We (X31F, t1) with the plating adhesion amount actual measurement value W11 (t1+T1) and obtains the difference Δ (X31F, t1) therebetween.

The plating adhesion amount control part 140 compares the plating adhesion amount estimation value We (X32F, t1) with the plating adhesion amount actual measurement value W12 (t1+T1) and obtains the difference Δ (X32F, t1) therebetween.

The plating adhesion amount control part 140 compares the plating adhesion amount estimation value We (X33F, t1) with the plating adhesion amount actual measurement value W13 (t1+T1) and obtains the difference Δ (X33F, t1) therebetween.

The plating adhesion amount control part 140 compares the plating adhesion amount estimation value We (X34F, t1)

with the plating adhesion amount actual measurement value W14 (t1+T1) and obtains the difference Δ (X34F, t1) therebetween.

The plating adhesion amount control part 140 compares the plating adhesion amount estimation value We (X31B, t1) with the plating adhesion amount actual measurement value W21 (t1+T1) and obtains the difference Δ (X31B, t1) therebetween.

The plating adhesion amount control part 140 compares the plating adhesion amount estimation value We (X32B, t1) with the plating adhesion amount actual measurement value W22 (t1+T1) and obtains the difference Δ (X32B, t1) therebetween.

The plating adhesion amount control part 140 compares the plating adhesion amount estimation value We (X33B, t1) with the plating adhesion amount actual measurement value W23 (t1+T1) and obtains the difference Δ (X33B, t1) therebetween.

The plating adhesion amount control part 140 compares the plating adhesion amount estimation value We (X34B, t1) with the plating adhesion amount actual measurement value W24 (t1+T1) and obtains the difference Δ (X34B, t1) therebetween.

Subsequently, the plating adhesion amount control part 140 compares the plating adhesion amount estimation value We at times t2, t3, t4, t5, t6, and so on, with the plating adhesion amount actual measurement value W at times (t2+T2), (t3+T3), (t4+T4), (t5+T5), (t6+T6), and so on, similarly, to obtain the following differences.

Differences Δ (X31F, t2), Δ (X31F, t3), Δ (X31F, t4), and so on.
Differences Δ (X32F, t2), Δ (X32F, t3), Δ (X32F, t4), and so on.
Differences Δ (X33F, t2), Δ (X33F, t3), Δ (X33F, t4), and so on.
Differences Δ (X34F, t2), Δ (X34F, t3), Δ (X34F, t4), and so on.
Differences Δ (X31B, t2), Δ (X31B, t3), Δ (X31B, t4), and so on.
Differences Δ (X32B, t2), Δ (X32B, t3), Δ (X32B, t4), and so on.
Differences Δ (X33B, t2), Δ (X33B, t3), Δ (X33B, t4), and so on.
Differences Δ (X34B, t2), Δ (X34B, t3), Δ (X34B, t4), and so on.

The respective differences Δ obtained as described above are stored in the storage part 160.

Of the "plating adhesion amount estimation expression" in the second working example", at each of the predetermined timings or each time the above differences Δ are obtained, the plating adhesion amount control part 140:
corrects the coefficients G, n1, n2, n3, n4 of the estimation model expression of the plating adhesion amount shown in the above expression (1); or
correct the calculation method for obtaining the plating adhesion amount estimation values We of the plating adhesion amount at all positions in the strip width direction by taking into account the strip warp shape in the strip width direction of the steel strip S to the plating adhesion estimation values obtained by the estimation model expression of the plating adhesion amount,
so that the obtained differences Δ become zero.

By correcting the coefficients as described above, the accuracy of the "plating adhesion amount estimation expression" including the estimation model expression of the plating adhesion amount improves, and the adhesion amount of plating that adheres to the steel strip S approaches the target adhesion amount more accurately.

By using the accordingly corrected "plating adhesion amount estimation expression" to control the nozzle-strip distance H, the gas blow pressure P, and the strip passing speed V of the steel strip, it is possible to control the plating adhesion amount with high accuracy.

Third Working Example

Next, the plating adhesion amount control mechanism and the plating adhesion amount control method according to the third working example will be described.

(Mechanical Configuration)

Firstly, the mechanical configuration will be described.

Figure 15:
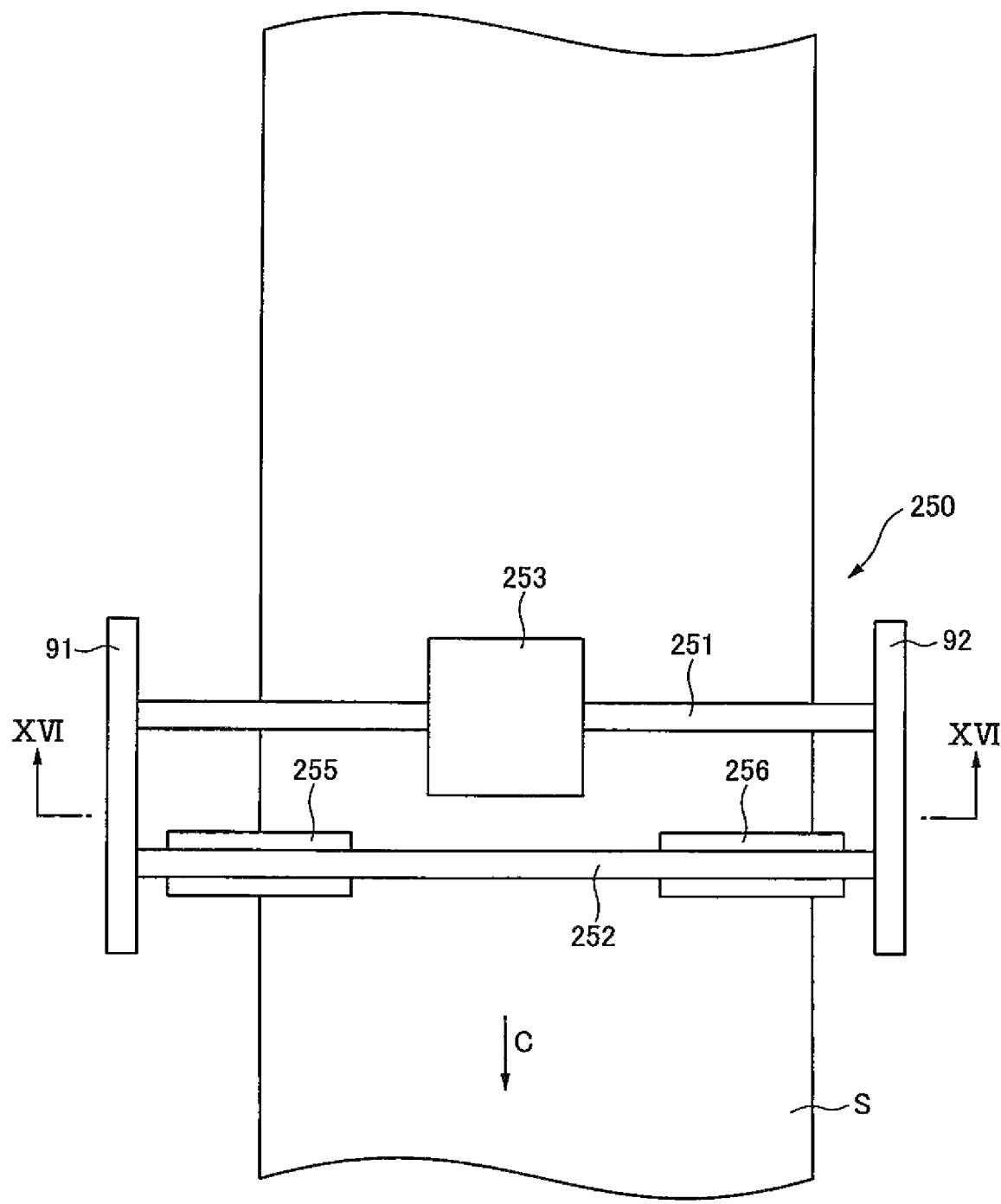
FIG. 15 is a planar view showing a plating adhesion amount measuring device used in the third working example.
Figure 16:
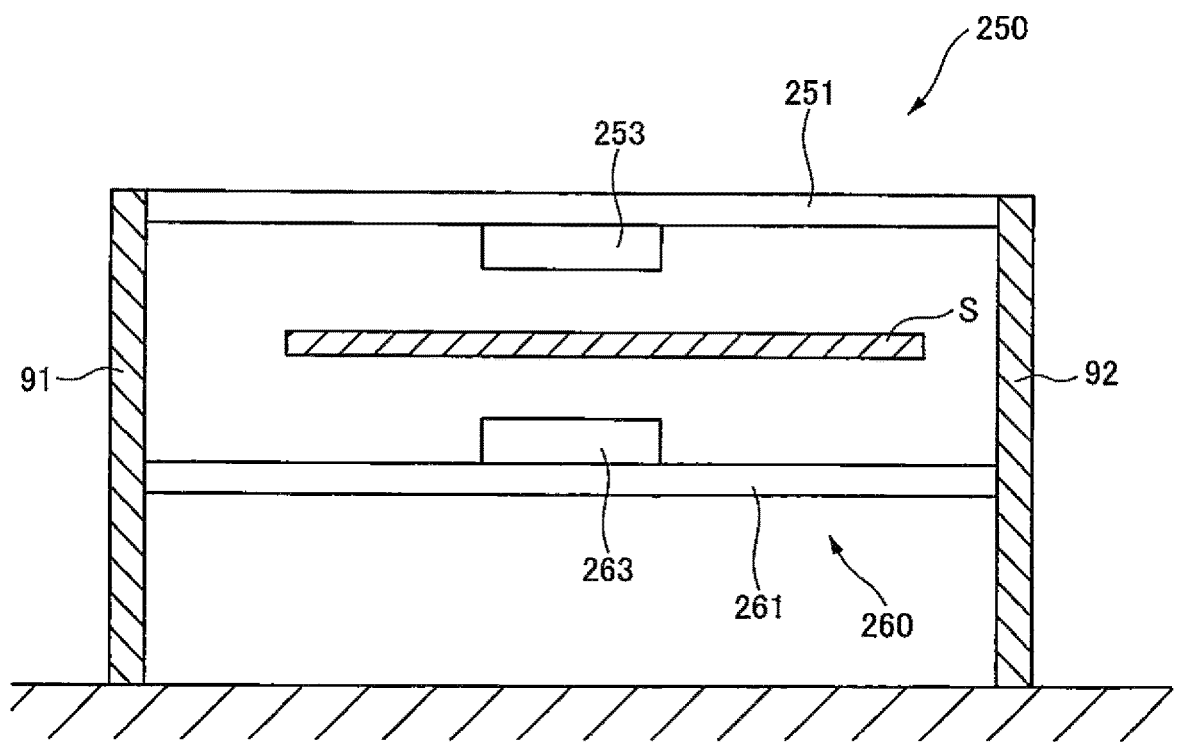
FIG. 16 is a XVI-XVI cross-sectional view of FIG. 15.

In the third working example, plating adhesion amount measurement devices 250, 260 shown in FIG. 15, which is a planar view, and FIG. 16, which is a XVI-XVI cross-sectional view of FIG. 15, are used instead of the plating adhesion amount measurement devices 50, 60 depicted in FIGS. 1, 4, and 5.

As depicted in FIGS. 15 and 16, the support structures 91, 92 are disposed fixedly and separate from one another across the transferring position of the steel strip S.

The beams 251, 252 of the plating adhesion amount measurement device 250 at the front side are mounted across the support structures 91, 92 at a position offset in the transferring direction C of the steel strip S. The beam 251 has a plating adhesion amount meter 253 fixed thereon, at the center position in the longitudinal direction. That is, unlike the above described first and second working examples, the plating adhesion amount meter 253 is not movable in the strip width direction of the steel strip S, but is arranged at an absolute position predetermined with respect to the ground. The plating adhesion amount meter 253 is a fluorescence X-ray adhesion amount meter, for instance, and measures the plating adhesion amount of the front surface of the steel strip S.

A downstream-side edge sensor 255 and a downstream-side edge sensor 256 are attached to the beam 252. The edge sensor 255 detects the edge position (downstream side position Ed21) of the first side (left side in FIG. 15) in the strip width direction of the steel strip S, and detects the edge position (downstream-side edge position Ed22) of the second side (right side in FIG. 15) in the strip width direction of the steel strip S.

The beam 261 of the plating adhesion amount measurement device 260 at the back side is mounted across the support structures 91, 92. The back-side beam 261 is arranged at a position facing the front-side beam 251. The beam 261 has a plating adhesion amount meter 263 fixed thereon, at the center position in the longitudinal direction. That is, unlike the above described first and second working examples, the plating adhesion amount meter 263 is not movable in the strip width direction of the steel strip S, but is arranged at an absolute position predetermined with respect to the ground. The plating adhesion amount meter 263 is a fluorescence X-ray adhesion amount meter, for instance, and measures the plating adhesion amount of the back surface of the steel strip S.

With this structure, the plating adhesion amount meters 253, 263 are arranged at absolute positions while facing one another across the steel strip S being transferred.

The downstream-side edge sensors 255, 256 disposed on the plating adhesion amount measurement device 250 are close to the plating adhesion amount meters 253, 263. Thus, the downstream-side edge position Ed21 detected by the edge sensor 255 indicates the edge position of the first end side of the steel strip S at the position in the transferring direction C where the plating adhesion amount meters 253, 263 are disposed. The downstream-side edge position Ed22 detected by the edge sensor 256 indicates the edge position of the second end side of the steel strip S at the position in the transferring direction C where the plating adhesion amount meters 253, 263 are disposed. The edge sensors 255, 256 input signals that indicate the downstream-side edge positions Ed21, Ed22 into the plating adhesion amount control device 100A described below (see FIG. 17).

The plating adhesion amount meters 253, 263 disposed at the absolute positions measure the plating adhesion amount and output the plating adhesion amount actual measurement values W10, W20. The plating adhesion amount meters 253, 263 input signals that indicate the plating adhesion amount actual measurement values W10, W20 into the plating adhesion amount control device 100A described below (see FIG. 17).

The mechanical configuration of the other part is similar to that of the first and second working examples. That is, the plating tank 10, the gas wiping nozzle device 20, the strip warp correction device 30, and the transferring path of the steel strip S are the same as those in the first and second working examples (see FIG. 1).

(Configuration of the Control System)

Next, with reference to FIG. 17, the configuration of the control system will be described. The same operations as those in the first and second working examples will be described only briefly.

Figure 17:
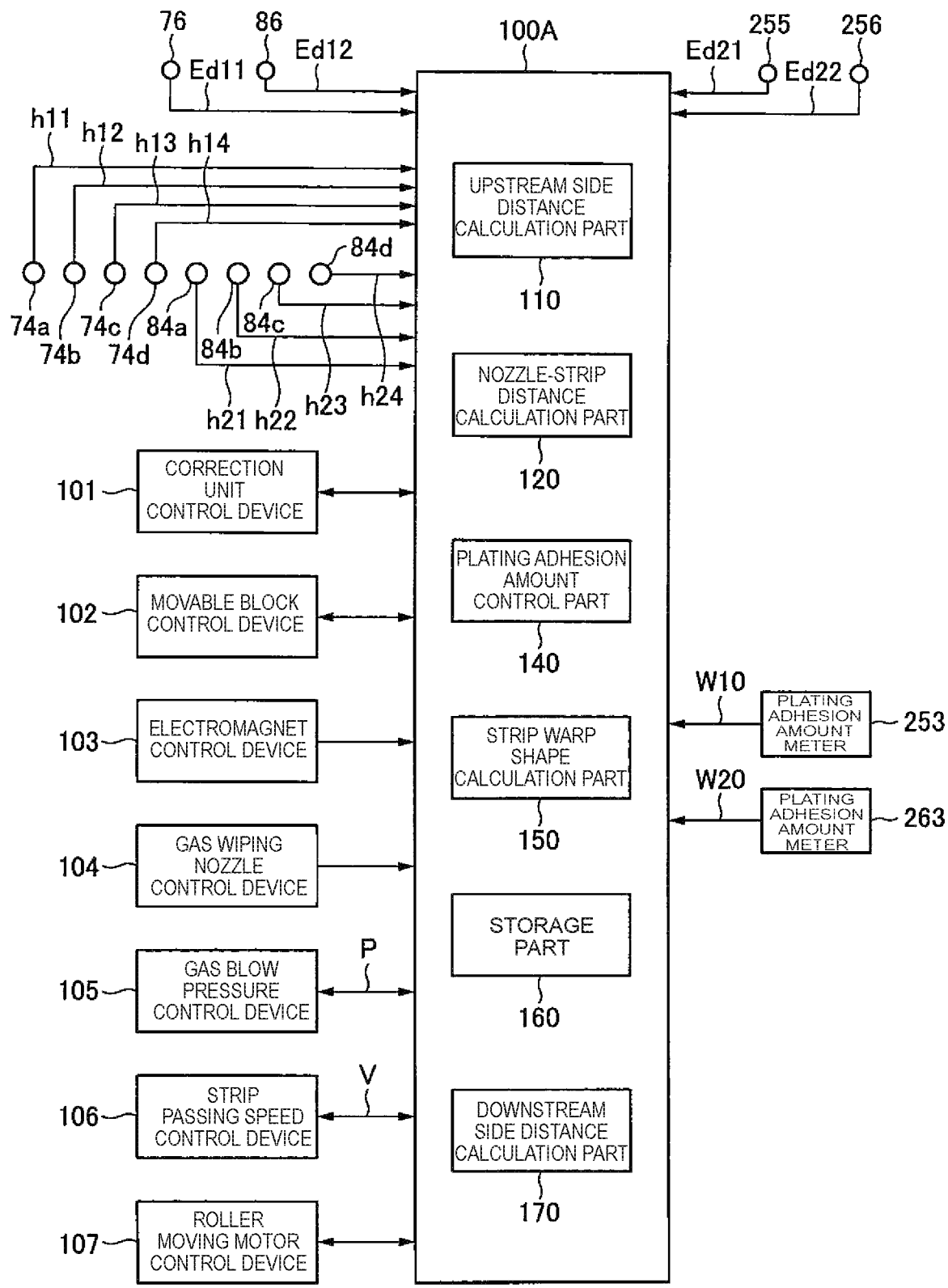
FIG. 17 is a configuration view showing the control system of a plating adhesion amount control mechanism.

As depicted in FIG. 17, the plating adhesion amount control device 100A of the plating adhesion amount control mechanism includes an upstream-side distance calculation part 110, a nozzle-strip distance calculation part 120, a plating adhesion amount control part 140, a strip warp shape calculation part 150, a storage part 160, and a downstream-side distance calculation part 170. The plating adhesion amount control device 100A does not have the movable body control part 130 of the plating adhesion amount control device 100 depicted in FIG. 6, but has the downstream-side distance calculation part 170 that the plating adhesion amount control device 100 does not include. The plating adhesion amount control device 100A includes a computer with a software configured to be capable of carrying out calculation and control processes.

Various devices and sensors as depicted in FIG. 17 are connected to the plating adhesion amount control device 100A.

The upstream-side edge sensors 76, 86 disposed on the strip warp correction device 30 output signals that indicate the upstream-side edge positions Ed11, Ed12, and send these signals to the plating adhesion amount control device 100A.

The distance sensors 74*a*, 74*b*, 74*c*, 74*d*, 84*a*, 84*b*, 84*c*, 84*d* output signals that indicate the distances h11, h12, h13, h14, h21, h22, h23, h24 to the steel strip S (see FIG. 7), and send these signals to the plating adhesion amount device 100A.

The correction unit control device 101 carries out control operation to move the correction units 31, 32 closer to or away from the steel strip S, and skew the correction units 31, 32 within the horizontal plane. Also, the correction unit control device 101 sends signals that indicate the movement positions of the correction units 31, 32 to the plating adhesion amount control device 100A.

The movable block control device 102 carries out control operation to move the movable blocks 72*a*, 72*b*, 72*c*, 72*d*, 82*a*, 82*b*, 82*c*, 82*d* in the strip width direction of the steel strip S, and send signals that indicate the movement positions of the distance sensors 74*a*, 74*b*, 74*c*, 74*d*, 84*a*, 84*b*, 84*c*, 84*d* to the plating adhesion amount control device 100A.

The electromagnet control device 103 controls the electric current to be supplied to the electromagnets 73*a*, 73*b*, 73*c*, 73*d*, 83*a*, 83*b*, 83*c*, 83*d*, and controls the magnetic attractive forces to be applied to the steel strip S. The electromagnet control device 103 sends the values of electric current supplied to the respective electromagnets 73*a*, 73*b*, 73*c*, 73*d*, 83*a*, 83*b*, 83*c*, 83*d* to the plating adhesion amount control device 100A.

The gas wiping nozzle control device 104 carries out control operation to move the gas wiping nozzles 21, 22 closer to or away from the steel strip S with respect to the support frames 71, 81, and sends signals that indicate the movement amounts of the gas wiping nozzles 21, 22 with respect to the support frames 71, 81 to the plating adhesion amount control device 100A.

The gas blow pressure control device 105 controls the blow pressure P of gas blown from the gas wiping nozzles 21, 22, and sends signals that indicate the blow pressure P of gas to the plating adhesion amount control device 100A.

The strip passing speed control device 106 controls the strip passing speed V of the steel strip S by, for instance, adjusting the rotation speed of non-depicted transferring rollers, and send signals that indicate the strip passing speed V of the steel strip S to the plating adhesion amount control device 100A.

The roller moving motor control device 107 adjusts the pass line (strip passing position) of the steel strip S by driving the roller moving motors 14, 15 to move the in-tank rollers 12, 13, and sends signals that indicate the pass line (strip passing position) of the steel strip S to the plating adhesion amount control device 100.

The downstream-side edge sensors 255, 256 disposed on the plating adhesion amount measurement device 250 output signals that indicate the downstream-side edge positions Ed21, Ed22, and these signals are inputted into the plating adhesion amount control device 100. The edge sensors 255, 256 are close to the plating adhesion amount meters 253, 263. Thus, the downstream-side edge position Ed21 detected by the edge sensor 255 indicates the edge position of the first end side of the steel strip S at the position in the transferring direction C where the plating adhesion amount sensors 253, 263 are disposed. The downstream-side edge position Ed22 detected by the edge sensor 256 indicates the edge position of the second end side of the steel strip S at the position in the transferring direction C where the plating adhesion amount meters 253, 263 are disposed.

The plating adhesion amount meters 253, 263 measure the plating adhesion amount and output the plating adhesion amount actual measurement values W10, W20. The plating adhesion amount meters 253, 263 input the plating adhesion amount actual measurement values W10, W20 into the plating adhesion amount control device 100A described below.

The upstream-side distance calculation part 110 calculates the specific strip width direction distances X11, X12, X13, X14 between the upstream-side edge position Ed11 and the distance sensors 74*a*, 74*b*, 74*c*, 74*d*, 84*a*, 84*b*, 84*c*, 84*d*, on the basis of signals that indicate the movement positions of the distance sensors 74*a*, 74*b*, 74*c*, 74*d*, 84*a*, 84*b*, 84*c*, 84*d* inputted from the movable block control device 102 and signals that indicate the upstream-side edge position Ed11 inputted from the upstream-side edge sensor 76.

The nozzle-strip distance calculation part 120 calculates the nozzle-strip distances H11, H12, H13, H14 between the gas wiping nozzle 21 and the steel strip S and the nozzle-strip distances H21, H22, H23, H24 between the gas wiping nozzle 22 and the steel strip S, on the basis of signals the indicate the distances h11, h12, h13, h14, h21, h22, h23, h24 inputted from the distance sensors 74a, 74b, 74c, 74d, 84a, 84b, 84c, 84d and signals that indicate the movement amounts of the gas wiping nozzles 21, 22 with respect to the support frames 71, 81 inputted from the gas wiping nozzle control devices 104 (see FIG. 8).

The plating adhesion amount control part 140 controls the plating adhesion amount by controlling the nozzle-strip distances H11, H12, H13, H14, H21, H22, H23, H24 by adjusting the movement positions of the correction units 31, 32 with the correction unit control device 101, adjusting the gas blow pressure P with the gas blow pressure control device 105, or by adjusting the strip passing speed V with the strip passing speed control device 106. The details of the control will be described below.

The strip warp shape calculation part 150 obtains the magnetic attractive force on the basis of the values of electric current supplied to the respective electromagnets 73a, 73b, 73c, 73d, 83a, 83b, 83c, 83d that are inputted from the electromagnet control device 103, and calculates the strip warp shape in the strip width direction of the steel strip S passing the strip warp correction device 30, on the basis of the magnetic attractive forces and the mechanical characteristics of the steel strip S.

The downstream-side distance calculation part 170 calculates the specific strip width direction distance X41 (see FIG. 18) between the downstream-side edge position Ed21 and the measurement position of the plating adhesion amount meters 253, 263 on the basis of the absolute position at which the plating adhesion amount meters 253, 263 are arranged (absolute position that indicates the measurement position of the plating adhesion amount meters 253, 263) and signals that indicate the downstream-side edge position Ed21 inputted from the downstream-side edge sensor 255.

The storage part 160 stores, with time (corresponding to the passage of time): the upstream-side edge positions Ed11, Ed12 inputted from the upstream-side edge sensors 76, 86; the downstream-side edge positions Ed21, Ed22 inputted from the downstream-side edge sensors 255, 256; the plating adhesion amount actual measurement values W10, W20 inputted from the plating adhesion amount meters 253, 263; the gas blow pressure P inputted from the gas blow pressure control device 105; the strip passing speed V inputted from the strip passing speed control device 106; the pass line (strip passing position) inputted from the roller moving motor control device 107; the strip width direction distances X11, X12, X13, X14 calculated by the upstream-side distance calculation part 110; the nozzle-strip distances H11, H12, H13, H14, H21, H22, H23, H24 calculated by the nozzle-strip distance calculation part 120; the strip warp shape in the strip width direction of the steel strip S calculated by the strip warp shape calculation part 150; and the specific strip width direction distance X41 calculated by the downstream-side distance calculation part 170.

(Premise for Describing the Control Operation)

The control operation will be described with reference to FIG. 18, which is a development view of the transferred state of the steel strip S.

In FIG. 18 that shows the front-surface side of the steel strip S, the upstream side position α is a position where the distance sensors 74a (84a), 74b (84b), 74c (84c), 74d (84d) of the strip warp correction device 30 are positioned with respect to the transferring direction C of the steel strip S, and is in a range where these distance sensors can measure the distance to the steel strip S. The downstream position β is a position where the plating adhesion amount meters 253, 263 of the plating adhesion amount measurement devices 250, 260 are positioned with respect to the transferring direction C of the steel strip S, and is in a range where these plating adhesion amount meters can measure the plating adhesion amount.

In FIG. 18, the edge position of the steel strip S is different at the upstream side (upper side in FIG. 18; the arrangement position of the strip warp correction device 30) and the downstream side (lower side in FIG. 18; the arrangement position of the plating adhesion amount measurement devices 250, 260), which means that the steel strip S is meandering. In a case where the steel strip S meanders in the strip width direction while being transferred in the transferring direction C, the upstream-side edge positions Ed11, Ed12 and the downstream-side edge positions Ed21, Ed22 become gradually offset in the strip width direction with respect to the absolute position (ground).

To describe the operation, time is defined as follows.

(1) When positions Y1, Y2, Y3, Y4 on the steel strip S are set as different positions in the transferring direction C of the steel strip S, t1 is the time when the top position Y1 passes the upstream position α, t2 is the time when the position Y2 passes the upstream position α, t3 is the time when the position Y3 passes the upstream position α, and t4 is the time when the position Y4 passes the upstream position α.

(2) The position Y1 passes the downstream position β after passage of time T1 after the position Y1 passes the upstream position α. The position Y2 passes the downstream position β after passage of time T2 after the position Y2 passes the upstream position α. The position Y3 passes the downstream position β after passage of time T3 after the position Y3 passes the upstream position α. The position Y4 passes the downstream position β after passage of time T4 after the position Y4 passes the upstream position α. Each time T1, T2, T3, T4 is determined by the distance between the upstream position α and the downstream position β (distance in the transferring direction C of the steel strip S) and the strip passing speed V. The times T1, T2, T3, T4 are constant when the strip passing speed V is constant. When the strip passing speed V changes (increases or decreases) while the positions Y1, Y2, Y3, Y4 reach the downstream position β from the upstream position α, the times T1, T2, T3, T4 become different from one another.

(Overview of the Control Operation)

The control operation will be described.

(a) Obtain the specific strip width direction distance X41 (t1+T1), which is a distance between the downstream-side edge position Ed21 (t1+T1) and the plating adhesion amount meters 253, 263 at a certain time (e.g. time t1+T1). Further, detect the plating adhesion amount actual measurement values W10 (t1+T1), W20 (t1+T1) at this time (t1+T1). Of the surface of the steel strip S, the portion facing the measurement position of the plating adhesion amount meters 253, 263 at a position offset from the downstream-side edge position Ed21 (t1+T1) in the strip width direction by the specific strip width direction distance X41 is the "downstream-side measurement surface portion".

(b) Calculate the plating adhesion amount estimation value We (X31F, t1) of the front-surface side and the plating adhesion amount estimation value We (W41B, t1) of the back-surface side at a position offset from the upstream-side edge position Ed11 (t1) in the strip width direction by the specific strip width direction distance X41 (t1+T1) ("upstream measurement surface portion") at a time (e.g. t1) earlier than the above time (e.g. time t1+T1) by time T1. This estimation calculation is carried out by using "plating adhesion amount estimation expression". The plating adhesion amount estimation expression represents a relationship between "the nozzle-strip distance H, the gas blow pressure P, the strip passing speed V of the steel strip, the specific strip width direction distance X at the upstream side", and the "plating adhesion amount estimation values We".

(c) The "downstream-side measurement surface portion" at a certain time (e.g. time t1+T1) and the above "upstream-side measurement surface portion" at the time (e.g. time t1) earlier by time T1 than the time (e.g. time t1+T1), are the same portion (position) of the strip surface of the steel strip S.

In other words, the "downstream-side measurement surface portion" at a certain time (e.g. time t1+T1) and the above "upstream-side measurement surface portion" at the time (e.g. time t1) earlier by time T1 than the time (e.g. time t1+T1), are the same portion (position) of the strip surface of the steel strip S, both in the longitudinal direction and the strip width direction of the strip surface of the steel strip S.

(d) Obtain the differences Δ (X41F, t1), Δ (X41B, t1) between the plating adhesion amount estimation values We (X41F, t1), We (X41B, t) obtained in the above (b) and the plating adhesion amount actual measurement values W10 (t1+T1), W20 (t1+T1) obtained in the above (a).

(e) Correct the "plating adhesion amount estimation expression" so that the differences Δ (X41F, t1), Δ (X41B, t1) become zero, in other words, the plating adhesion amount estimation values We (X41F, t1), We (X41B, t1) become equal to the plating adhesion amount actual measurement values W10 (t1+T1), W20 (t1+T1).

(f) By using the corrected "plating adhesion amount estimation expression" to control the nozzle-strip distance H, the gas blow pressure P, and the strip passing speed V of the steel strip, it is possible to control the plating adhesion amount with high accuracy.

(Detailed Description of the Control Operation)

The control operation will be described in detail.

The upstream-side distance calculation part 110 calculates and obtains the strip width direction distances X11, X12, X13, X14 (see FIG. 18) between the upstream-side edge position Ed11 and the distance sensors 74a (84a), 74b (84b), 74c (84c), 74d (84d) at the respective times t1, t2, t3, t4, and so on.

That is, the upstream-side distance calculation part 110 obtains the following strip width direction positions at the respective times.

The specific strip width direction distance X11 (t1) between the upstream-side edge position Ed11 (t1) and the distance sensor 74a (84a), the strip width direction distance X12 (t1) between the upstream-side edge position Ed11 (t1) and the distance sensor 74b (84b), the strip width direction distance X13 (t1) between the upstream-side edge position Ed11 (t1) and the distance sensor 74c (84c), and the strip width direction distance X14 (t1) between the upstream-side edge position Ed11 (t1) and the distance sensor 74d (84d), at time t1.

The specific strip width direction distance X11 (t2) between the upstream-side edge position Ed11 (t2) and the distance sensor 74a (84a), the strip width direction distance X12 (t2) between the upstream-side edge position Ed11 (t2) and the distance sensor 74b (84b), the strip width direction distance X13 (t2) between the upstream-side edge position Ed11 (t2) and the distance sensor 74c (84c), and the strip width direction distance X14 (t2) between the upstream-side edge position Ed11 (t2) and the distance sensor 74d (84d), at time t2.

The specific strip width direction distance X11 (t3) between the upstream-side edge position Ed11 (t3) and the distance sensor 74a (84a), the strip width direction distance X12 (t3) between the upstream-side edge position Ed11 (t3) and the distance sensor 74b (84b), the strip width direction distance X13 (t3) between the upstream-side edge position Ed11 (t3) and the distance sensor 74c (84c), and the strip width direction distance X14 (t3) between the upstream-side edge position Ed11 (t3) and the distance sensor 74d (84d), at time t3.

The specific strip width direction distance X11 (t4) between the upstream-side edge position Ed11 (t4) and the distance sensor 74a (84a), the strip width direction distance X12 (t4) between the upstream-side edge position Ed11 (t4) and the distance sensor 74b (84b), the strip width direction distance X13 (t4) between the upstream-side edge position Ed11 (t4) and the distance sensor 74c (84c), and the strip width direction distance X14 (t4) between the upstream-side edge position Ed11 (t4) and the distance sensor 74c (84c), at time t4.

Similarly, obtain the strip width direction distances X11 (t5, t6, . . . ), X12 (t5, t6, . . . ), X13 (t5, t6, . . . ), X14 (t5, t6, . . . ) between the upstream-side edge position Ed11 (t5, t6, . . . ) and the distance sensors 74a (84a), 74b (84b), 74c (84c), 74d (84c).

In a case where the steel strip S meanders while being transferred, the upstream-side edge position Ed11 (t1, t2, t3, t4, . . . ) changes in the strip width direction at each time.

The strip width direction distances X11 (t1, t2, t3, t4, t5, t6, . . . ), X12 (t1, t2, t3, t4, t5, t6, . . . ), X13 (t1, t2, t3, t4, t5, t6, . . . ), X14 (t1, t2, t3, t4, t5, t6, . . . ) calculated as described above at the respective times (t1, t2, t3, t4, t5, t6, . . . ) are stored in the storage part 160.

The nozzle-strip distance calculation part 120 calculates and obtains the nozzle-strip distances H11, H12, H13, H14 between the gas wiping nozzle 21 and the steel strip S at the arrangement position of the distance sensors 74a, 74b, 74c, 74d and the nozzle-strip distances H21, H22, H23, H24 between the gas wiping nozzle 22 and the steel strip S at the arrangement position of the distance sensors 84a, 84b, 84c, 84d, at respective times t1, t2, t3, t4, and so on (see FIG. 8).

That is, the nozzle-strip distance calculation part 120 obtains the following nozzle-strip distances H at the respective times.

The nozzle-strip distances H11 (t1), H21 (t1), H12 (t1), H22 (t1), H13 (t1), H23 (t1), H14 (t1), H24 (t1), at time t1.

The nozzle-strip distances H11 (t2), H21 (t2), H12 (t2), H22 (t2), H13 (t2), H23 (t2), H14 (t2), H24 (t2), at time t2.

The nozzle-strip distances H11 (t3), H21 (t3), H12 (t3), H22 (t3), H13 (t3), H23 (t3), H14 (t3), H24 (t3), at time t3.

The nozzle-strip distances H11 (t4), H21 (t4), H12 (t4), H22 (t4), H13 (t4), H23 (t4), H14 (t4), H24 (t4), at time t4.

Similarly, the nozzle-strip distances H11 (t5, t6, . . . ), H21 (t5, t6, . . . ), H12 (t5, t6, . . . ), H22 (t5, t6, . . . ), H13 (t5, t6, . . . ), H23 (t5, t6, . . . ), H14 (t5, t6, . . . ), H24 (t5, t6, . . . ), at the subsequent times t5, t6, and so on.

The nozzle-strip distances H11 (t1, 2, t3, t4, t5, t6, . . . ), H21 (t1, t2, t3, t4, t5, t6, . . . ), H12 (t1, t2, t3, t4, t5, t6, . . . ), H22 (t1, t2, t3, t4, t5, t6, . . . ), H13 (t1, t2, t3, t4, t5, t6, . . . ), H23 (t1, t2, t3, t4 t5, t6, . . . ), H14 (t1, t2, t3, t4, t5, t6, ... ), H24 (t1, t2, t3, t4, t5, t6, ... ) calculated as described above at the respective times (t1, t2, t3, t4, t5, t6, ... ) are stored in the storage part 160.

The downstream-side distance calculation part 170 recognizes each of the times t1, t2, t3, t4, t5, and so on. Further, the downstream-side distance calculation part 170 obtains times T1, T2, T3, T4, T5, and so on, on the basis of the distance between the upstream position α and the downstream position β (pre-measured distance in the transferring direction C) and the strip passing speed V inputted from the strip passing speed control device 106.

The downstream-side distance calculation part 170 calculates and obtains the specific strip width direction distance X41 between the downstream-side edge position Ed21 and the plating adhesion amount meters 253, 263 at the respective times t1+T1, t2+T2, t3+T3, t4+T4, and so on (see FIG. 18).

That is, the downstream-side distance calculation part 170 obtains the following strip width direction positions at the respective times.

the specific strip width direction distance X41 (t1+T1) between the downstream-side edge position Ed21 (t1+T1) and the measurement position of the plating adhesion amount meters 253, 263 at time t1+T1.

the specific strip width direction distance X41 (t2+T2) between the downstream-side edge position Ed21 (t2+T2) and the measurement position of the plating adhesion amount meters 253, 263 at time t2+T2.

the specific strip width direction distance X41 (t3+T3) between the downstream-side edge position Ed21 (t3+T3) and the measurement position of the plating adhesion amount meters 253, 263 at time t3+T3.

the specific strip width direction distance X41 (t4+T4) between the downstream-side edge position Ed21 (t4+T4) and the measurement position of the plating adhesion amount meters 253, 263 at time t4+T4.

Similarly, the downstream-side distance calculation part 170 obtains the specific strip width direction distances X41 (t5+T5, t6+T6, ... ) between the downstream-side edge position Ed21 (t5+T5, t6+T6, ... ) and the measurement position of the plating adhesion amount meters 253, 263 at times t5+T5, t6+T6, and so on.

In a case where the steel strip S meanders while being transferred, the downstream-side edge position Ed21 (t1+T1, t2+T2, t3+T3, t4+T4, ... ) changes in the strip width direction at each time.

The specific strip width direction distances X41 (t1+T1, t2+T2, t3+T3, t4+T4, t5+T5, t6+T6, ... ) at the respective times (t1+T1, t2+T2, t3+T3, t4+T4, t5+T5, t6+T6, ... ) calculated as described above are stored in the storage part 160.

The plating adhesion amount meters 253, 263:
at time (t1+T1), measure the plating adhesion amount, and output the plating adhesion amount actual measurement values W10 (t1+T1), W20 (t1+T1); and
at time (t2+T2), measure the plating adhesion amount, and output the plating adhesion amount actual measurement values W10 (t2+T2), W20 (t2+T2); and
at time (t3+T3), measure the plating adhesion amount, and output the plating adhesion amount actual measurement values W10 (t3+T3), W20 (t3+T3); and
at time (t4+T4), measure the plating adhesion amount, and output the plating adhesion amount actual measurement values W10 (t4+T4), W20 (t4+T4).

At subsequent times (t5+T5), (t6+T6), and so on, the plating adhesion amount meters 253, 263 also output the plating adhesion amount actual measurement values.

The following values outputted as described above at the respective times (t1+T1), (t2+T2), (t3+T3), (t4+T4), (t5+T5), (t6+T6), and so on are stored in the storage part 160:
the plating adhesion amount actual measurement values W10 (t1+T1), W20 (t1+T1).
the plating adhesion amount actual measurement values W10 (t2+T2), W20 (t2+T2).
the plating adhesion amount actual measurement values W10 (t3+T3), W20 (t3+T3).
the plating adhesion amount actual measurement values W10 (t4+T4), W20 (t4+T4).
the plating adhesion amount actual measurement values W10 (t5+T5), W20 (t5+T5).
the plating adhesion amount actual measurement values W10 (t6+T6), W20 (t6+T6), and so on.

The strip warp shape calculation part 150 detects the strip warp shape in the strip width direction of the steel strip S at the respective times t1, t2, t3, t4, and so on. The strip warp shape at the respective times t1, t2, t3, t4, and so on are stored in the storage part 160.

For instance, an estimation model expression of the plating adhesion amount (plating adhesion amount estimation expression) as in the following expression (1), for instance, is set for the plating adhesion amount control part 140.

$$We = G \cdot H^{n1} \cdot P^{n2} \cdot V^{n3} \quad (1)$$

Herein, We [g/m$_2$] is the plating adhesion amount estimation value, H [mm] is the nozzle-strip distance, P [kPa] is the blow pressure of gas injected from the gas wiping nozzles 21, 22, V is the strip passing speed, and G, n1, n2, n3, and n4 are coefficients.

The estimation model expression of the plating adhesion amount is created on the basis of data obtained during many actual operations in the past.

The plating adhesion amount control part 140 imports the strip warp shape of the steel strip S in the strip width direction at the respective times t1, t2, t3, t4, and so on, stored in the storage part 160.

Furthermore, the plating adhesion amount control part 140 imports the nozzle-strip distances H11, H12, H13, H14, H21, H22, H23, H24, and so on, at the respective times t1, t2, t3, t4, and so on, stored in the storage part 160. The nozzle-strip distances H11, H12, H13, H14, H21, H22, H23, H24 are nozzle-strip distances at the arrangement positions of the distance sensors 74a, 74b, 74c, 74d, 84a, 84b, 84c, 8d.

Further, the plating adhesion amount control part 140 calculates by interpolation the nozzle-strip distances H11, H12, H13, H14, H21, H22, H23, H24 at time t1 taking into account the strip warp shape of the steel strip S in the strip width direction at time t1, and thereby obtains the nozzle-strip distances at a position away from the upstream-side edge position Ed1 by the specific strip width direction distance X41 at time t1.

By substituting the above described interpolated nozzle-strip distances into the estimation model expression of the plating adhesion amount of the expression (1), it is possible to obtain each plating adhesion amount estimation value We at a position away from the upstream-side edge position Ed11 by the specific strip width direction distance X41.

That is, in the second working example, the "plating adhesion amount estimation expression" is the calculation method of obtaining the plating adhesion amount estimation values We by substituting the nozzle-strip distances (nozzle-strip distances obtained by interpolation calculation) at positions away by the specific strip width direction distances into the estimation model expression of the plating adhesion amount according to the above (1).

The plating adhesion amount control part 140 receives the adhesion value of plating that should adhere to the steel strip S, that is, the plating adhesion amount target value Wo, as the plating adhesion amount estimation value We. The plating adhesion amount control part 140 calculates the value of the nozzle-strip distance H, the value of the blow pressure P of gas, and the strip passing speed V such that it is possible to obtain the plating adhesion amount estimation value We being the plating adhesion amount target value Wo, and controls the nozzle-strip distance H, the blow pressure P of gas, and the strip passing speed V to the calculated values of H, P, V.

That is, the plating adhesion amount control part 140 controls the nozzle-strip distances H11, H12, H13, H14, H21, H22, H23, H24 by adjusting the movement positions of the correction units 31, 32 with the correction unit control device 101, adjusting the gas blow pressure P with the gas pressure control device 105, or by adjusting the strip passing speed V with the strip passing speed control device 106, so as to obtain the nozzle-strip distance H, the gas blow pressure P, and the strip passing speed V obtained by calculation, so that the plating adhesion amount estimation value We equals to the plating adhesion amount target value Wo.

Meanwhile, it is also possible to control the nozzle-strip distances H11, H12, H13, H14, H21, H22, H23, H24, by adjusting the strip passing position by using the roller moving motor control device 107.

The plating adhesion amount control part 140 imports the nozzle-strip distances H11 (t1, 2, t3, t4, t5, t6, . . . ), H21 (t1, t2, t3, t4, t5, t6, . . . ), H12 (t1, t2, t3, t4, t5, t6, . . . ), H22 (t1, t2, t3, t4, t5, t6, . . . ), H13 (t1, t2, t3, t4, t5, t6, . . . ), H23 (t1, t2, t3, t4 t5, t6, . . . ), H14 (t1, t2, t3, t4, t5, t6, . . . ), H24 (t1, t2, t3, t4, t5, t6, . . . ) at the respective times (t1, t2, t3, t4, t5, t6, . . . ) stored in the storage part 160.

Furthermore, the plating adhesion amount control part 140 imports the gas blow pressures P (t1), P (t2), P (t3), P (t4), P (t5), P (t6), and so on, at the respective times (t1, t2, t3, t4, t5, t6, . . . ) stored in the storage part 160.

Furthermore, the plating adhesion amount control part 140 imports the strip passing speeds V (t1), V (t2), V (t3), V (t4), V (t5), V (t6), and so on, at the respective times (t1, t2, t3, t4, t5, t6, . . . ) stored in the storage part 160.

The plating adhesion amount control part 140 imports, from the storage part 160, the specific strip width direction distance X41 (t1+T1) obtained by the downstream-side distance calculation part 170 and stored in the storage part 160, and obtains the nozzle-strip distance at a position away by the specific strip width direction distance X41 (t1+T1) (nozzle-strip distance obtained by interpolation calculation). Further, the plating adhesion amount control part 140 substitutes the nozzle-strip distance (nozzle-strip distance obtained by interpolation calculation), the gas blow pressure P (t1), the strip passing speed V (t1) into the estimation model expression of the plating adhesion amount, to obtain the following at time t1 and at the upstream side position α.
The plating adhesion amount estimation value We (X41F, t1) at the front-surface side of the steel strip S at the position (upstream-side measurement surface portion) where the specific strip width direction distance from the upstream-side edge position Ed11 is X41 (t1+T1).
The plating adhesion amount estimation value We (X41B, t1) at the back-surface side of the steel strip S at the position (upstream-side measurement surface portion) where the specific strip width direction distance from the upstream-side edge position Ed11 is X41 (t1+T1).

Similarly, the plating adhesion amount control part 140 obtains the following at times t2, t3, t4, t5, t6, and so on, at the upstream side position α.
The plating adhesion amount estimation values We (X41F, t2), We (X41F, t3), We (X41F, t4), We (X41F, t5), We (X41F, t6), and so on, at the front-surface side of the steel strip S at the position (upstream-side measurement surface portion) where the specific strip width direction distance from the upstream-side edge position Ed11 is X41 (t2+T2), X41 (t3+T3), X41 (t4+T4), X41 (t5+T5), X41 (t6+T6), and so on.
The plating adhesion amount estimation values We (X41B, t2), We (X41B, t3), We (X41B, t4), We (X41B, t5), We (X31B, t6), and so on, at the back-surface side of the steel strip S at the position (upstream-side measurement surface portion) where the specific strip width direction distance from the upstream-side edge position Ed11 is X41 (t2+T2), X41 (t3+T3), X41 (t4+T4), X41 (t5+T5), X41 (t6+T6), and so on.

The storage part 160 stores the plating adhesion amount estimation value We (X41F, t1), and the like, at each upstream-side measurement surface portion.

In the third working example, of the surfaces (front surface and back surface) of the steel strip S, the respective positions (downstream-side measurement surface portions) away from the downstream-side edge position Ed21 by the specific strip width direction distances X41 (t1+T1), X41 (t2+T2), X41 (t3+T3), X41 (t4+T4), X41 (t5+T5), X41 (t6+T6), and so on, which are positions to obtain the plating adhesion amount actual measurement values Wo at times t1+T1, t2+T2, t3+T3, t4+T4, t5+T5, t6+T6, and so on, are the same as the respective positions (upstream-side measurement surface portions) away from the upstream-side edge position Ed11 by the specific strip width direction distances X41 (t1+T1), X41 (t2+T2), X41 (t3+T3), X41 (t4+T4), X41 (t5+T5), X41 (t6+T6), and so on, which are positions to obtain the plating adhesion amount estimation values We at times t1, t2, t3, t4, t5, t6, and so on.

Thus, the plating adhesion amount control part 140 extracts, from the storage part 160, the plating adhesion amount estimation values We at the respective positions (upstream-side measurement surface portions) away from the upstream-side edge position Ed11 by the specific strip width direction distances X41 (t1+T1), X41 (t2+T2), X41 (t3+T3), X41 (t4+T4), X41 (t5+T5), X41 (t6+T6), and so on, at times t1, t2, t3, t4, t5, t6, and so on, and the plating adhesion amount actual measurement values W at the respective positions (downstream-side measurement surface portions) away from the downstream-side edge position Ed21 by the specific strip width direction distances X41 (t1+T1), X41 (t2+T2), X41 (t3+T3), X41 (t4+T4), X41 (t5+T5), X41 (t6+T6), and so on, at times (t1+T1), (t2+T2), (t3+T3), (t4+T4), (t5+T5), (t6+T6), and so on, and compares the plating adhesion amount estimation values We with the plating adhesion amount actual measurement values W to obtain the differences Δ (see FIG. 19).

The detailed description with reference to FIG. 19 is as follows.

The plating adhesion amount control part 140 compares the plating adhesion amount estimation value We at time t1 with the plating adhesion amount actual measurement value W at time (t1+T1) as follows to obtain the differences.

The plating adhesion amount control part 140 compares the plating adhesion amount estimation value We (X41F, t1)

with the plating adhesion amount actual measurement value W10 (t1+T1) and obtain the difference Δ (X41F, t1) therebetween.

The plating adhesion amount control part 140 compares the plating adhesion amount estimation value We (X41B, t1) with the plating adhesion amount actual measurement value W20 (t1+T1) and obtain the difference Δ (X41B, t1) therebetween.

Then, the plating adhesion amount control part 140 compares the plating adhesion amount estimation values We at times t2, t3, t4, t5, t6, and so on with the plating adhesion amount actual measurement values W at times (t2+T2), (t3+T3), (t4+T4), (t5+T5), (t6+T6, and so on similarly to obtain the following differences.

differences Δ (X41F, t2), Δ (X41F, t3), Δ (X41F, t4), and so on, differences Δ (X41B, t2), Δ (X41B, t3), Δ (X41B, t4), and so on.

The respective differences Δ obtained as described above are stored in the storage part 160.

At each of the predetermined timings or each time the above differences Δ are obtained, of the "plating adhesion amount estimation expression" in the second working example", the plating adhesion amount control part 140:

corrects the coefficients G, n1, n2, n3, n4 of the estimation model expression of the plating adhesion amount shown in the above expression (1); or correct the calculation method to obtain the plating adhesion amount estimation values We at all positions in the strip width direction by taking into account the strip warp shape in the strip width direction of the steel strip S, so that the obtained differences Δ become zero.

By correcting the coefficients as described above, the accuracy of the "plating adhesion amount estimation expression" including the estimation model expression of the plating adhesion amount improves, and the adhesion amount of plating that should adhere to the steel strip S approaches the target adhesion amount more accurately.

By using the corrected "plating adhesion amount estimation expression" to control the nozzle-strip distance H, the gas blow pressure P, and the strip passing speed V of the steel strip, it is possible to control the plating adhesion amount with high accuracy.

INDUSTRIAL APPLICABILITY

The present invention can be applied to a molten metal plating facility to improve the control accuracy of the plating adhesion amount.

DESCRIPTION OF REFERENCE NUMERALS

1 Molten metal plating facility
10 Plating tank
11 Sink roller
12, 13 In-tank roller
14, 15 Roller moving motor
20 Gas wiping nozzle device
21, 22 Gas wiping nozzle
30 Strip warp correction device
31, 32 Correction unit
41, 42 Top roller
43 Roller
50, 60, 250, 260 Plating adhesion amount measurement device
51a, 51b, 51c, 51d, 61a, 61b, 61c, 63d Guide rail
52a, 52b, 52c, 52d, 62a, 62b, 62c, 62d Movable body
53a, 53b, 53c, 53d, 63a, 63b, 63c, 63d, 253, 263 Plating adhesion amount meter
54, 251, 252, 261 Beam
55, 56, 255, 256 Downstream-side edge sensor
71, 81 Support frame
72a, 72b, 72c, 72d, 82a, 82b, 82c, 82d Movable block
73a, 73b, 73c, 73d, 83a, 83b, 83c, 83d Electromagnet
74a, 74b, 74c, 74d, 84a, 84b, 84c, 84d Distance sensor
75, 85 Connection frame
76, 86 Upstream-side edge sensor
91, 92 Support structure
100 Plating adhesion amount control device
101 Correction unit control device
102 Movable block control device
103 Electromagnet control device
104 Gas wiping nozzle control device
105 Gas blow pressure control device
106 Strip passing speed control device
107 Roller moving motor control device
110 Upstream-side distance calculation part
120 Nozzle-strip distance calculation part
130 Movable body control part
140 Plating adhesion amount control part
150 Strip warp shape calculation part
160 Storage part
170 Downstream-side distance calculation part
250, 260 Plating adhesion amount measurement device
251, 252, 261 Beam
253, 263 Plating adhesion amount meter
255, 256 Downstream-side edge sensor
S Steel strip
M Molten metal
C Transferring direction of steel strip
α, β Position
P Gas blow pressure
V Strip passing speed
H11, H12, H13, H14, H21, H22, H23, H24 Nozzle-strip distance between gas wiping nozzle and steel strip
h11, h12, h13, h14, h21, h22, h23, h24 Distance between distance sensor and steel strip
Ed11, Ed12 Upstream-side edge position
Ed21, Ed22 Downstream-side edge position
X11, X12, X13, X14 Specific strip width direction distance between upstream-side edge position and distance sensor
X21, X22, X23, X24 Specific strip width direction distance between downstream-side edge position and distance sensor
X31, X32, X33, X34 Specific strip width direction distance (fixed distance)
wo Plating adhesion amount target value
We Plating adhesion amount estimation value
W10, W11, W12, W13, W14, W20, W21, W22, W23, W24 Plating adhesion amount actual measurement value

The invention claimed is:

1. A plating adhesion amount control mechanism, comprising: a pair of gas wiping nozzles disposed such that a steel strip pulled up from a plating tank is transferred therebetween, the gas wiping nozzles being configured to blow a gas onto the steel strip; an upper setting position wherein a transferring direction of the steel strip is chanced to a horizontal direction;

a distance sensor disposed at an upstream side position which is a position upstream to the upper setting position of the steel strip, the distance sensor being configured to detect a nozzle-strip distance which is a distance between the gas wiping nozzles and a strip surface;

an upstream-side edge sensor disposed at the upstream side position the steel strip and configured to detect an upstream-side edge position which is a first edge position of the steel strip;

a downstream-side edge sensor disposed at a downstream side position which is a position downstream of the upstream side position of the steel strip and configured to detect a downstream-side edge position which is a second edge position of the steel strip;

a plating adhesion amount meter disposed at the downstream side position with respect to the upper setting position of the steel strip and configured to detect a plating adhesion amount of a metal plating layer formed on the steel strip and output a plating adhesion amount actual measurement value; and a plating adhesion amount controller having a plating adhesion amount estimation expression for calculating a plating adhesion amount estimation value of a first measurement surface portion which is a first position on the strip surface at which the plating adhesion amount is to be measured by the plating adhesion amount meter, when the first measurement surface portion passes the upstream side position using arithmetic elements including: the nozzle-strip distance; a blowing pressure of the gas; a steel strip passing speed; and a specific distance in a strip width direction between the upstream-side edge position and the first measurement surface portion, said specific distance is equal in distance in the strip width direction between the downstream-side edge position and the first measurement surface portion, wherein the plating adhesion amount controller is configured to obtain a difference between the plating adhesion amount estimation value which is calculated when the first measurement surface portion passes the upstream side position and the plating adhesion amount actual measurement value detected when the plating adhesion amount meter faces the first measurement surface portion and the first measurement surface portion passes the downstream side position, and correct the plating adhesion amount estimation expression so as to reduce the difference to zero.

2. The plating adhesion amount control mechanism according to claim 1, further comprising:
a movable body configured to move the plating adhesion amount meter in the strip width direction; and
a movable body control part configured to control the movable body to move in the strip width direction,
wherein the distance sensor is configured to detect the nozzle-strip distance at a position at which the distance in the strip width direction from the upstream-side edge position is equal to the specific distance,
wherein the plating adhesion amount controller is configured to calculate the plating adhesion amount estimation value of the first measurement surface portion by using the nozzle-strip distance at a position of the distance sensor when the first measurement surface portion passes the upstream side position, and wherein the movable body control part is configured to move the movable body so that the strip width direction distance between the downstream-side edge position and the plating adhesion amount meter becomes the specific distance when the first measurement surface portion passes the downstream side position.

3. The plating adhesion amount control mechanism according to claim 1, further comprising:
a movable body configured to move the plating adhesion amount meter in the strip width direction;
a movable body control part configured to control the movable body to move in the strip width direction; and
a strip warp shape calculator configured to calculate a strip warp shape of the steel strip in the strip width direction when the first measurement surface portion passes the upstream side position,
wherein the specific distance is a strip width direction distance of a fixed length fixed preliminarily extending in the strip width direction from the edge position of the steel strip,
wherein the distance sensor comprises a plurality of distance sensors arranged in the strip width direction,
wherein the plating adhesion amount controller is configured to obtain the nozzle strip distance at a position away from the upstream-side edge position by the specific distance of the fixed length by interpolation, based on the strip warp shape, of a plurality of nozzle-strip distances at positions of the plurality of distance sensors when the first measurement surface portion passes the upstream side position, and calculate the plating adhesion amount estimation value of the first measurement surface portion by using the interpolated nozzle-strip distances, and
wherein the movable body control part is configured to move the movable body so that the strip width direction distance between the downstream-side edge position and the plating adhesion amount meter becomes the specific distance of the fixed length.

4. The plating adhesion amount control mechanism according to claim 1, further comprising:
a strip warp shape calculator configured to calculate a strip warp shape of the steel strip in the strip width direction when the first measurement surface portion passes the upstream side position,
wherein the plating adhesion amount meter is configured to detect the plating adhesion amount at a position at which the distance in the strip width direction from the downstream-side edge position is equal to the specific distance,
wherein the distance sensor comprises a plurality of distance sensors arranged in the strip width direction,
wherein the plating adhesion amount meter is disposed at an absolute position which is determined preliminarily, and
wherein the plating adhesion amount controller is configured to obtain the nozzle strip distance at a position away from the upstream-side edge position by the specific distance by calculating by interpolation a plurality of nozzle-strip distances at positions of the plurality of distance sensors when the first measurement surface portion passes the upstream side position taking into account the strip warp shape, and calculate the plating adhesion amount estimation value of the first measurement surface portion by using the interpolated nozzle-strip distances.

5. The plating adhesion amount control mechanism according to claim 1,
wherein the plating adhesion amount meter comprises a plurality of plating adhesion amount meters disposed at positions which are offset in the transferring direction of the steel strip.

6. The plating adhesion amount control mechanism according to claim 1, wherein the plating adhesion amount controller part is configured to control the nozzle-strip distance, a blow pressure of the gas, and a steel strip passing speed, using the corrected plating adhesion amount estimation expression, so that the plating adhesion amount estimation value becomes equal to the plating adhesion amount actual measurement value.

7. A plating adhesion amount control method for controlling the plating adhesion amount on the steel strip by using the plating adhesion amount control mechanism according to claim 1, comprising:
blowing the gas onto the steel strip using the pair of gas wiping nozzles disposed such that the steel strip pulled up from the plating tank is transferred therebetween;
detecting the nozzle-strip distance which is the distance between the gas wiping nozzles and the strip surface at the upstream side position;
detecting the upstream-side edge position;
detecting the downstream-side edge position;
obtaining the plating adhesion amount actual measurement value by detecting the plating adhesion amount of a metal plating layer formed on the steel strip at the downstream side position with respect to the transferring direction of the steel strip by using the plating adhesion amount meter;
calculating the plating adhesion amount estimation value of the first measurement surface portion which is the first position on the strip surface at which the plating adhesion amount is to be measured by the plating adhesion amount meter, when the first measurement surface portion passes the upstream side position using arithmetic elements including: the nozzle-strip distance; a blow pressure of the gas; a steel strip passing speed; and the specific distance in the strip width direction between the upstream-side edge position and the first measurement surface portion, said specific distance is equal in distance in the strip width direction between the downstream-side edge position and the first measurement surface portion; and
obtaining the difference between the plating adhesion amount estimation value which is calculated when the first measurement surface portion passes the upstream side position and the plating adhesion amount actual measurement value detected when the plating adhesion amount meter faces the first measurement surface portion and the first measurement surface portion passes the downstream side position, and correcting the plating adhesion amount estimation expression so as to reduce the difference to zero.

* * * * *